US008400449B1

(12) United States Patent
Davidson

(10) Patent No.: US 8,400,449 B1
(45) Date of Patent: Mar. 19, 2013

(54) VOLUMETRIC DATA EXPLORATION USING MULTI-POINT INPUT CONTROLS

(75) Inventor: Philip L. Davidson, New York, NY (US)

(73) Assignee: Perceptive Pixel, Inc., New York, NY (US)

( * ) Notice: Subject to any disclaimer, the term of this patent is extended or adjusted under 35 U.S.C. 154(b) by 0 days.

(21) Appl. No.: 13/428,168

(22) Filed: Mar. 23, 2012

Related U.S. Application Data

(63) Continuation of application No. 12/625,773, filed on Nov. 25, 2009.

(60) Provisional application No. 61/117,952, filed on Nov. 25, 2008, provisional application No. 61/236,794, filed on Aug. 25, 2009.

(51) Int. Cl.
*G06T 15/00* (2011.01)
*G06F 3/01* (2006.01)
*G06F 3/048* (2006.01)

(52) U.S. Cl. .................. 345/419; 715/702; 715/848

(58) Field of Classification Search .................. None
See application file for complete search history.

(56) References Cited

U.S. PATENT DOCUMENTS

| | | | |
|---|---|---|---|
| 6,426,745 B1 | 7/2002 | Isaacs et al. | |
| 6,448,964 B1 | 9/2002 | Isaacs et al. | |
| 6,525,875 B1 | 2/2003 | Lauer | |
| 6,781,597 B1 * | 8/2004 | Vrobel et al. | 345/619 |
| 6,819,344 B2 | 11/2004 | Robbins | |
| 7,349,888 B1 | 3/2008 | Heidenreich et al. | |
| 7,610,253 B1 | 10/2009 | Heidenreich et al. | |
| 7,743,348 B2 * | 6/2010 | Robbins et al. | 715/863 |
| 2005/0060667 A1 | 3/2005 | Robbins | |
| 2007/0011617 A1 | 1/2007 | Akagawa et al. | |
| 2007/0146325 A1 * | 6/2007 | Poston et al. | 345/163 |
| 2008/0079723 A1 | 4/2008 | Hanson et al. | |
| 2008/0132788 A1 | 6/2008 | Schreckenberg et al. | |
| 2008/0246756 A1 | 10/2008 | Rust | |
| 2009/0046298 A1 | 2/2009 | Betzig | |
| 2009/0073563 A1 | 3/2009 | Betzig | |
| 2010/0257468 A1 | 10/2010 | Bernardo et al. | |
| 2011/0115791 A1 | 5/2011 | Sabiston | |
| 2011/0285695 A1 | 11/2011 | Rust | |

OTHER PUBLICATIONS

M. Hancock et al., Shallow-Depth 3D Interaction: Design and Evaluation of One-, Two- and Three-Touch Techniques, CHI 2007, ACM, pp. 1147-1156, Apr. 2007.*
Visit User's Manual, Version 1.5, UCRL-SM-220449, Lawrence Livermore National Laboratory, Oct. 2005.*
T. Moscovich and J.F. Hughes, Multi-finger Cursor Techniques, Graphics Interface 2006, pp. 1-7, 2006.*
Notice of Allowance mailed Jan. 25, 2012 in U.S. Appl. No. 12/625,773, filed Nov. 25, 2009, 13 pages.

(Continued)

*Primary Examiner* — Kee M Tung
*Assistant Examiner* — Haixia Du
(74) *Attorney, Agent, or Firm* — Alleman Hall McCoy Russell & Tuttle LLP

(57) ABSTRACT

A three-dimensional data set is accessed. A two-dimensional plane is defined that intersects a space defined by the three-dimensional data set. The two-dimensional plane defines a two-dimensional data set within the three-dimensional data set and divides the three-dimensional data set into first and second subsets. A three-dimensional view based on the three-dimensional data set is rendered on such that at least a portion of the first subset of the three-dimensional data set is removed and at least a portion of the two-dimensional data set is displayed. A two-dimensional view of a first subset of the two-dimensional data set also is rendered. Controls are provided that enable visual navigation through the three-dimensional data set by engaging points on the multi-touch display device that correspond to either the three-dimensional view based on the three-dimensional data set and/or the two-dimensional view of the first subset of the two-dimensional data set.

39 Claims, 39 Drawing Sheets

OTHER PUBLICATIONS

Shoemake K., "ARCBALL: A User Interface for Specifying Three-Dimensional Orientation Using a Mouse," Proceedings of the conference on Graphics interface '92, 151-156 (1992).
Non-final Office Action mailed Jun. 13, 2012 in U.S. Appl. No. 13/426,300, filed Mar. 21, 2012, 64 pages.
Non-final Office Action mailed Jul. 26, 2012 in U.S. Appl. No. 13/428,075, filed Mar. 23, 2012, 77 pages.
Non-final Office Action mailed Sep. 21, 2012 in U.S. Appl. No. 13/428,099, filed Mar. 23, 2012, 65 pages.
Non-final Office Action mailed Jun. 15, 2012 in U.S. Appl. No. 13/428,181, filed Mar. 23, 2012, 62 pages.
Non-final Office Action mailed Jul. 19, 2012 in U.S. Appl. No. 13/428,209, filed Mar. 23, 2012, 88 pages.
Notice of Allowance mailed Aug. 15, 2012 in U.S. Patent Application No. 13/428,243, filed Mar. 23, 2012, 15 pages.
P. Dietz and D. Leigh, DiamondTouch: A Multi-User Touch Technology, UIST '01, Nov. 11-14, 2001, pp. 219-226.
R. Balakrishnan et al., The Rockin' Mouse: Integral 3D Manipulation on a Plane, CHI 97, ACM, pp. 311-318, Mar. 22-27, 997.
Non-final Office Action mailed May 23, 2012 in U.S. Appl. No. 13/428,099, filed Mar. 23, 2012, 62 pages.

* cited by examiner

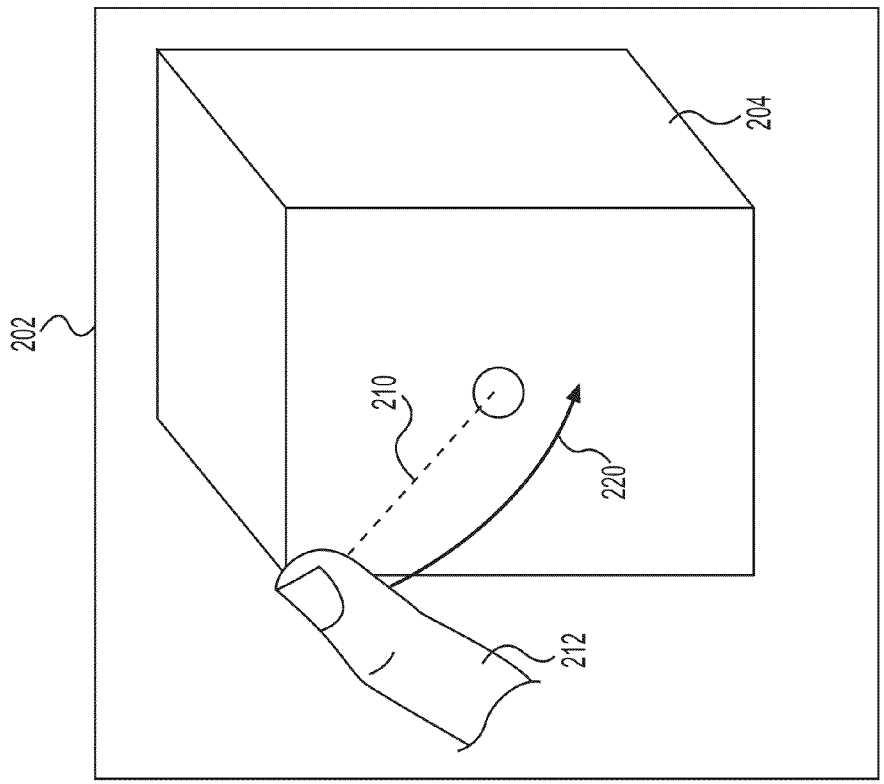
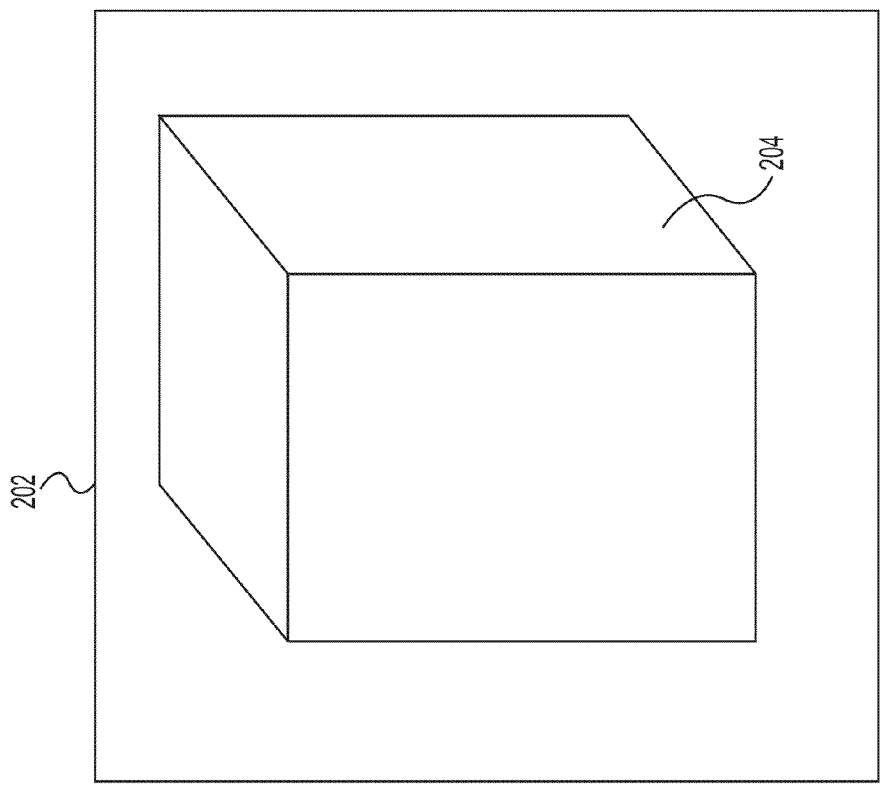
FIG. 2B
FIG. 2A

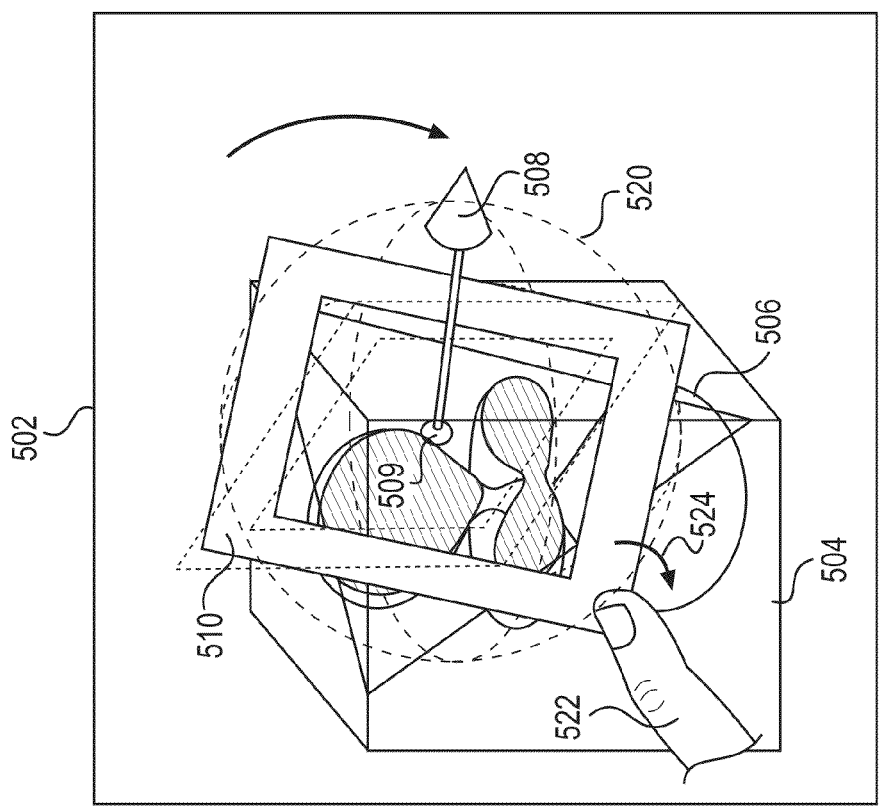

VOLUMETRIC DATA EXPLORATION USING MULTI-POINT INPUT CONTROLS

CROSS REFERENCE TO RELATED APPLICATIONS

This application is a continuation of, and claims priority to, U.S. application Ser. No. 12/625,773, filed Nov. 25, 2009, entitled "Volumetric Data Exploration Using Multi-Point Input Controls," which claims priority to U.S. Provisional Patent Application Ser. No. 61/117,952, filed on Nov. 25, 2008 and entitled "Volumetric Data Exploration Using Multi-Point Input Controls," and U.S. Provisional Patent Application Ser. No. 61/236,794, filed on Aug. 25, 2009 and entitled "Volumetric Data Exploration Using Multi-Point Input Controls," all of which are incorporated herein by reference in their entireties.

TECHNICAL FIELD

This disclosure relates to manipulating content displayed by a multi-point input computing system (e.g., a multi-touch display device).

BACKGROUND

Generally, touch-screen display devices detect input from a user based on the presence and location of a touch on, within, or within the vicinity of the surface of the display area. Some touch-screen display devices require physical contact with the surface of the display area, for example with a finger, stylus, or other input mechanism, in order to interact with the touch-screen display device. Other touch-screen display devices receive input by detecting the presence of a finger, a stylus, or some other input mechanism hovering around, or otherwise in the vicinity of, a particular location on the surface of the display area.

Multi-touch display devices are more sophisticated than traditional touch-screen display devices, as they detect the presence and location of multiple touches on, within, or within the vicinity of the surface of the display area at the same time. Like traditional touch-screen display devices, some multi-touch display devices require physical contact with the surface of the display area with one or more fingers, styluses, and/or other mechanisms in order to interact with the multi-touch display device, while other multi-touch display devices receive input by detecting the presence of one or more fingers, styluses, and/or other input mechanisms hovering around, or otherwise in the vicinity of, the surface of the display area.

Multi-touch display devices belong to a more general class of multi-point input computing systems. Multi-point input computing systems receive, recognize, and act upon multiple inputs at the same time.

SUMMARY

A three-dimensional data set is accessed. A two-dimensional plane is defined that intersects a space defined by the three-dimensional data set. The two-dimensional plane defines a two-dimensional data set within the three-dimensional data set and divides the three-dimensional data set into first and second subsets. A three-dimensional view based on the three-dimensional data set is rendered on such that at least a portion of the first subset of the three-dimensional data set is removed and at least a portion of the two-dimensional data set is displayed. A two-dimensional view of a first subset of the two-dimensional data set also is rendered. Controls are provided that enable visual navigation through the three-dimensional data set by engaging points on the multi-touch display device that correspond to either the three-dimensional view based on the three-dimensional data set and/or the two-dimensional view of the first subset of the two-dimensional data set.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program stored on a tangible, computer-readable storage medium. The tangible, computer-readable storage medium may include, for example, instructions that, when executed, cause a computer to perform acts specified by the instructions.

The details of one or more implementations are set forth in the accompanying drawings and the description below. Other features will be apparent from the description and the drawings, and from the claims.

DESCRIPTION OF DRAWINGS

FIGS. 2A-2C are a sequence of diagrams that illustrate a multi-touch display device displaying a 3D volume and controls provided by the multi-touch display device for spherically rotating the 3D volume around a pivot point.

FIGS. 5A-5C are a sequence of diagrams that illustrate a multi-touch display device displaying a cutting plane defined through a 3D volume and a rotation handle provided by the multi-touch display device for rotating the cutting plane through the 3D volume spherically around a pivot point.

DETAILED DESCRIPTION

Figure 1A:
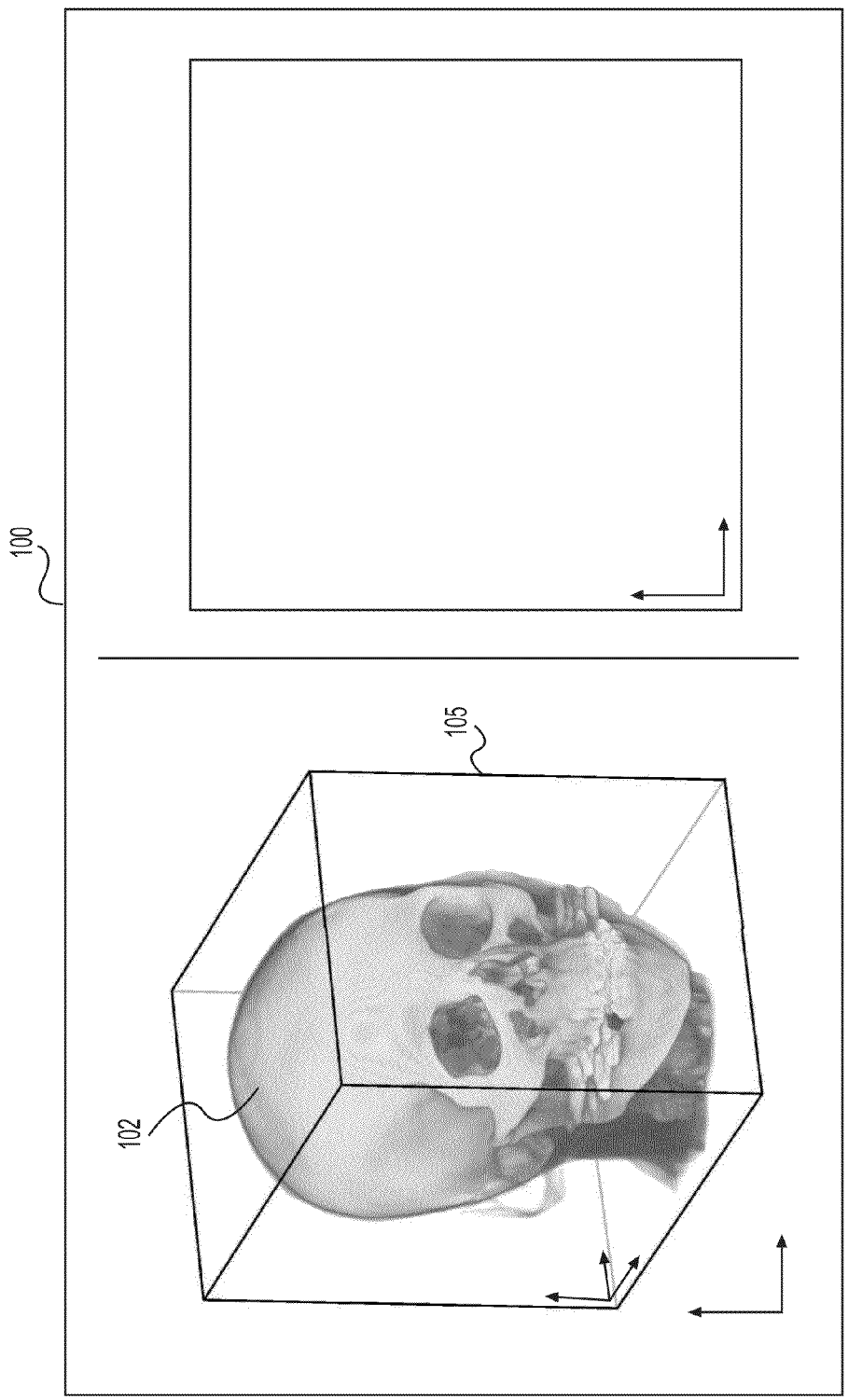
FIGS. 1A-1E are diagrams of a multi-touch display device that illustrate different multi-touch controls for manipulating data displayed on the multi-touch display device by a medical imaging application.

When a 3-dimensional (3D) model is rendered on a display device, some features of the 3D model may not be visible depending on the relative orientation of the rendered 3D object. For example, the "front" of the 3D model may occlude or otherwise obscure features on the "back" surface of the 3D model when the 3D model is rendered. Furthermore, additional features of the 3D model may be occluded or otherwise obscured by other features of the 3D model. In such situations, one or more "cutting planes" may be defined through the 3D model to cut away sections of the rendered 3D model to reveal the occluded or otherwise obscured features.

Visually rendering a 3D volumetric data set may pose similar problems. Techniques for rendering 3D volumetric data often involve interpreting voxel data as solid or semi-solid material. Consequently, the visual rendering of the surface of an object within a volumetric data set may result in internal features of the object being occluded by the surface of the object. In order to expose these internal features of the object, one or more cutting planes may be defined through the 3D volumetric data set to cut away one or more sections of the 3D volumetric data set to expose internal features of the object.

Multi-point input controls may provide particularly elegant mechanisms for concurrently manipulating both a rendered 3D volume and one or more cutting planes defined through the visually rendered 3D volume, thereby enabling exploration of the entirety of the 3D volume (both internal and external) and its various features.

The ability to easily navigate through a visual rendering of a 3D volumetric data set may have particular applicability in the field of medical imaging. For example, a CT scan (computed tomography scan or computed axial tomography scan) of a patient's head may produce a 3D volumetric data set of the patient's head. However, when the 3D volumetric data set produced by the CT scan is rendered visually, the patient's skull may occlude various internal features of the data set, including, for example, the patient's brain. Therefore, a cutting plane that effectively cuts away a section of the 3D volumetric data set may be defined through the visual rendering of the patient's head to reveal features of the patient's brain.

When a 3D volumetric data set of a patient's head produced by, for example, a CT scan is displayed, various multi-point input controls disclosed herein provide a physician or other medical professional with tools for concurrently manipulating the orientation of both the 3D volumetric data set (e.g., the patient's head) and a cutting plane defined through the 3D volumetric data set at the same time, thereby enabling the physician or medical professional to efficiently navigate through the 3D volumetric data set with multiple degrees of freedom in order to explore various localized features of the patient's brain. In implementations described below, multi-point input controls have been designed and scaled such that the multi-point input controls are easily actuatable by a user either with multiple fingers on one hand or with the user's two hands, because ease of use is perceived as important to the adoption of such multi-point input controls by users of multi-point input controls such as multi-touch display devices.

FIGS. 1A-1E are diagrams of a multi-touch display device that illustrate different multi-touch controls for manipulating data displayed on the multi-touch display device by a medical imaging application.

FIG. 1A is a diagram that illustrates a multi-touch display device 100 displaying a visual rendering of a 3D volumetric data set representing a patient's head 102. As illustrated in FIG. 1A, the patient's skull obstructs the display of the interior features of the patient's head 102 (e.g., the patient's brain). As discussed in greater detail below, multi-point input controls made available by the multi-touch display device 100 provide multiple degrees of freedom for manipulating the visual display of the 3D volumetric data set, thereby enabling various features on the surface of the patient's skull to be explored.

For example, a rotation control made available by the multi-touch display device 100 provides two degrees of freedom by enabling spherical rotation of the 3D volumetric data set of the patient's head 102 around a pivot point. In some implementations such a rotation control is engaged by detecting that a user is touching (e.g., with one or more fingers, styluses, or other input mechanisms) the boundary 105 of the 3D view of the 3D volumetric data set. When the rotation control is engaged in this manner, the multi-touch display device 100 tracks movements by the fingers (or other input mechanisms) that have engaged the control and rotates the 3D volumetric data set in accordance with the movements of the user's fingers (or other input mechanisms) across the surface of the multi-touch display device 100.

Additionally or alternatively, a scale control made available by the multi-touch display device 100 provides an additional degree of freedom by enabling the scale of the visual display of the 3D volumetric data set to be increased or decreased and/or a translation control made available by the multi-touch display device 100 provides an additional two degrees of freedom by enabling the position of the 3D volumetric data set to be moved up/down and left/right on the multi-touch display device 100.

However, alone, these operations do not enable display of the internal features of the patient's head 102 (e.g., the patient's brain). Therefore, in order to display the patient's brain, the multi-touch display device 100 is configured to enable a cutting plane to be defined through the 3D volumetric data set such that a section of the 3D rendering of the volumetric data set representing the patient's head 102 is cut away, thereby revealing the patient's brain.

Figure 1B:
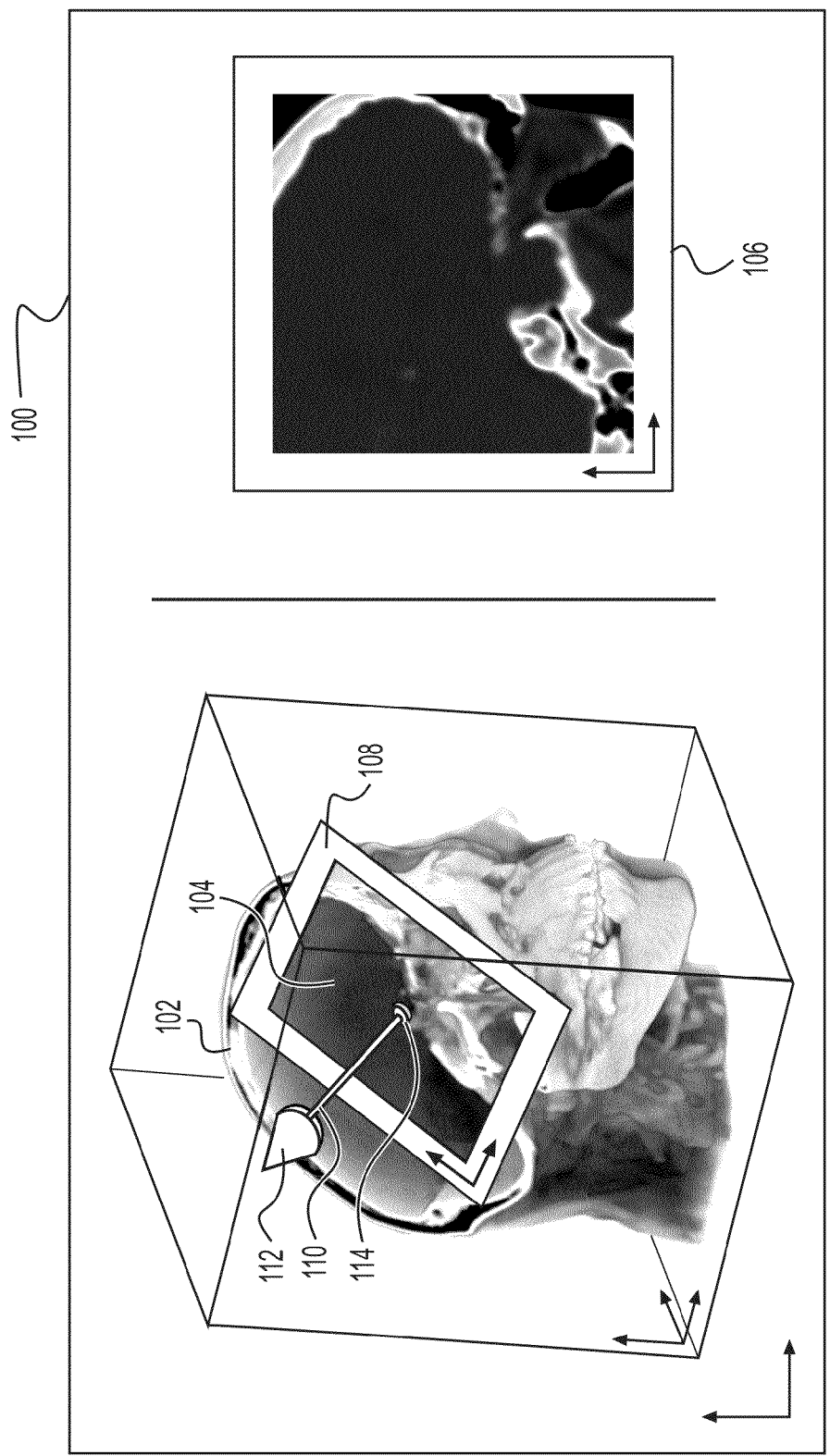

Referring to FIG. 1B, the multi-touch display device 100 has defined a cutting plane 104 through the 3D volumetric data set of the patient's head 102. As illustrated in FIG. 1B, the cutting plane 104 cuts away a section of the 3D volumetric data set to reveal internal features of the data set. In addition to defining the cutting plane 104 through the 3D volumetric data set, the multi-touch display device 100 also provides a view port 106 that provides a 2D view of a portion of the data on the surface of the cutting plane 104. The data displayed in the view port 106 corresponds to the data on the surface of the cutting plane 104 that falls within the region of the cutting plane 104 defined by the view frame 108 superimposed over the cutting plane 104.

As discussed above, the multi-touch display device 100 provides a number of controls for manipulating the orientation of the 3D volumetric data set. In addition, the multi-touch display device 100 also provides numerous controls for manipulating the orientation of the cutting plane 104 and the data displayed in the view port 106. By exploiting the ability of the multi-touch display device 100 to receive, recognize, and act upon multiple input concurrently, these controls can be combined and/or composed to enable powerful high degree of freedom exploration of the 3D volumetric data set.

As an example of one control, the multi-touch display device 100 provides an orientation widget 110 represented as a normal vector extending away from the cutting plane 104. Among other features, the orientation widget 110 serves to indicate the direction of the cutting plane 104. In addition, the orientation widget 110 includes an engageable rotation handle 112 that enables a user to rotate the cutting plane 104 through the 3D volumetric data set around the origin 114 of the cutting plane 104. The shaft of the orientation widget 110 also operates as a depth handle that enables a user to manipulate the depth of the cutting plane 104 (i.e., the offset of the cutting plane 104 along the cutting plane's normal) within the 3D volumetric data set. In addition, the orientation widget 110 provides a translation control that enables a user to translate the origin 114 of the cutting plane 104 along the cutting plane 104. In some implementations, the center of the view frame 108 may be fixed at the origin 104 of the cutting plane 104 such that when the origin 114 of the cutting plane 104 is translated, the multi-touch display device 100 translates the view frame 108 accordingly.

The view frame 108 also may function as a control that enables a user to manipulate displayed data. For example, the multi-touch display device 100 may be configured to translate the view frame 108 and/or the origin 114 of the cutting plane 104 in response to detecting that a user is touching the view frame 108 with one or more fingers or other input mechanisms and dragging the view frame 108 across the cutting plane 104. In addition, the view frame 108 may be configured to detect that a user is applying a varying amount of pressure to the view frame 108 with one or more fingers and to tilt the cutting plane 104 in response as a function of the pressure applied to the view frame 108. In some implementations, the multi-touch display device 100 may sense the pressure applied to the surface of the multi-touch display device 100. In other implementations, the multi-touch display device 100 may sense the displacement of the surface of the multi-touch display device 100 caused by the application of pressure to the surface of the multi-touch display device by the user's fingers 100.

As will be discussed in greater detail below, the multi-touch display device 100 may provide various other controls for manipulating the 3D volumetric data set, the cutting plane 104, and/or the view frame 108.

As the volumetric data set, the cutting plane 104, and the view frame 108 are manipulated, the data on the surface of the cutting plane 104 within the region defined by the view frame 108 may change regularly. Thus, as the data on the surface of the cutting plane 104 within the region defined by the view frame 108 changes, the multi-touch display device 100 is configured to update the 2D data displayed in the viewport 106 accordingly.

In addition, in some implementations, the multi-touch display device 100 also may be configured to provide controls located within or around the viewport 106 for manipulating the 2D data displayed in the viewport 106. For example, the multi-touch display device 100 may provide controls for rotating, scaling, and/or translating the 2D data displayed in the viewport 106. Additionally or alternatively, the multi-touch display device 100 may be configured to provide a control (e.g., a one dimensional slider) in the vicinity of the viewport 106 that enables a user to manipulate the depth of the cutting plane 104 within the volumetric data set. For example, in the case of a one dimensional slider, the slider may cause the depth of the cutting plane 104 to be increased within the 3D volumetric data set in response to a user sliding the slider in one direction. In contrast, the slider may cause the depth of the cutting plane 104 to be decreased within the 3D volumetric data set in response to a user sliding the slider in another direction.

Figure 1C:
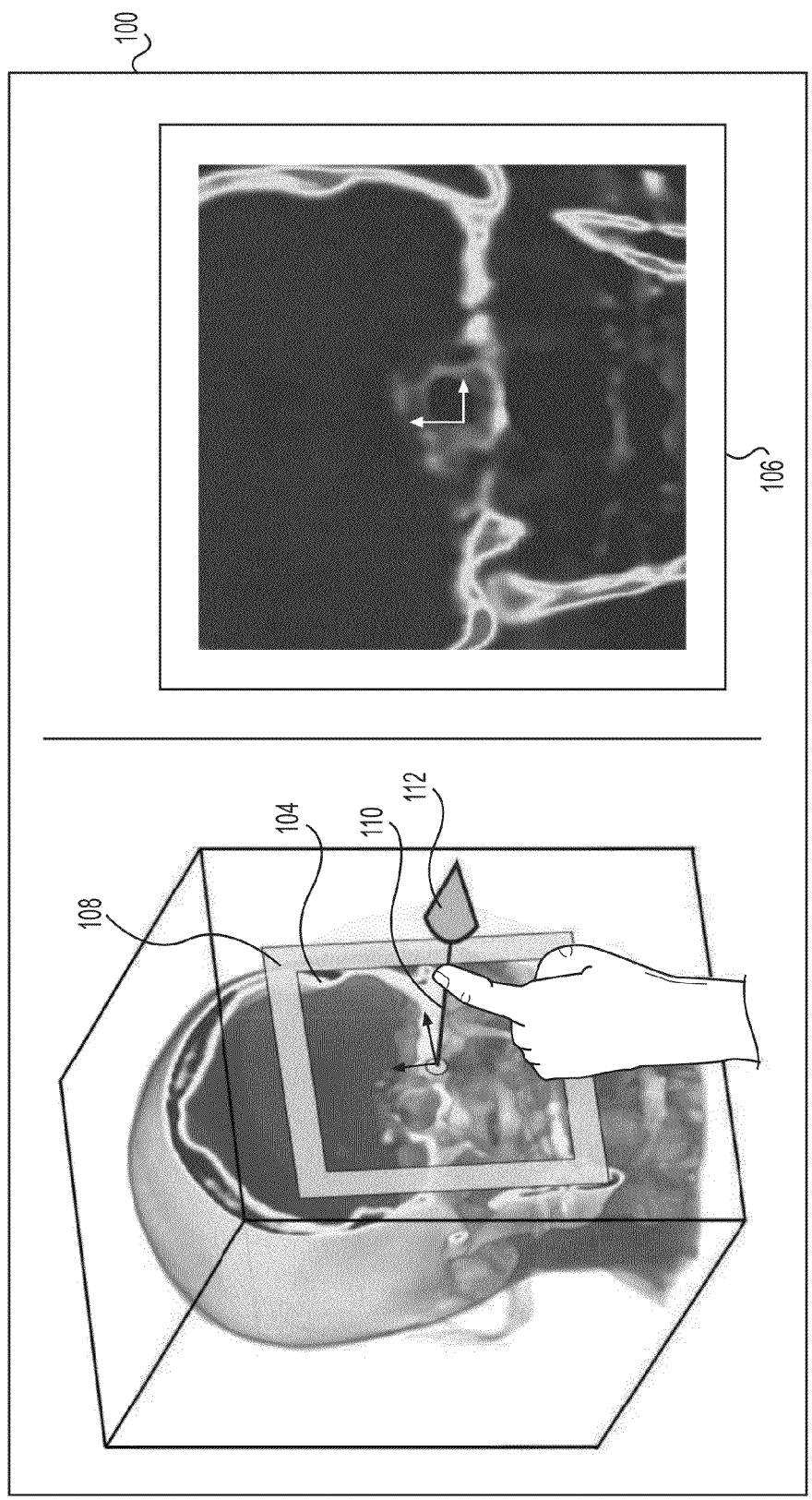
Figure 1D:
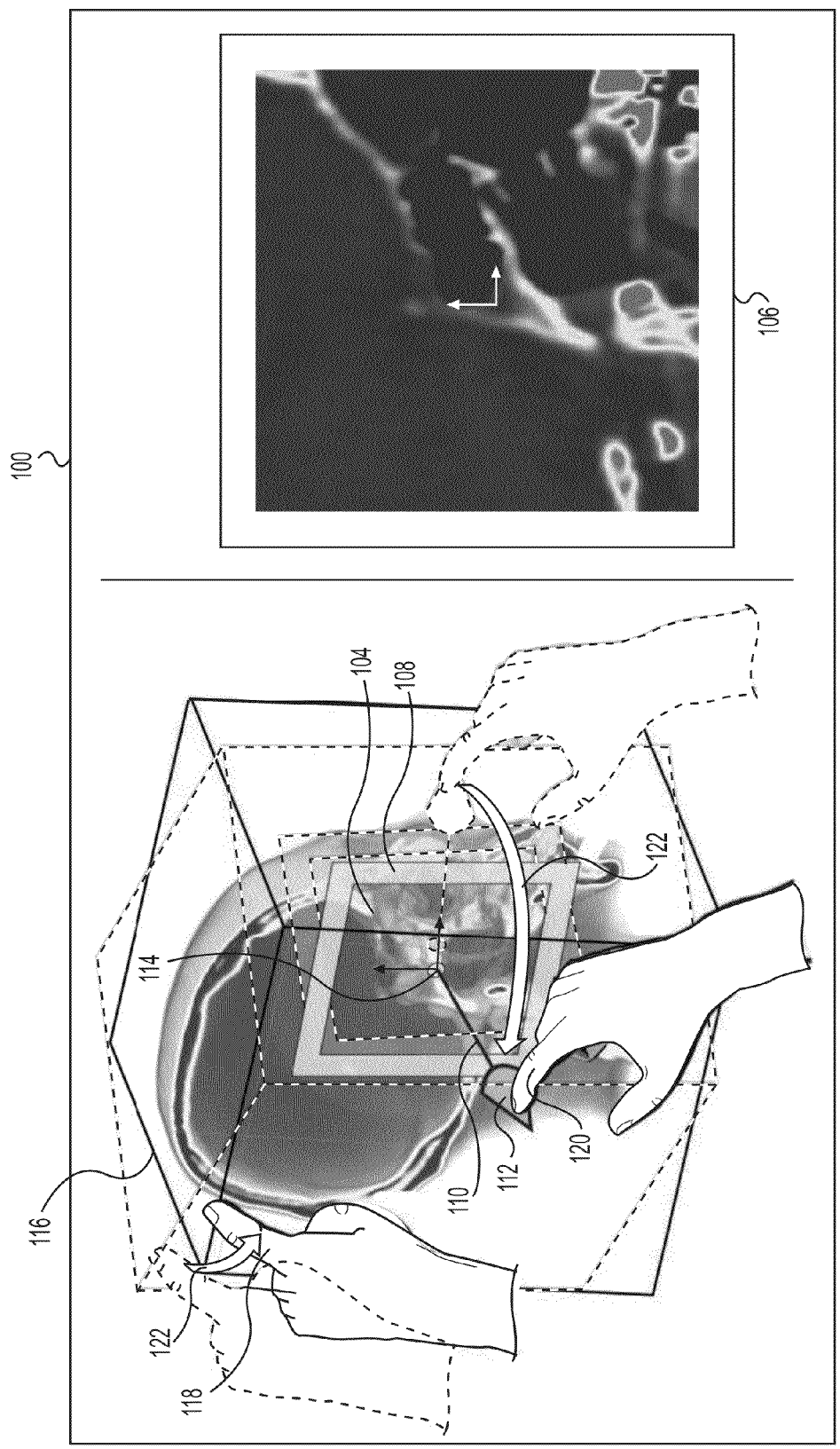
Figure 1E:
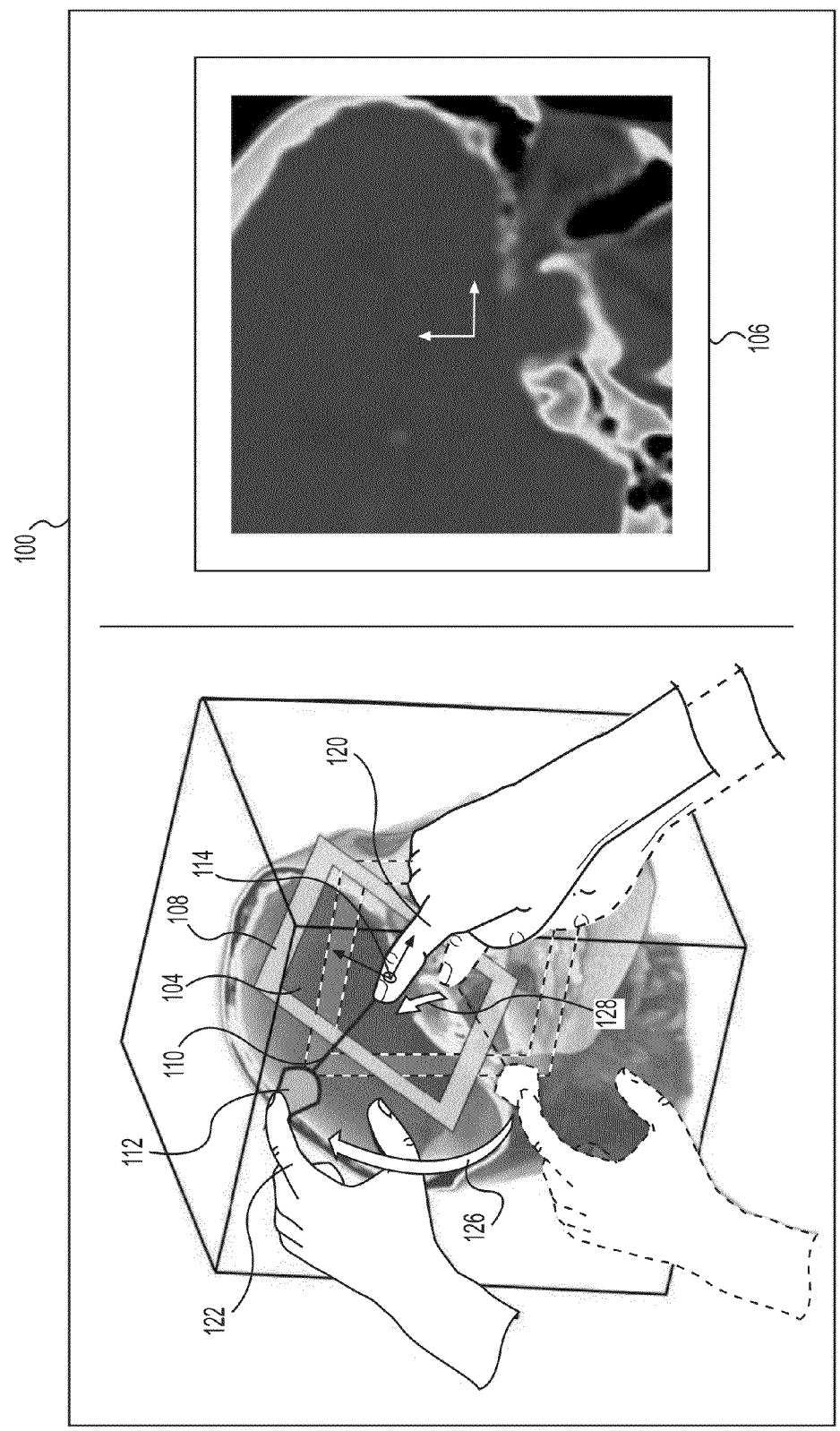

The various different controls provided by the multi-touch display device 100 for manipulating the volumetric data displayed on the multi-touch display device 100 may be combined and/or composed to form sophisticated multi-touch controls that enable a user to achieve high degree of freedom manipulations of the displayed volumetric data. FIGS. 1C-1E are a sequence of diagrams of the multi-touch display device 100 that illustrate examples of multi-touch controls provided by the multi-touch display device 100 for achieving high degree of freedom manipulations of data displayed by the multi-touch display device 100.

As illustrated in the progression of the sequence of diagrams from FIG. 1C to FIG. 1D, the multi-touch display device 100 may be configured to provide multi-touch controls that enable a user to rotate the 3D volumetric data set while concurrently rotating the cutting plane 104 through the 3D volumetric data set. Referring to FIG. 1D, when the multi-touch display device 100 detects that a user has engaged the boundary 116 of the 3D view of the volumetric data set with a first finger 118 and the rotation handle 112 with a second finger 120 at the same time, the multi-touch display device 100 tracks movements by the two fingers 118 and 120 simultaneously. While the first finger 118 remains engaged with the boundary 116 of the 3D view of the volumetric data set and the second finger 120 remains engaged with the rotation handle 112, the multi-touch display device 100 rotates the volumetric data set in accordance with the path 122 traced by the first finger 118 across the multi-touch display device 100 while concurrently rotating the orientation of the cutting plane 104 in accordance with the path 122 traced by the second finger 120 across the surface of the multi-touch display device 100. In addition, while the multi-touch display device rotates the 3D volumetric data set and the cutting plane 104 concurrently, the multi-touch display device 100 also updates the 2D data displayed in the viewport 106 in substantially real-time to reflect the data currently on the surface of the cutting plane 104 within the region defined by the view frame 108.

Additionally or alternatively, as illustrated in the progression of the sequence of diagrams from FIG. 1D to FIG. 1E, the multi-touch display device 100 also may be configured to provide multi-touch controls that enable a user to rotate cutting plane 104 while concurrently translating the origin 114 of the cutting plane 104. Referring to FIG. 1E, when the multi-touch display device 100 detects that a user has engaged the rotation handle 112 with a first finger 120 and the base of the orientation widget 110 with a second finger 120 at the same time, the multi-touch display device 100 tracks movements by the two fingers 118 and 120 simultaneously. While the first finger 120 remains engaged with the rotation handle 112 and the second finger remains engaged with the base of the orientation widget 110, the multi-touch display device 100 rotates the orientation of the cutting plane 104 in accordance with the path 126 traced by the first finger 122 across the surface of the multi-touch display device 100 while translating the origin 114 of the cutting plane 104 in accordance with the path 128 traced by the second finger 120 across the surface of the multi-touch display device 100. In addition, while the multi-touch display device rotates the cutting plane 104 and concurrently translates the origin 114 of the cutting plane, the multi-touch display device 100 also updates the 2D data displayed in the viewport 106 in substantially real-time to reflect the data currently on the surface of the cutting plane 104 within the region defined by the view frame 108.

The sophisticated multi-point controls provided by the multi-touch display device for manipulating displayed data described above may be conceptualized as combinations or compositions of elemental controls that enable more basic manipulations of a 3D data set and/or a cutting plane defined through the 3D data set. To enable a better understanding of the multi-point controls described above as well as additional multi-point controls described below, a number of the elemental, building-block controls for enabling more basic manipulations now are described in isolation and, for ease of illustration, with respect to simple 3D volumes. It will be appreciated, however, that these controls and manipulations can be used to manipulate more complicated data sets including, for example, the 3D volumetric data set representing a patient's head discussed above in connection with FIGS. 1A-1E. Furthermore, while these controls have utility in isolation, the may be particularly useful when combined and/or composed as multi-point input controls.

As the following discussion of the individual controls unfolds, and as will be discussed in greater detail below, it will be noticed that each individual control may be designed and/or located to facilitate multi-touch operation through simple combinations with other controls in a manner that enables a user to intuitively navigate through a 3D data set. For example, individual controls may be located and/or scaled so as to enable a user to manipulate multiple controls simultaneously with different fingers on one hand and/or with two hands. Moreover, individual controls may be located and/or scaled such that the simultaneous operation of multiple controls does not significantly occlude the data set being manipulated.

The implementations described hereinafter set forth examples of various tools and configurations that capitalize upon multi-touch functionalities and that enhance ease of use. Yet these tools clearly are intended as being exemplary, since modifications of these tools and their look, feel, relative orientations, and interoperability are contemplated but often omitted from this written articulation to reduce the complexity of this disclosure. As such, it is intended that the controls and features described in isolation are combinable and interoperable and that the particular configurations and designs disclosed are reconfigurable.

Engaging and Operating a Control

The various different controls described herein for manipulating data displayed on a multi-touch display device enable a user to manipulate displayed data in different ways. Nevertheless, despite the different effects achieved through the operation of the different controls, there may be commonalties in engaging and operating the different controls.

Generally speaking, a multi-touch display device may determine that a control has been engaged in response to detecting the positioning of one or more fingers or other input mechanisms on designated or arbitrary points on the multi-touch display device. In some implementations, visual indications of controls may be displayed such that they are relatively transparent when not engaged, thereby minimizing interference with the data being displayed while still advertising their availability to a user. After a control has been engaged, a multi-touch display device may provide a visual or other (e.g., audible) indicia reflecting that the control is engaged. For example, if the multi-touch display device provides a relatively transparent visual manifestation of a control, the multi-touch display device may increase the opacity or otherwise modify the appearance of the visual manifestation of the control in response to determining that the control has been engaged.

While a control remains engaged by one or more fingers or other input mechanisms, the multi-touch display device may track the movements of the one or more fingers or other input mechanisms which have engaged the control. For example, the multi-touch display device may detect the positions of the one or more fingers or other input mechanisms which have engaged the control periodically and the multi-touch display device may determine that the one or more fingers or other input mechanisms have moved in response to detecting a displacement in the positions of the one or more fingers or other input mechanisms between two different sampling periods. Thereafter, in response to detecting movement by the one or more fingers or other input mechanisms between the two sampling periods, the multi-touch display device may manipulate the data displayed by the multi-touch display device as a function of the detected movement of the one or more fingers or other input mechanisms.

The multi-touch display device may track the movements of the one or more fingers or other input mechanisms which have engaged a control and update the displayed data in a discrete, stepwise fashion like this as long as the one or more fingers or other input mechanisms remain engaged with the control. Notably, in implementations where the sampling rate is high enough and the multi-touch display device's refresh rate is fast enough, a user may perceive that the multi-touch display device is updating the displayed data continuously rather than discretely in accordance with the movements of the user's fingers or other input mechanisms.

Rotating, Scaling, and Translating a 3D Object

Figure 2C:
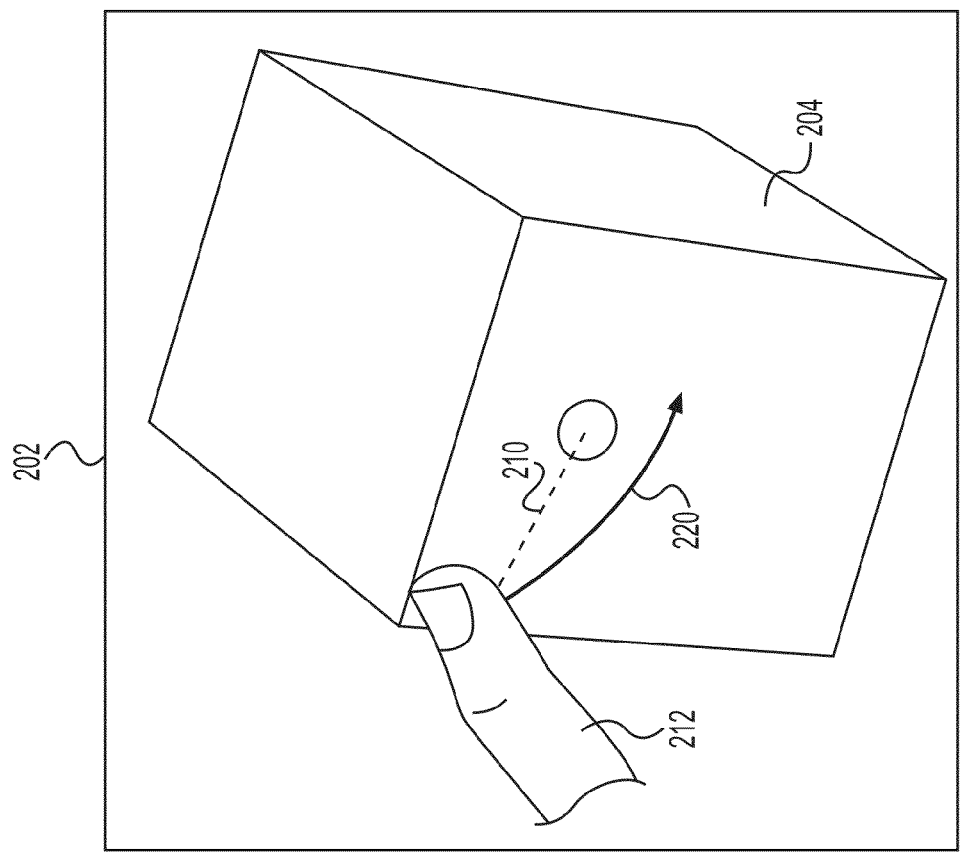

FIGS. 2A-2C are a sequence of diagrams that illustrate a multi-touch display device displaying a 3D volume and controls provided by the multi-touch display device for spherically rotating the volume around a pivot point.

Referring to FIG. 2A, a multi-touch display device 202 is displaying a 3D volume 204. In some implementations, the multi-touch display device 202 may provide a rotation widget for spherically rotating the volume 204 around a pivot point.

As illustrated in FIG. 2B, the multi-touch display device 202 may provide a rotation widget 210 represented as a vector extending away from a surface of the volume 204. The multi-touch display device is configured such that a user may engage the rotation widget 210 by touching the rotation widget 210 with a finger 212. In particular, the multi-touch display device 202 detects that the user has touched the display in the vicinity of the rotation widget 210 and interprets this as a selection of the rotation widget 210. While the user's finger 212 remains in contact with the rotation widget 210, the multi-touch display device 202 tracks movements of the user's finger 212 across the multi-touch display device and responsively rotates the volume 204 spherically around a pivot point according to the path traced by the user's finger 212 across the multi-touch display device 202. Thus, the rotation widget 210 provided by the multi-touch display device 202 enables a user to rotate the volume 204 spherically around a pivot point simply by dragging the rotation widget 210 around the multi-touch display device 202 with a finger 212.

For example, as illustrated in FIG. 2C, when the user engages the rotation widget 210 with a finger 212 and then drags the rotation widget 210 in a downward and rightward path 220, the multi-touch display device 202 detects the motion of the user's finger 212 across the path 220 and rotates the volume 204 in accordance with the path 220 traced by the user's finger 212.

Additional or alternative controls for rotating a 3D volume also may be provided by a multi-touch display device. For example, a control may be provided by a multi-touch display device for rotating a 3D volume spherically around a pivot point by engaging a point on the boundary of the display of the 3D volume with a finger and tracing a rotation path across the surface of the multi-touch display device and/or a control may be provided by a multi-touch display device for rotating a 3D volume spherically around a pivot point by engaging a point in the free space that surrounds the 3D display of the volume with a finger and tracing a rotation path across the surface of the multi-touch display device.

Rotating a Cutting Plane Defined Through a 3D Volume

A cutting plane may be defined through a 3D data set using the standard equation for a plane, which has three degrees of freedom: a normal direction as a spherical angle (two degrees of freedom) and a distance (or offset) along that normal (one degree of freedom). When a multi-touch display device displays a cutting plane defined through a 3D data set, the multi-touch display device may provide an orientation control or widget to enable a user to rotate the cutting plane spherically around a pivot point and/or to move the cutting plane back and forth along the cutting plane's normal. In some implementations, such an orientation widget is represented as a combination of (1) a normal vector and (2) a point on the normal vector that identifies where the cutting plane intersects the normal vector.

Figure 3B:
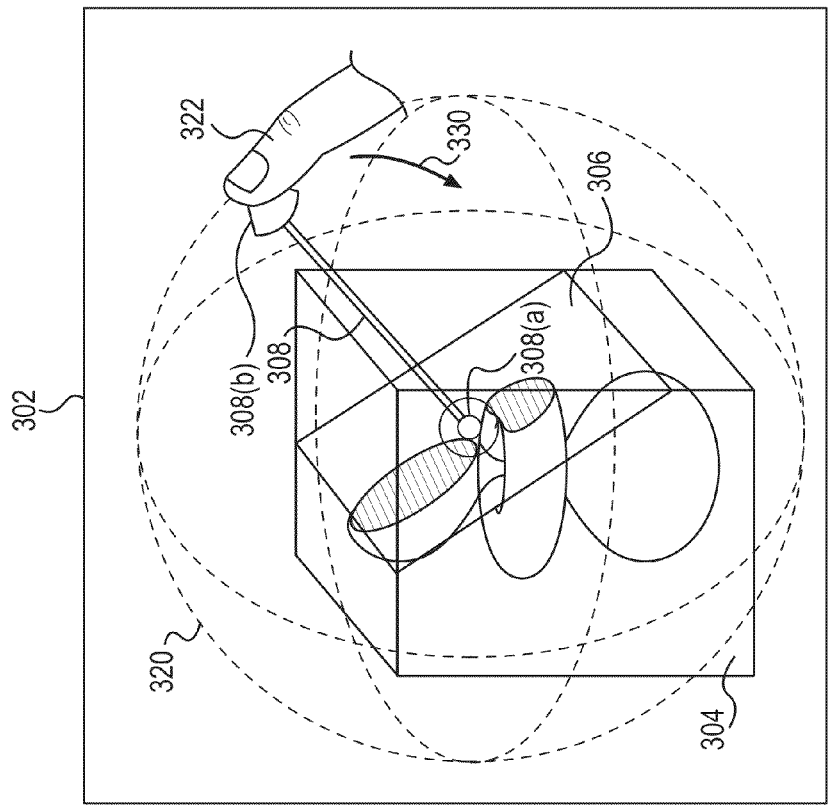
FIGS. 3A-3C are a sequence of diagrams that illustrate a multi-touch display device displaying a cutting plane defined through a 3D volume and an orientation widget provided by the multi-touch display device for rotating the cutting plane through the 3D volume spherically around a pivot point.
Figure 3A:
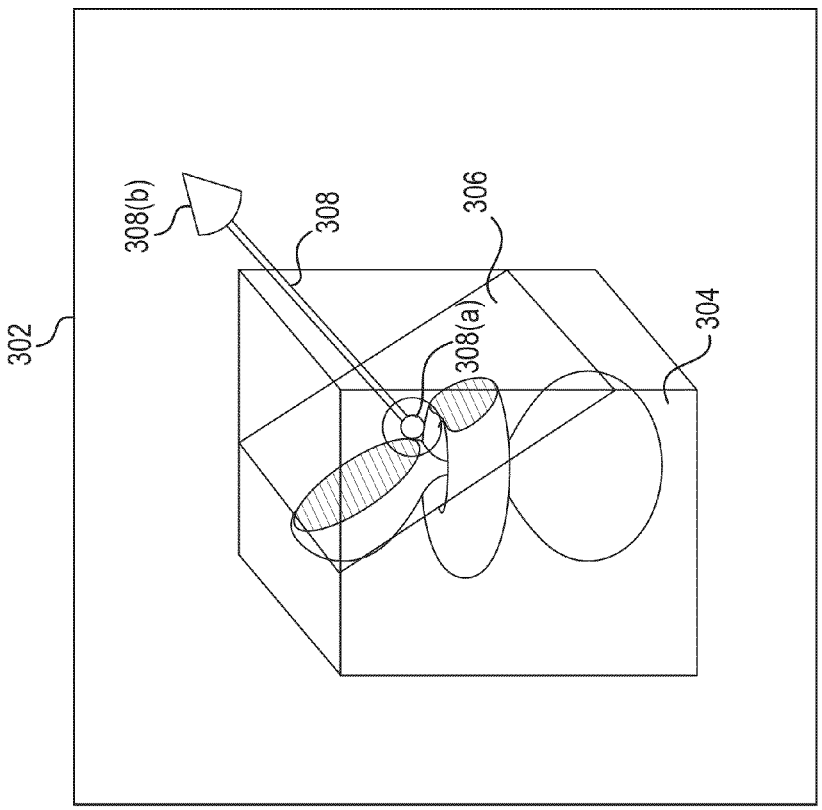
Figure 3C:
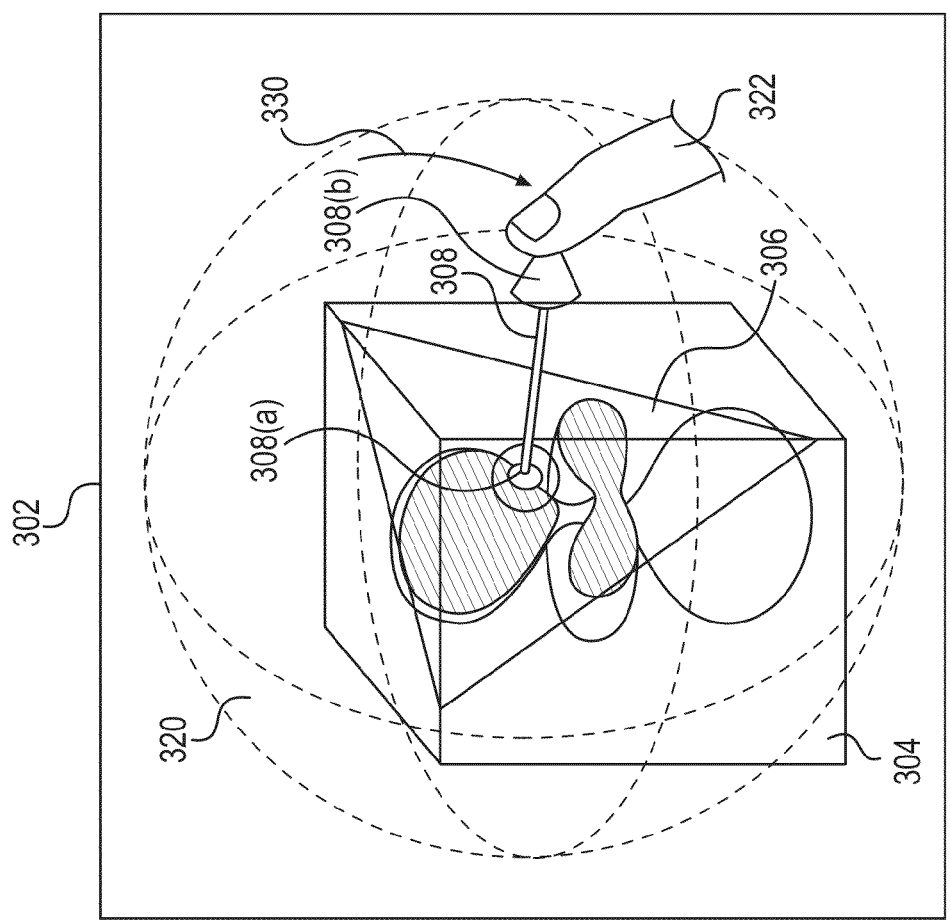

FIGS. 3A-3C are a sequence of diagrams that illustrate a multi-touch display device displaying a cutting plane defined through a 3D volume and an orientation widget provided by the multi-touch display device for rotating the cutting plane through the 3D volume spherically around a pivot point.

Referring to FIG. 3A, a multi-touch display device 302 is displaying a 3D volume 304. In addition, a cutting plane 306 is defined through the 3D volume 304 such that a section of the 3D volume 304 is cut away and not displayed. The orientation of the cutting plane 306 is indicated by an orientation widget 308 provided by the multi-touch display device 302, which is represented as a vector that intersects the origin 308(a) of the cutting plane 306 and that is normal to the cutting plane 306. An end 308(b) of the orientation widget 308 operates as a rotation handle.

As illustrated in FIG. 3B, the rotation handle 308(b) on the orientation widget 308 provided by the multi-touch display device 302 enables a user to rotate the cutting plane 306 freely around a sphere 320 centered at the origin 308(a) of the cutting plane 306. (The dashed lines used to illustrate the sphere 320 are intended to signify that, in some implementations, the sphere 320 may not be rendered on the multi-touch display device 302 but rather is understood to be defined by the origin 308(a) of the cutting plane 306.) The multi-touch display device 302 is configured to enable a user to engage the rotation handle 308(b) by touching the rotation handle 308(b) with a finger 322. While the user's finger 322 remains in contact with the rotation handle 308(b), the multi-touch display device 302 tracks movements of the user's finger 322 across the multi-touch display device 302 and responsively rotates the cutting plane 306 around the sphere 320 according to the path traced by the user's finger 322 across the surface of the sphere 320. Thus, the rotation handle 308(b) enables a user to rotate the cutting plane 306 freely around the sphere 320 by dragging the rotation handle 308(b) around the surface of the multi-touch display device 302 with a finger 322.

For example, as illustrated in FIG. 3C, when the user engages the rotation handle 308(b) with a finger 322 and then drags the rotation handle 308(b) in a downward and leftward path 330 across the surface of the sphere 320, the multi-touch display device 302 detects the motion of the user's finger 322 across the path 330 and rotates the cutting plane 306 in accordance with the path 330 traced by the user's finger 322. Notably, as illustrated in FIGS. 3A-3B, the location of the rotation handle 308(b) on the end of a vector that is normal to the cutting plane 306 enables a user to use the rotation handle 308(b) to rotate the cutting plane 306 through the 3D volume 304 without blocking the data that is displayed in the cutting plane 306 with the user's hand.

In some implementations, pre-defined or canonical cutting plane orientations may be established for a data set. For example, in the case of a 3D volumetric data set produced by performing a CT scan of a patient's head, axial, sagittal, and coronal orientations may be pre-defined for the cutting plane. In such implementations, the multi-touch display device may provide a set of "snap-to" points, axes, and/or view frames representing the pre-defined cutting plane orientations. When the rotation handle is activated and a second finger touches one of the pre-defined "snap-to" points, axes, or view frames (or touches within a threshold distance of one of the pre-defined "snap-to" points, axes, or view frames), the multi-touch display device may immediately and automatically transition the orientation of the cutting plane to the pre-defined orientation corresponding to the selected "snap-to" point, axis, or view frame, without requiring the user to drag the orientation handle to the selected "snap-to" point, axis, or view frame. Additionally or alternatively, a compound model also may define localized "snap-to points" if the origin of the cutting plane is located within a specific feature or subassembly (e.g., along the central axis of a wheel).

FIGS. 4A-4D are a sequence of diagrams that illustrate a multi-touch display device displaying a cutting plane defined through a visual representation of a 3D object, an orientation widget provided by the multi-touch display device for rotating the cutting plane through the 3D object spherically around a pivot point, and "snap-to" points provided by the multi-touch display device that enable the cutting plane to be transitioned immediately and automatically to certain pre-defined cutting plane orientations.

Figure 4B:
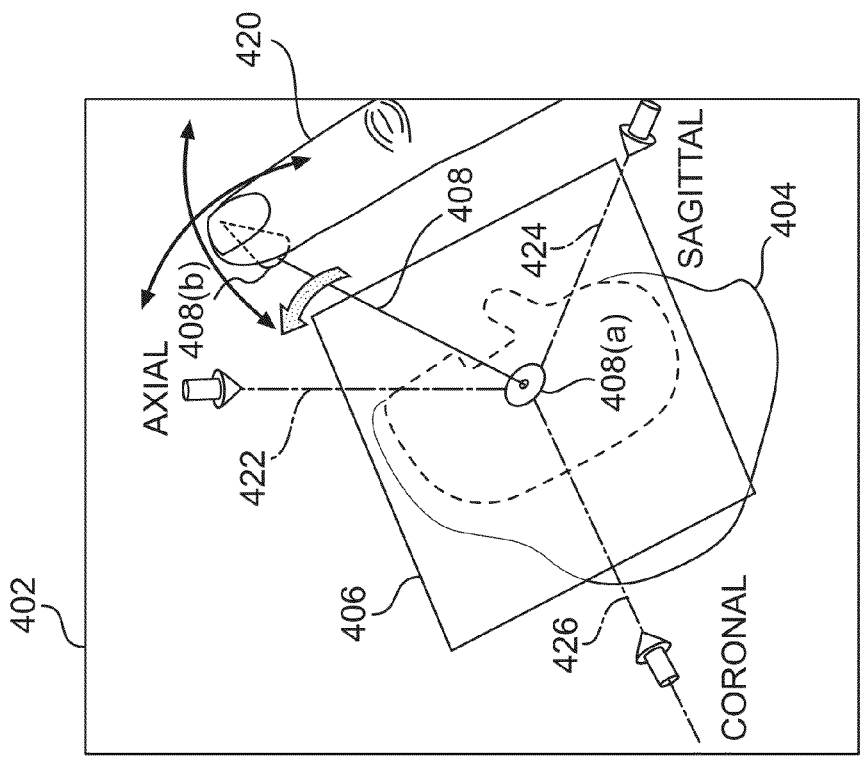
FIGS. 4A-4D are a sequence of diagrams that illustrate a multi-touch display device displaying a cutting plane defined through a visual representation of a 3D object, an orientation widget provided by the multi-touch display device for rotating the cutting plane through the 3D object spherically around a pivot point, and "snap-to" points provided by the multi-touch display device that enable the cutting plane to be transitioned immediately and automatically to certain pre-defined cutting plane orientations.
Figure 4A:
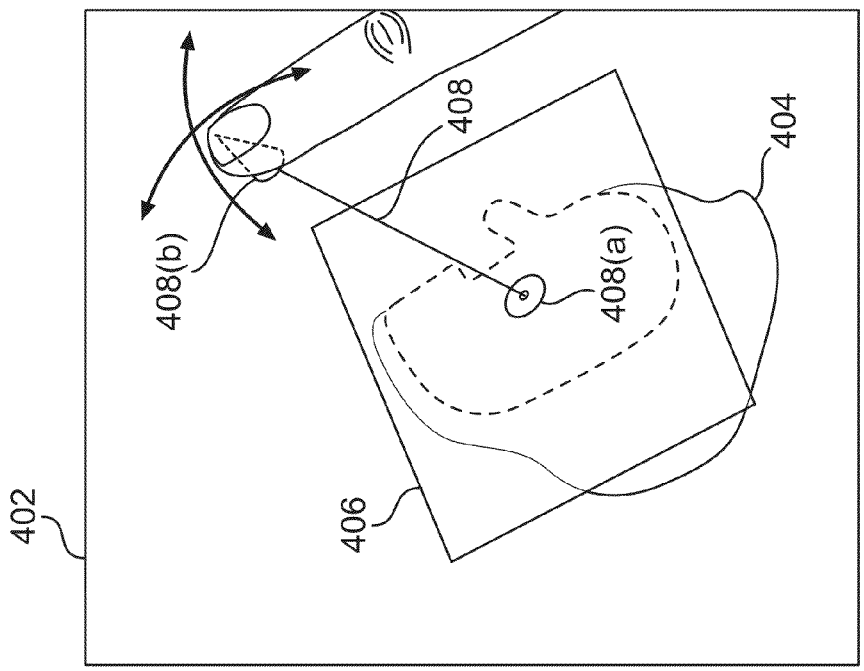

FIG. 4A illustrates a multi-touch display device 402 displaying a 3D object 404. In addition, a cutting plane 406 is defined through the 3D object 404 such that a section of the 3D object 402 is cut away and not displayed. The multi-touch display device 402 provides an orientation widget 408 that extends from the origin 408(a) of the cutting plane 406 and that includes a rotation handle 408(b) that enables a user to rotate the cutting plane 406 freely around a sphere centered at the origin 408(a) of the cutting plane 406. Pre-defined cutting plane orientations, for example axial, sagittal, and coronal views, of the 3D object may be established.

Referring to FIG. 4B, when the multi-touch display device 402 detects that a user has engaged the rotation handle 408(b) by touching the rotation handle 408(b) with a first finger 420, the multi-touch display device 402 displays axial, sagittal, and coronal "snap-to" axes 422, 424, and 426, which correspond to the predefined axial, sagittal, and coronal views of the 3D object 404, respectively. In some implementations, the "snap-to" axes provided by the multi-touch display device 402 enable a user to automatically and immediately transition the orientation of the cutting plane 406 to one of the pre-defined axial, sagittal, or coronal views without dragging the rotation handle 408(b) all the way to one of the axes. Rather, the "snap-to" axes provided by the multi-touch display device 402 enable a user to automatically and immediately transition the orientation of the cutting plane 406 to one of the pre-defined views merely by touching the "snap-to" axis corresponding to the desired pre-defined view with a second finger while continuing to engage the rotation handle 408(b) with the first finger 420. Additionally or alternatively, the multi-touch display device 402 may be configured to enable a user to automatically and immediately transition to one of the predefined axial, sagittal, or coronal views without dragging the rotation handle 408(b) all the way to one of the axes by touching a defined "snap-to" point along the axis corresponding to the desired pre-defined view with a second finger while continuing to engage the rotation handle 408(b) with the first finger 420.

Figure 4D:
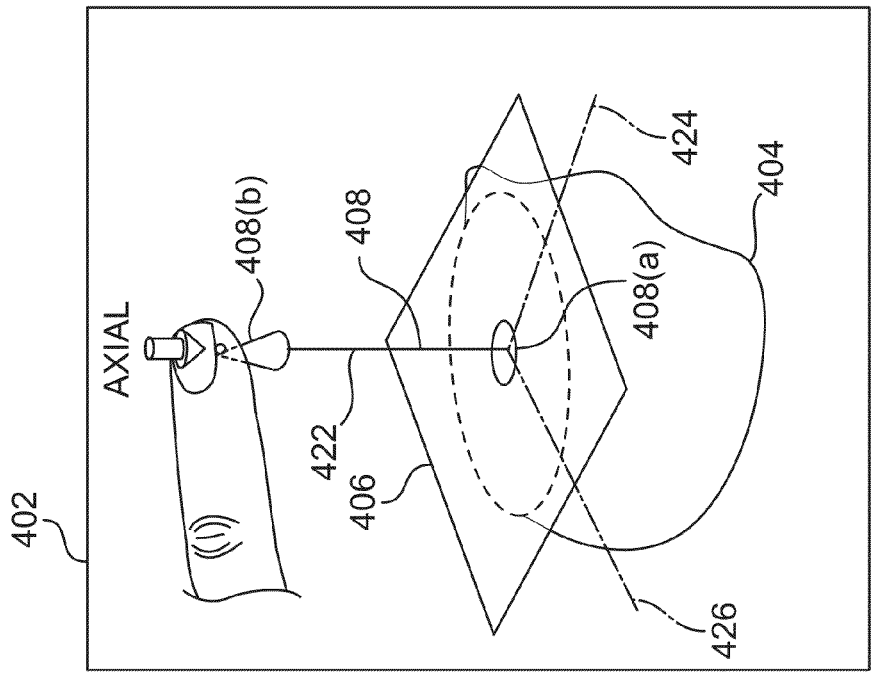
Figure 4C:
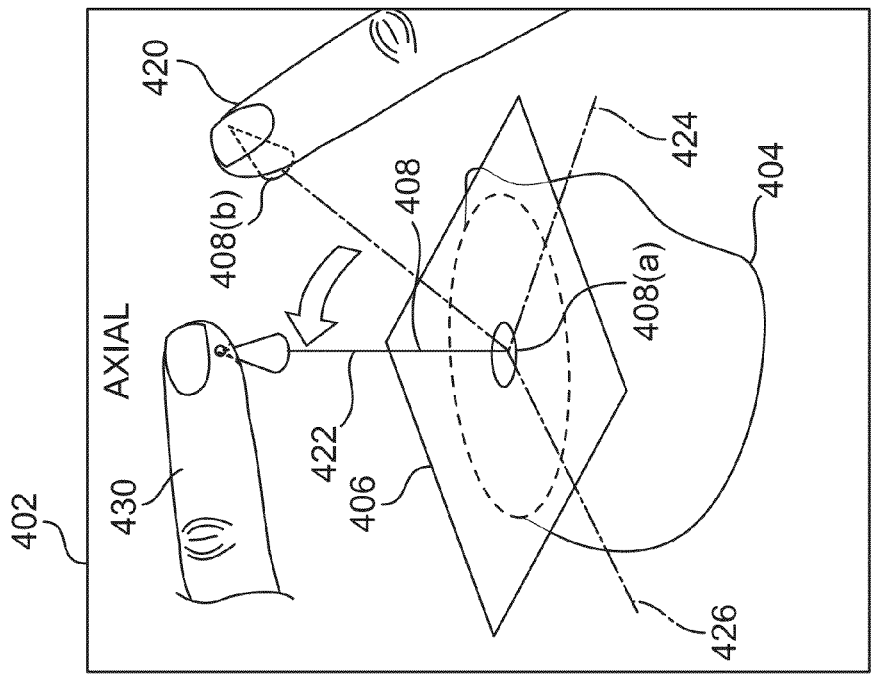

For example, as illustrated in FIGS. 4C and 4D, when the user engages the rotation handle 408(b) with a finger 420 and then touches the axial "snap-to" axis 422 with another finger 430, the multi-touch display device 402 automatically and immediately transitions the orientation of the cutting plane 406 to the axial view of the data set without the user having to drag the rotation handle 408(b) all the way to the axial "snap-to" axis 422. The effect is that the orientation of the cutting plane 406 appears to "snap" to the axial view of the data set from whatever orientation it had been before the user touched the axial "snap-to" axis 422 with the user's second finger 430.

The "snap-to" controls for quickly transitioning the orientation of a cutting plane to a desired view of a data set illustrated in FIGS. 4A-4D are examples of multi-point controls that enable a user to perform sophisticated manipulations to a data set without obstructing the display of the data set. Furthermore, these "snap-to" controls are scaled so as to enable convenient operation with two hands, or, in some cases, multiple fingers of the same hand.

Various other controls for rotating a cutting plane through a 3D data set also may be provided by a multi-touch display device in addition to or as an alternative to the rotation handle 308(b) illustrated in FIGS. 3A-3B and the rotation handle 408(b) and the "snap-to" axes 422, 424, and 426 illustrated in FIGS. 4A-4D. For example, as discussed below in connection with FIGS. 5A-5C, one or more points on a cutting plane may be defined as rotation handles in addition to or as an alternative to providing a rotation handle on the normal vector. Additionally or alternatively, as discussed in connection with FIGS. 6A-6C, in implementations where a multi-touch display device is capable of sensing pressure applied to the surface of the multi-touch display device, varying amounts of pressure applied to different points on the surface of the cutting plane may be interpreted as tilt cues for tilting the cutting plane through an axis defined by the cutting plane's origin.

Figure 5B:
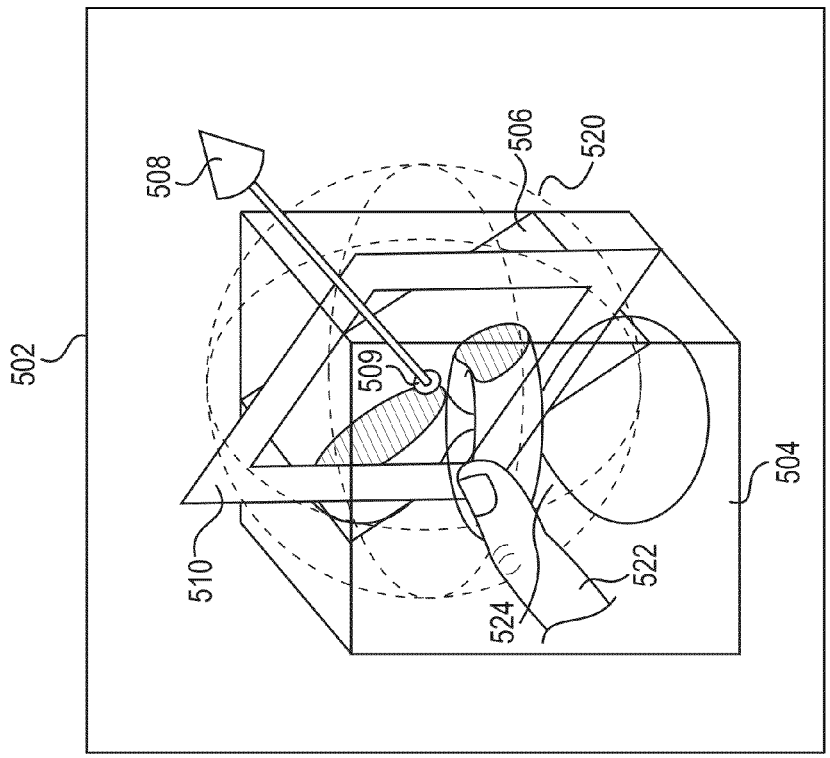
Figure 5A:
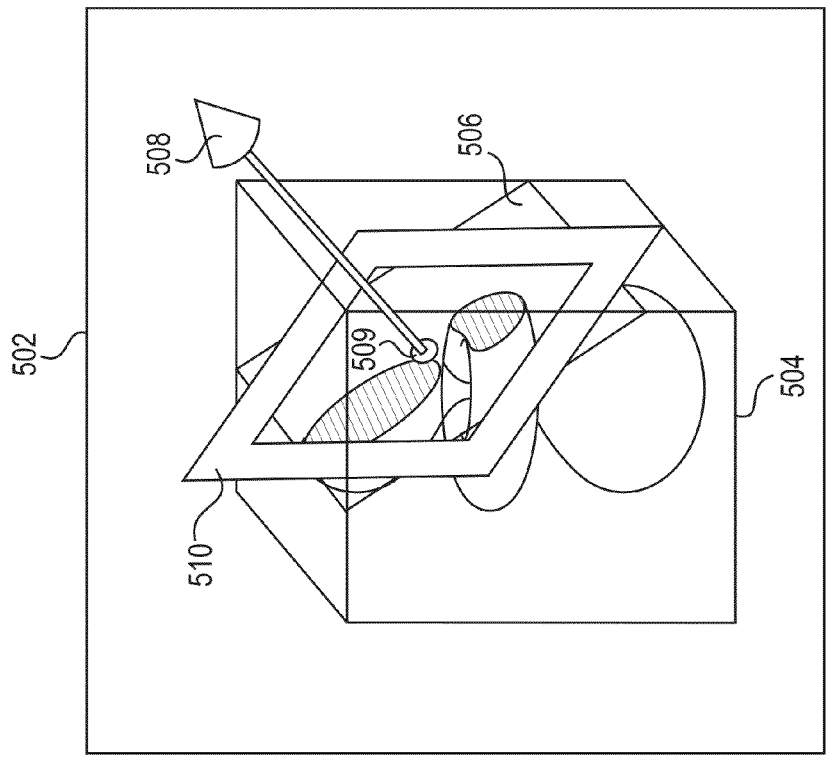

FIGS. 5A-5C are a sequence of diagrams that illustrate a multi-touch display device displaying a cutting plane defined through a 3D volume and a rotation handle provided by the multi-touch display device for rotating the cutting plane through the 3D volume spherically around a pivot point.

Referring to FIG. 5A, a multi-touch display device 502 is displaying a 3D volume 504. In addition, a cutting plane 506 is defined through the 3D volume 504 such that a section of the 3D volume 504 is cut away and not displayed. The orientation of the cutting plane 506 is indicated by a normal vector 508 extending from the origin 509 of the cutting plane 506. In addition, the multi-touch display device 502 has superimposed a view frame 510 over the surface of the cutting plane 510. As discussed above in connection with FIGS. 1A-1E, in some implementations, the view frame 510 may define the region of the data set that is displayed simultaneously in a 2D viewport on the multi-touch display device 502. In other implementations, the view frame 510 may serve simply as a rotation handle for rotating the cutting plane 506 spherically around the cutting plane's origin 509.

As illustrated in FIG. 5B, the view frame 510 provided by the multi-touch display device 502 enables a user to rotate the cutting plane 506 freely around a sphere 520 centered at the origin 509 of the cutting plane 506. (The dashed lines used to illustrate the sphere 520 are intended to signify that, in some implementations, the sphere 520 may not be rendered on the multi-touch display device 502 but rather is understood to be defined by the origin 509 of the cutting plane 506). The multi-touch display device 502 is configured to enable a user to engage the view frame 510 by touching the view frame 510 with a finger 522. While the user's finger 522 remains in contact with the view frame 510, the multi-touch display device 502 tracks movements of the user's finger 522 across the multi-touch display device 502 and responsively rotates the cutting plane 506 around the sphere 520 according to the path traced by the user's finger 522 across the surface of the sphere 520. Thus, the view frame 510 enables a user to rotate the cutting plane 506 freely around the sphere 520 by dragging the view frame 522 around the surface of the multi-touch display device 502 with a finger 522.

For example, as illustrated in the progression of the sequence of diagrams from FIG. 5B to FIG. 5C, when the user engages the view frame 510 with a finger 522 and then drags the view frame 510 in a downward and leftward path 524 across the surface of the sphere 520, the multi-touch display device 504 detects the motion of the user's finger 522 across the path 524 and rotates the cutting plane 506 in accordance with the path 524 traced by the user's finger 522.

In some implementations, the multi-touch display device may not superimpose a visible view frame on the surface of a cutting plane, but the multi-touch display device still may enable a user to rotate the cutting plane around the cutting plane's origin by engaging one or more points on the surface of the cutting plane with the user's fingers and dragging the cutting plane to the desired orientation. In some cases, enabling a user to rotate a cutting plane by engaging one or more points on the surface of the cutting plane rather than a rotation handle on the normal vector may reduce the portion of the display of the data set that is obstructed from view while the manipulation is performed.

Figure 6B:
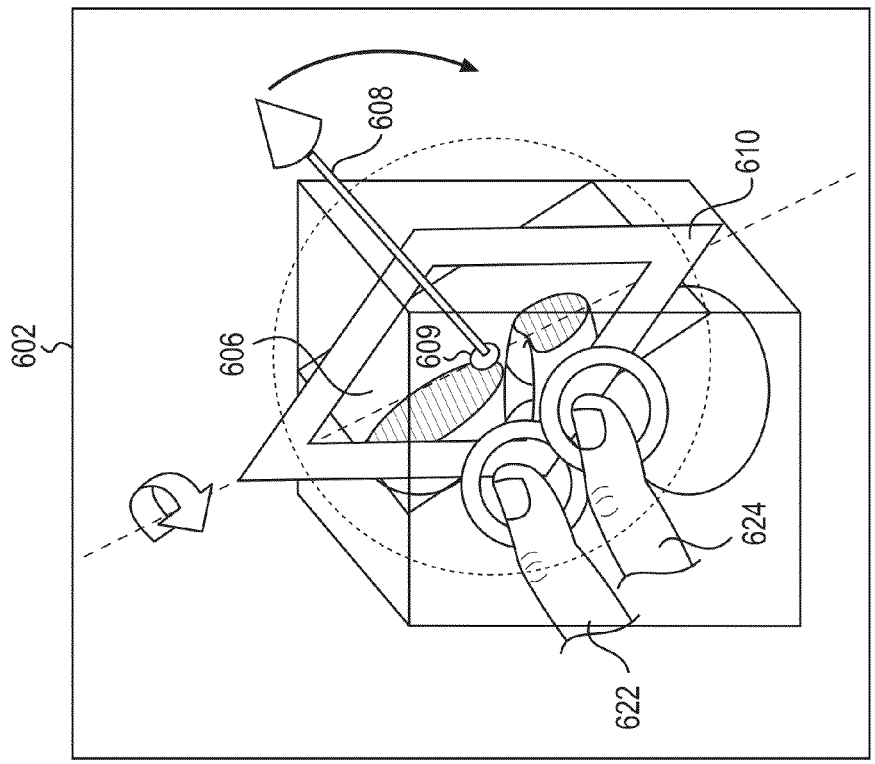
FIGS. 6A-6C are a sequence of diagrams that illustrate a multi-touch display device displaying a cutting plane defined through a 3D volume and tilt controls provided by the multi-touch display device for tilting the cutting plane through the 3D volume.
Figure 6A:
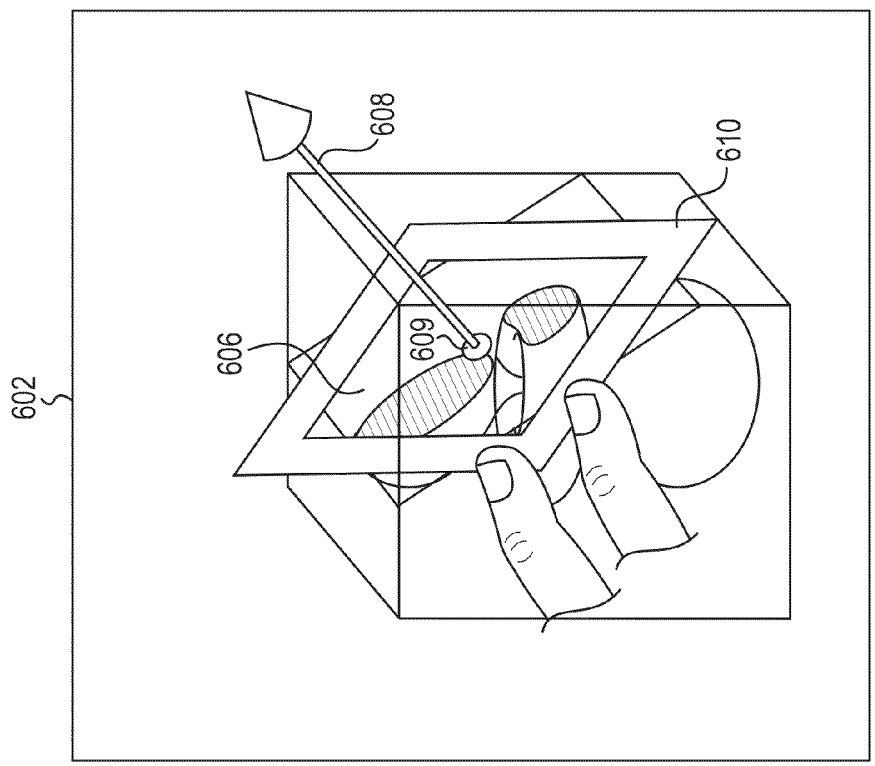
Figure 6C:
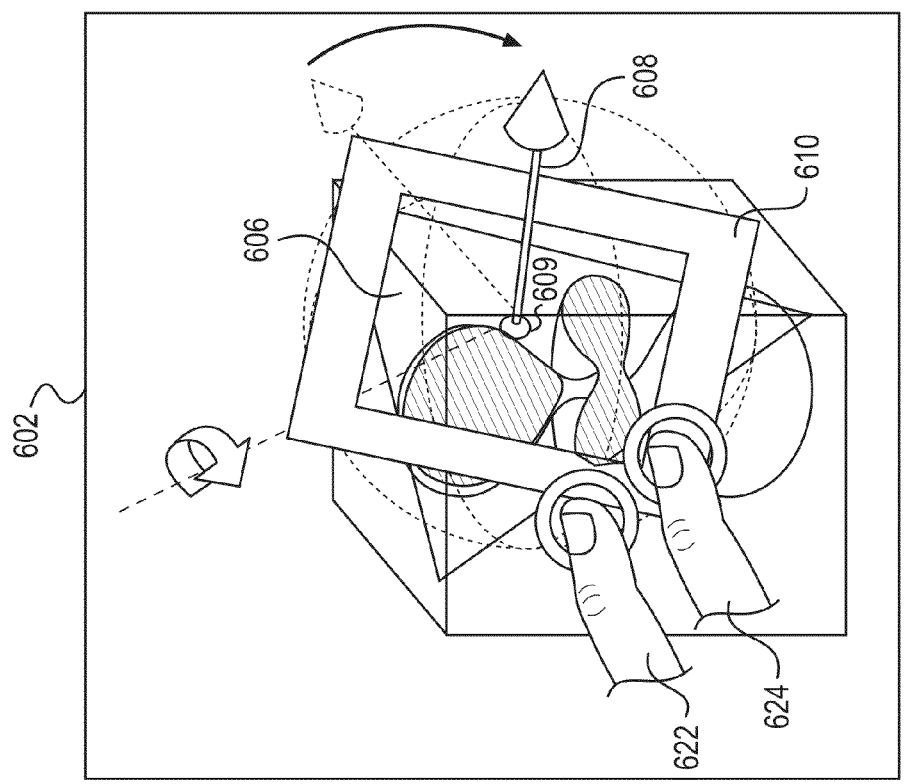

FIGS. 6A-6C are a sequence of diagrams that illustrate a multi-touch display device displaying a cutting plane defined through a 3D volume and tilt controls provided by the multi-touch display device for tilting the cutting plane through the 3D volume.

Referring to FIG. 6A, a multi-touch display device 602 is displaying a 3D volume 604. In addition, a cutting plane 606 is defined through the 3D volume 604 such that a section of the 3D volume 604 is cut away and not displayed. The orientation of the cutting plane 606 is indicated by normal vector 608 extending from the origin 609 of the cutting plane 606. In addition, the multi-touch display device 602 has superimposed a view frame 610 over the surface of the cutting plane 606. As illustrated in FIG. 6B, the view frame 610 provided by the multi-touch display device 602 enables a user to tilt the cutting plane 606. In particular, the multi-touch display device 602 is configured to enable a user to engage the view frame 610 by touching the view frame 610 with one or more fingers. As illustrated in FIG. 6B, the user has engaged the view frame 610 with two fingers 622 and 624. The user then may cause the multi-touch display device 602 to tilt the cutting plane 610 by applying a desired amount of pressure with the user's fingers 622 and 624 to the surface of the multi-touch display device 602 at the contact points on the view frame 610. As will be appreciated, the pressure applied by each finger 622 and 624 may be substantially the same or the pressure applied by each finger may be substantially different. In any event, the multi-touch display device 602 senses the pressure applied by the user's fingers 622 and 624 to the contact points on the view frame 610 and tilts the cutting plane 606 about an axis as a function of the pressure applied by the user's fingers 622 and 624 to the contact points on the view frame 610. In some implementations, the multi-touch display device 602 may be configured to sense pressure applied to the surface of the multi-touch display device 602. In other implementations, the multi-touch display device 602 may detect the displacement of the surface of the multi-touch display device 602 as a surrogate for sensing pressure.

For example, as illustrated by the progression of the sequence of diagrams from FIG. 6B to FIG. 6C, when the user engages the view frame 610 with two fingers 622 and 624 and applies pressure to the view frame 610 with the two fingers 622 and 624, the multi-touch display device 602 senses the amount of pressure applied by the user's two fingers 622 and 624 and tilts the orientation of the cutting plane 606 around an axis defined through the cutting plane's origin 609 as a function of the sensed amount of pressure applied by the user's two fingers 622 and 624.

In some implementations, a multi-touch display device may not superimpose a visible view frame on the surface of a cutting plane, but the multi-touch display device still may enable a user to tilt the cutting plane about an axis defined through the cutting plane's origin by engaging one or more points on the surface of the cutting plane with the user's fingers and applying pressure to the engaged points. Furthermore, implementations may allow the user to engage any number of points on the surface of the cutting plane with the user's fingers and rotate the cutting plane by applying pressure to the engaged points on the cutting plane.

In some applications, it may be desirable to limit the rotation of a cutting plane to cylindrical rotation around an arbitrary axis on the cutting plane instead of allowing spherical rotation around the cutting plane's origin. For example, such constrained cylindrical rotation may be useful for rotating a cutting plane around axes of radially symmetric features of a data set, especially when those axes are not aligned in a principal direction.

Figure 7:
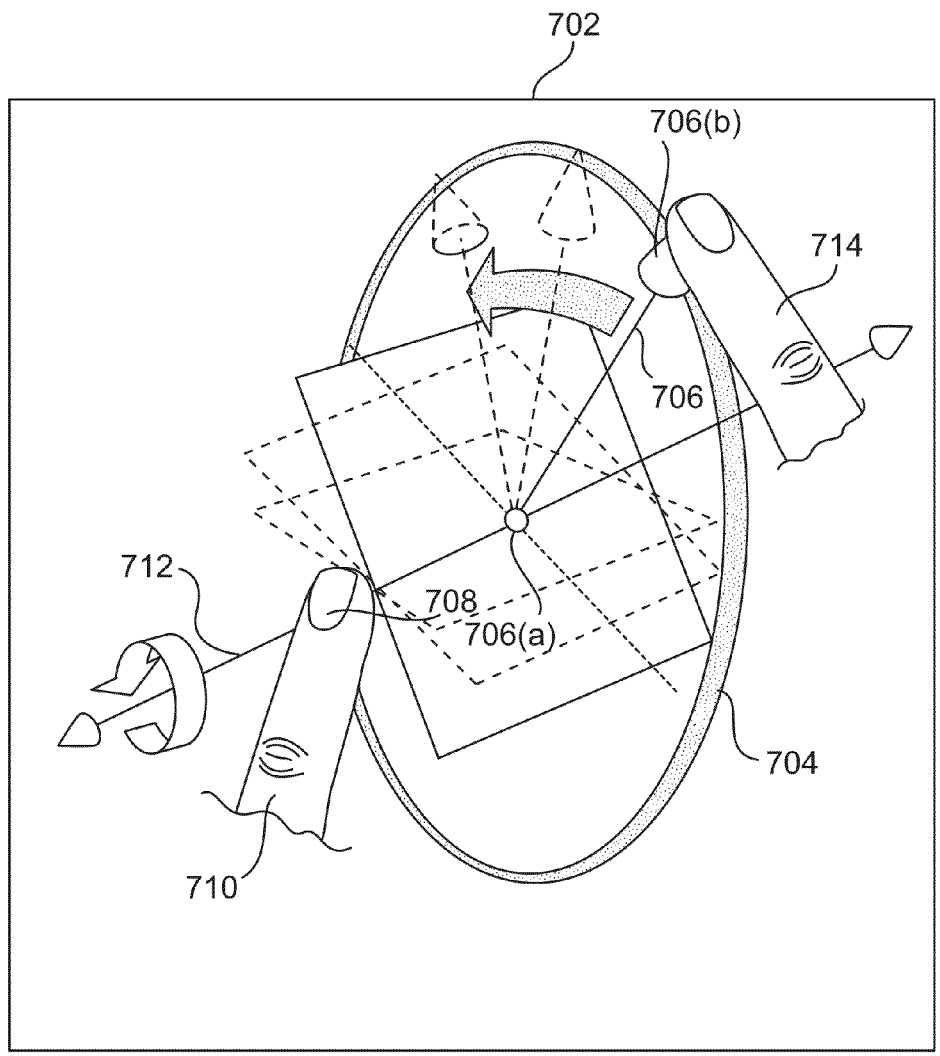
FIG. 7 is a diagram that illustrates a multi-touch display device displaying a cutting plane and multi-point controls provided by the multi-touch display device for cylindrically rotating the cutting plane around an arbitrary axis of the cutting plane.

FIG. 7 is a diagram that illustrates a multi-touch display device 702 displaying a cutting plane 704 and multi-point controls provided by the multi-touch display device 702 for cylindrically rotating the cutting plane 704 around an arbitrary axis of the cutting plane 704. For ease of illustration, the cutting plane 704 is illustrated in isolation. Nevertheless, it will be appreciated that the cutting plane 704 may be defined through a 3D data set and that the multi-touch controls provided by the multi-touch display device 702 for cylindrically rotating the cutting plane 704 around an arbitrary axis of the cutting plane 702 may be used to rotate the cutting plane 704 through a 3D data set.

As illustrated in FIG. 7, the multi-touch display device 702 provides an orientation widget 706 for manipulating the orientation of the cutting plane 704. The orientation widget 706 is represented as a vector that intersects the cutting plane 704 at the cutting plane's origin 706(a) and that is normal to the cutting plane 704. An end 706(b) of the orientation widget 706 operates as a rotation handle that rotates the cutting plane 704 spherically around the origin 706(a) of the cutting plane 704 in response to actuation by a user.

The multi-touch display device 702 allows a user to define an arbitrary axis around which to rotate the cutting plane 704 cylindrically by touching a point on the cutting plane 704 with a finger 710. In response to detecting that the user's finger 710 is touching the point 708, the multi-touch display device 702 defines a rotation axis 712 that extends through both the origin 706(a) and the contact point 708 defined by the user's finger 710. While the user continues to engage the contact point 708 with one finger 710, the multi-touch display device 702 rotates the cutting plane 704 cylindrically around the rotation axis 712 defined by the origin 706(a) and the contact point 708 in response to the user engaging and dragging the rotation handle 706(b) with a second finger 714.

Manipulating "Depth" of a Cutting Plane Defined Through a 3D Object

As described above, a cutting plane defined through a 3D data set using the standard equation for a plane has three degrees of freedom: a normal direction as a spherical angle (two degrees of freedom) and a distance (or offset) along that normal (1 degree of freedom). Various controls for manipulating the spherical angle of the normal of a cutting plane on a multi-touch display device were presented above. The below discussion presents various controls provided by a multi-touch display device for manipulating the distance (or offset) of the cutting plane along the cutting plane's normal. For ease of discussion, the distance (or offset) of the cutting plane along the cutting plane's normal may be referred to as the "depth" of the cutting plane. The ability to manipulate the depth of a cutting plane within a 3D data set enables inspection of different slices of the data set at various different depths.

In some implementations, a multi-touch display device incorporates a control for manipulating the depth of a cutting plane within a 3D data set within an orientation widget (e.g., the orientation widget 308 illustrated in FIGS. 3A-3C and/or the orientation widget 408 illustrated in FIGS. 4A-4C) that also enables a user to rotate the cutting plane spherically about a pivot point.

Figure 8B:
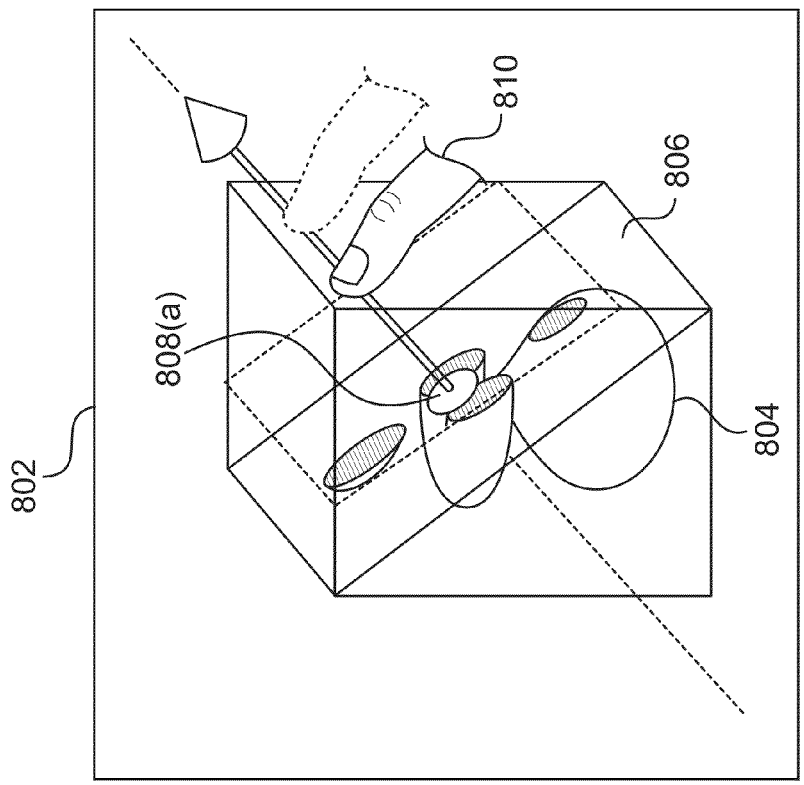
FIGS. 8A-8B are a sequence of diagrams that illustrate a multi-touch display device displaying a cutting plane defined through a 3D volume and an orientation widget provided by the multi-touch display device for manipulating the depth of the cutting plane within the 3D volume.
Figure 8A:
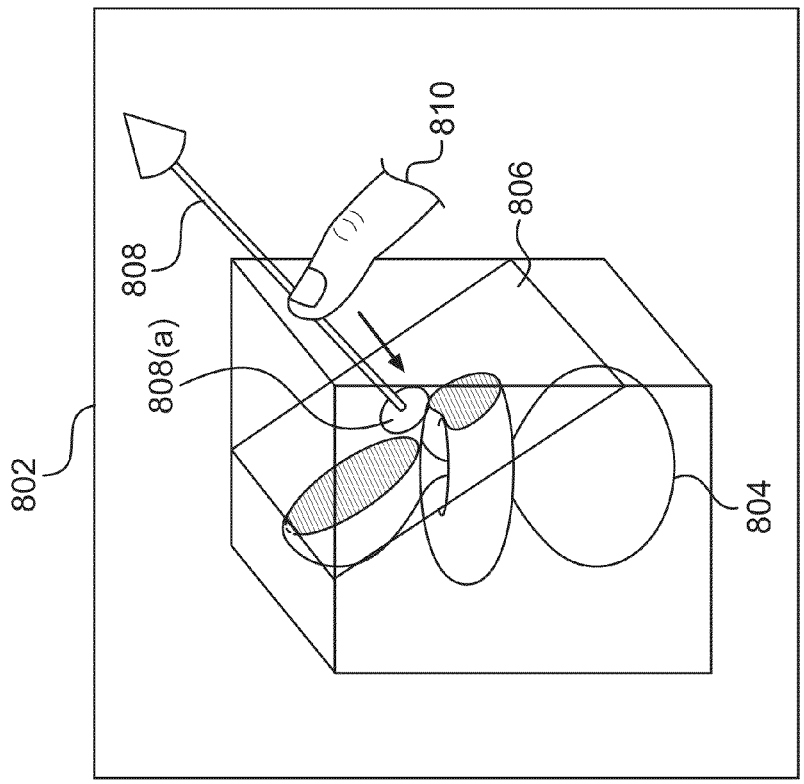

FIGS. 8A-8B are a sequence of diagrams that illustrate a multi-touch display device displaying a cutting plane defined through a 3D volume and an orientation widget provided by the multi-touch display device for manipulating the depth of the cutting plane within the 3D volume.

Referring to FIG. 8A, a multi-touch display device 802 is displaying a 3D volume 804. In addition, a cutting plane 806 is defined through the 3D volume 804 such that a section of the 3D volume 804 is cut away and not displayed. The multi-touch display device 802 indicates the orientation of the cutting plane 806 by providing an orientation widget 808, which is represented as a vector that intersects the origin 808(a) of the cutting plane 806 and that is normal to the cutting plane 806. The orientation widget 808 provided by the multi-touch display device 802 enables a user to manipulate the depth of the cutting plane 806 by establishing a control contact on the orientation widget 808 by touching the shaft of the orientation widget 808 with a finger 810 and sliding the finger 810 back and forth along the shaft of the orientation widget 808. In particular, the user can increase the depth of the cutting plane 806 within the 3D volume 804 by sliding the user's finger 810 into the visual display of the 3D volume 804 along the shaft of the orientation widget 808 and the user can decrease the depth of the cutting plane 806 within the 3D volume 804 by sliding the user's finger 810 out of the visual display of the 3D volume 804 along the shaft of the orientation widget 808. In some implementations, the multi-touch display device 802 may be configured to manipulate the depth of the cutting plane 806 as a function of the distance traversed by a user's finger 810 along the shaft of the orientation widget 808. In the event that the user contacts the shaft of the orientation widget 808 with more than one finger, the multi-touch display device 802 may calculate the average of the distances traveled by the multiple fingers along the shaft and manipulate the depth of the cutting plane 806 as a function of the calculated average.

As illustrated by the progression of the sequence of diagrams from FIG. 8A to FIG. 8B, when the user touches the shaft of the orientation widget 808 with a finger 810 and then slides the user's finger 810 into the 3D volume 804 along the shaft of the orientation widget 808, the multi-touch display device 802 detects the movement of the finger 810 along the shaft of the orientation widget 808 and increases the depth of the cutting plane to reveal a slice of the data set located deeper within the 3D volume 804 than the slice of the data set previously displayed.

In some implementations, an orientation widget may be provided by a multi-touch display device that enables a user to manipulate the depth of a cutting plane by touching the orientation widget anywhere along the shaft of the orientation widget. In alternative implementations, a depth handle may be pre-defined at a certain point along the shaft of the orientation widget such that the depth of the cutting plane is manipulated by touching and sliding the pre-defined depth handle.

Various other controls for manipulating the depth of a cutting plane within a 3D data set also may be provided by a multi-touch display device in addition to or as an alternative to the orientation widget 808 described above in connection with FIGS. 8A-8B. In some implementations, a control may be provided by a multi-touch display device that enables a user to manipulate the depth of a cutting plane within a 3D data set by touching two different points on the surface of the cutting plane and then adjusting the scale between the two different contact points.

For example, when a user contacts two different points on the surface of a cutting plane and pinches (i.e., contracts) the two contact points together, the multi-touch display device may detect the movement of the user's fingers and increase the depth of the cutting plane in the 3D data set in response. That is to say, the cutting plane may be moved in the negative direction along the cutting plane's normal. In contrast, when a user contacts two different points on the surface of a cutting plane and expands the distance between the two contact points, the multi-touch display device may detect the movement of the user's fingers and decrease the depth of the cutting plane in the 3D data set in response. That is to say, the cutting plane may be moved in the positive direction along the cutting plane's normal. In some implementations, the multi-touch display device also may control the velocity with which the depth of the cutting plane is manipulated as a function of the distance between contact points defined by two fingers. These manipulations for controlling the depth of the cutting plane may minimize interference with displayed data while the depth of the cutting plane is controlled.

Figure 9B:
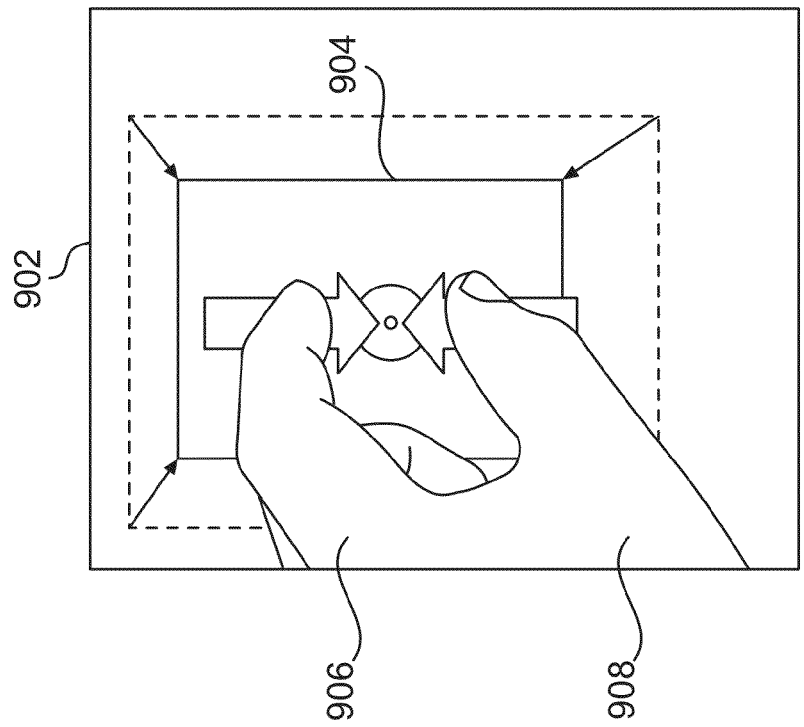
FIGS. 9A-9C are a sequence of diagrams that illustrate a multi-touch display device displaying a cutting plane and multi-touch controls provided by the multi-touch display device for manipulating the depth of the cutting plane by adjusting the scale between two points on the surface of the cutting plane when the cutting plane is oriented to provide a perspective view of the cutting plane.
Figure 9A:
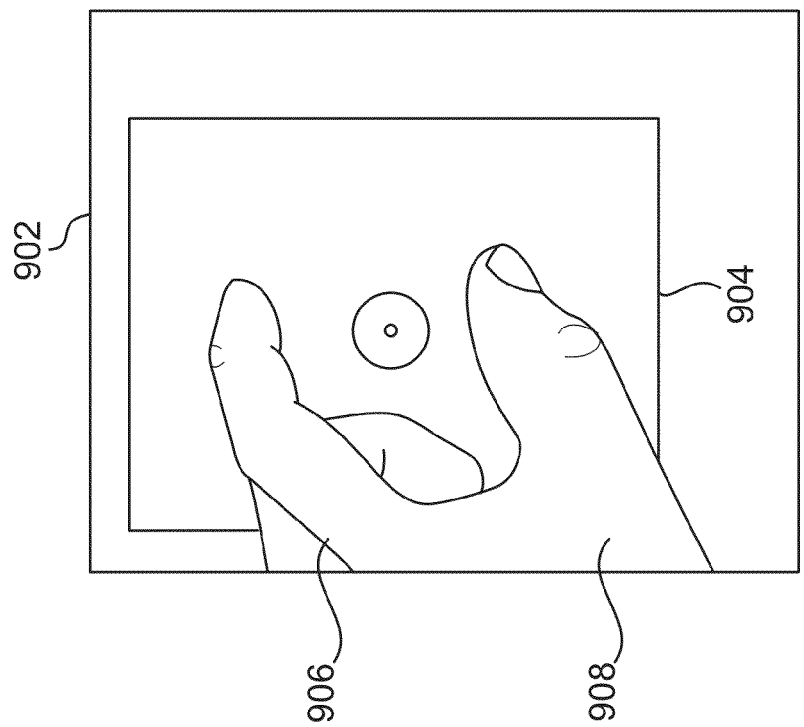
Figure 9C:
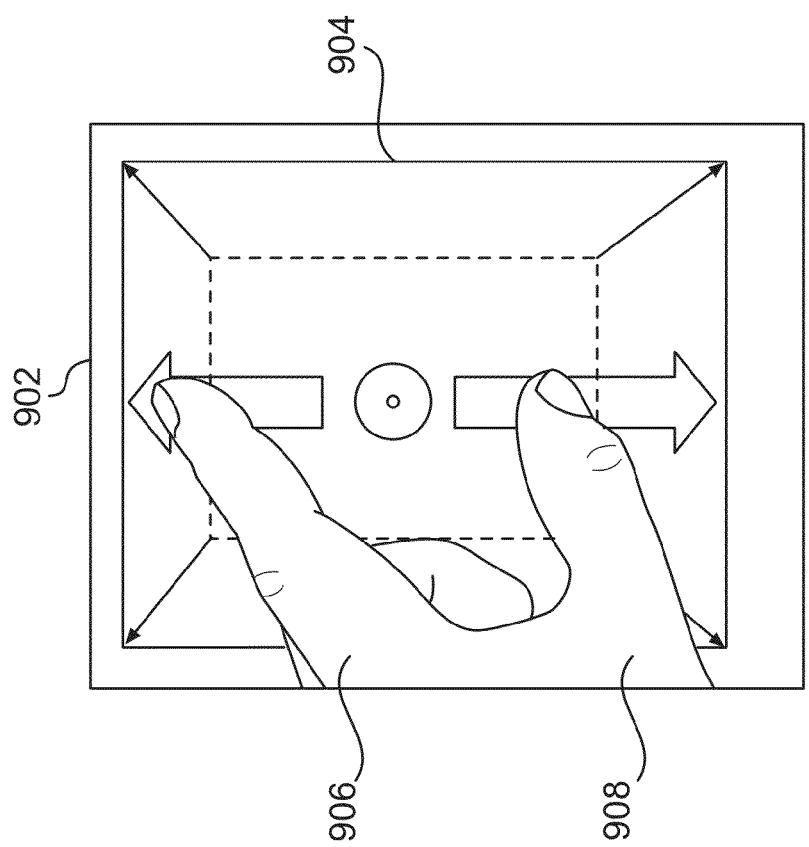

FIGS. 9A-9C are a sequence of diagrams that illustrate a multi-touch display device displaying a cutting plane and multi-touch controls provided by the multi-touch display device for manipulating the depth of the cutting plane by adjusting the scale between two points on the surface of the cutting plane when the cutting plane is oriented to provide a perspective view of the cutting plane. For ease of illustration, the cutting plane is illustrated in isolation. Nevertheless, it will be appreciated that the cutting plane may be defined through a 3D data set and that the described multi-point controls for manipulating the depth of the cutting plane may be used to manipulate the depth of the cutting plane within the 3D data set.

Referring to FIG. 9A, a multi-touch display device 902 is displaying a cutting plane 904 with an orientation that provides a perspective view of the cutting plane. As illustrated by the progression of the sequence of diagrams from FIG. 9A to FIG. 9B, the multi-touch display device 902 provides multi-touch controls that enable a user to increase the depth of the cutting plane 904 (i.e., push the cutting plane further into the multi-touch display device 902) by touching two points on the surface of the cutting plane 904 with two different fingers 906 and 908 and then contracting the two contact points together. Referring to FIG. 9B, in response to detecting that the user touched two points on the surface of the cutting plane 904 and then contracted the two points, the multi-touch display device 902 increased the depth of the cutting plane 904. In contrast, as illustrated by the progression of the sequence of diagrams from FIG. 9A to FIG. 9C, the multi-touch display device 902 provides multi-touch controls that enable a user to decrease the depth of the cutting plane 902 (i.e., draw the cutting plane closer to the user) by touching two points on the surface of the cutting plane 902 with two different fingers 906 and 908 and then expanding the distance between the two contact points. Referring to FIG. 9C, in response to detecting that the user touched two points on the surface of the cutting plane 904 and then expanded the two points, the multi-touch display device 902 decreased the depth of the cutting plane 904. In some implementations, the multi-touch display device 902 may manipulate the depth of the cutting plane 904 such that the boundaries of a view frame of a fixed size with respect to the cutting plane 904 remains beneath the two contact points defined by the position of the user's fingers 906 and 908 as the user expands and contracts the distance between the two fingers 906 and 908.

The ability to manipulate the depth of a cutting plane by adjusting the scale between two points on the surface of the cutting plane is not limited to when the cutting plane is oriented to provide a perspective view of the cutting plane. Rather, the depth of a cutting plane may be manipulated by adjusting the scale between two points on the surface of the cutting plane for both perspective and orthographic projections.

Figure 10A:
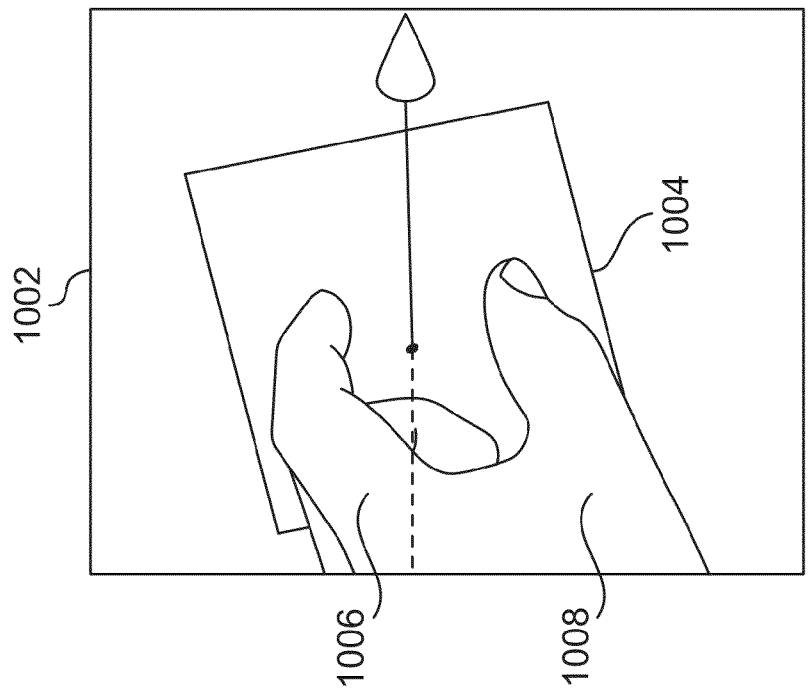
FIGS. 10A-10C are a sequence of diagrams that illustrate a multi-touch display device displaying a cutting plane and multi-touch controls provided by the multi-touch display device for manipulating the depth of the cutting plane by adjusting the scale between two points on the surface of the cutting plane when the cutting plane is oriented to provide an oblique view of the cutting plane.
Figure 10C:
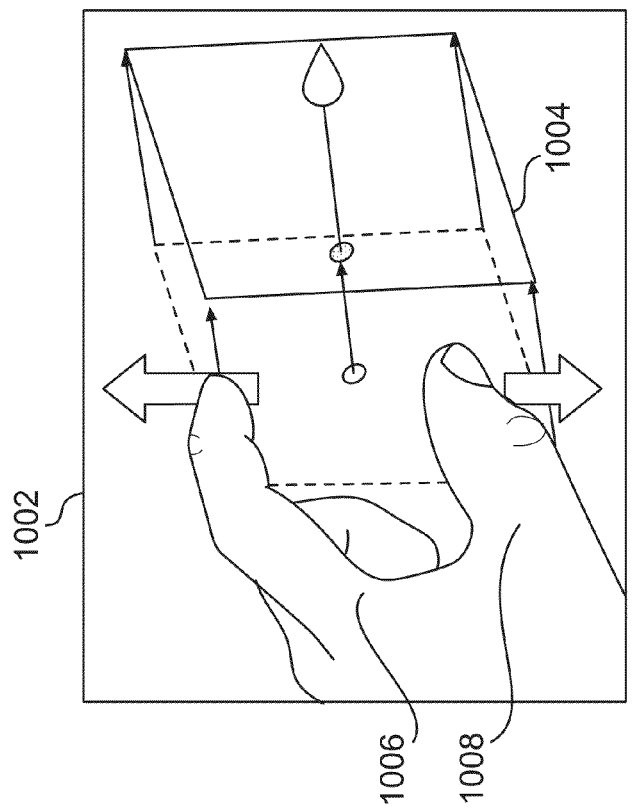
Figure 10B:
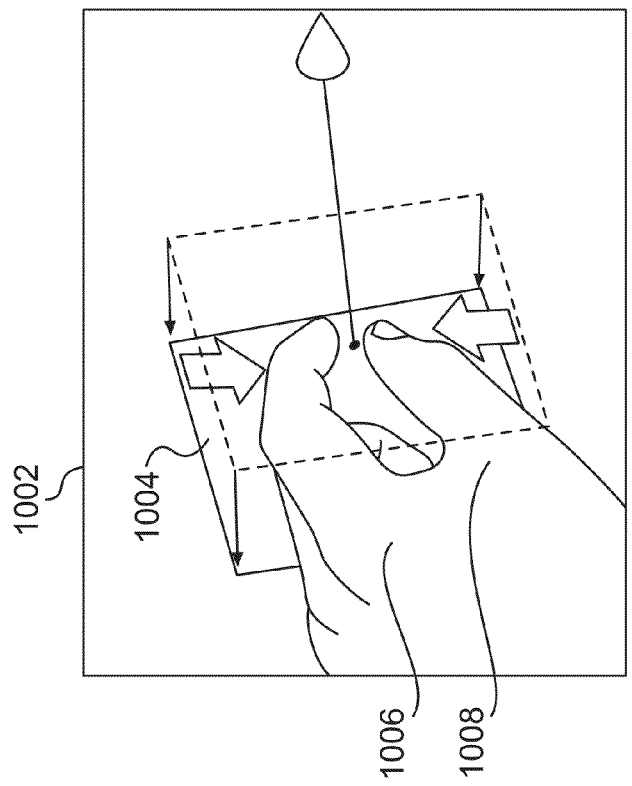

For example, FIGS. 10A-10C are a sequence of diagrams that illustrate a multi-touch display device displaying a cutting plane and multi-touch controls provided by the multi-touch display device for manipulating the depth of the cutting plane by adjusting the scale between two points on the surface of the cutting plane when the cutting plane is oriented to provide an oblique view of the cutting plane. As with FIGS. 9A-9C, for ease of illustration, the cutting plane is illustrated in isolation. Nevertheless, it will be appreciated that the cutting plane may be defined through a 3D data set and that the described multi-point controls for manipulating the depth of the cutting plane may be used to manipulate the depth of the cutting plane within the 3D data set.

Referring to FIG. 10A, a multi-touch display device 1002 is displaying a cutting plane 1004 with an orientation that provides an oblique view of the cutting plane 1004. As illustrated by the progression of the sequence of diagrams from FIG. 10A to FIG. 10B, the multi-touch display device 1002 provides multi-touch controls that enable a user to increase the depth of the cutting plane 1004 (i.e., move the cutting plane 1004 in the negative direction along the cutting plane's normal) by touching two points on the surface of the cutting plane 1004 with two different fingers 1006 and 1008 and then contracting the two contact points together. Referring to FIG. 10B, in response to detecting that the user touched two points on the surface of the cutting plane 1004 and then contracted the two points, the multi-touch display device 1002 increased the depth of the cutting plane 1004 (e.g., as a function of the contracted distance). In contrast, as illustrated by the progression of the sequence of diagrams from FIG. 10A to FIG. 10C, the multi-touch display device 1002 also provides multi-touch controls that enable a user to decrease the depth of the cutting plane 1004 (i.e., move the cutting plane 1004 in the positive direction along the cutting plane's normal) by touching two points on the surface of the cutting plane 1004 with two different fingers 1006 and 1008 and then expanding the distance between the two contact points. Referring to FIG. 10C, in response to detecting that the user touched two points on the surface of the cutting plane 1004 and then expanded the two points, the multi-touch display device 1002 decreased the depth of the cutting plane 1004 (e.g., as a function of the expanded distance).

Translating the Origin of a Cutting Plane Defined Through a 3D Volume

Two additional degrees of freedom for manipulating the orientation of a cutting plane can be achieved by translating the origin of the cutting plane. In some implementations, a multi-touch display device may provide a control for translating the origin of a cutting plane by touching the origin with a finger and sliding the origin to the desired location on the cutting plane. Additionally or alternatively, a multi-touch display device may superimpose a view frame over the surface of the cutting plane such that the origin of the cutting plane is fixed at the center of the view frame and enable a user to drag the view frame across the cutting plane with one or more fingers. Since the origin of the cutting plane is fixed at the center of the view frame, the multi-touch display device will translate the origin of the cutting plane across the cutting plane as the user drags the view frame across the cutting plane.

Figure 11A:
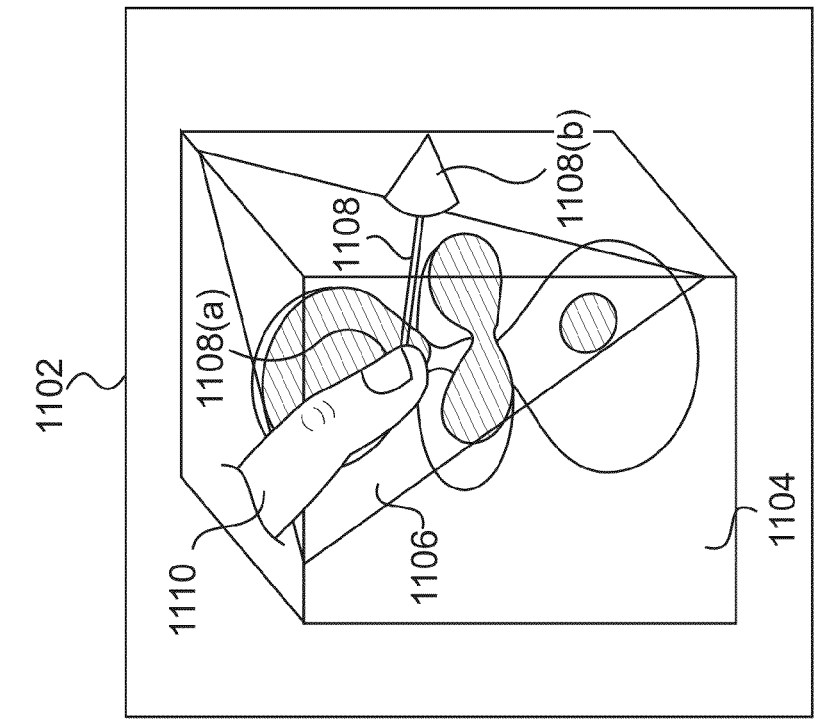
FIGS. 11A-11C are a sequence of diagrams that illustrate a multi-touch display device displaying a cutting plane defined through a 3D volume and an orientation widget provided by the multi-touch display device for translating the origin of the cutting plane along the cutting plane.
Figure 11B:
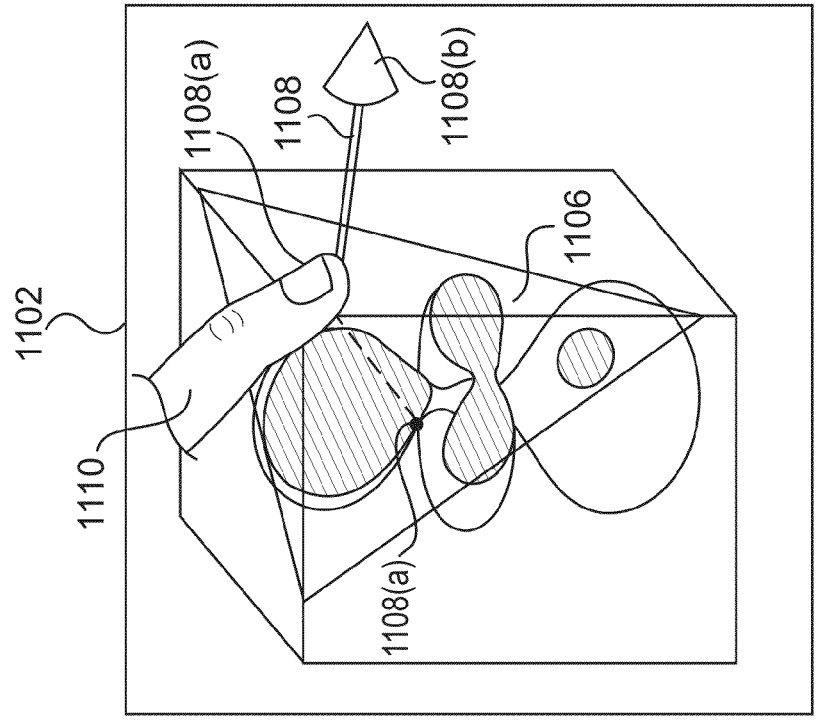
Figure 11C:
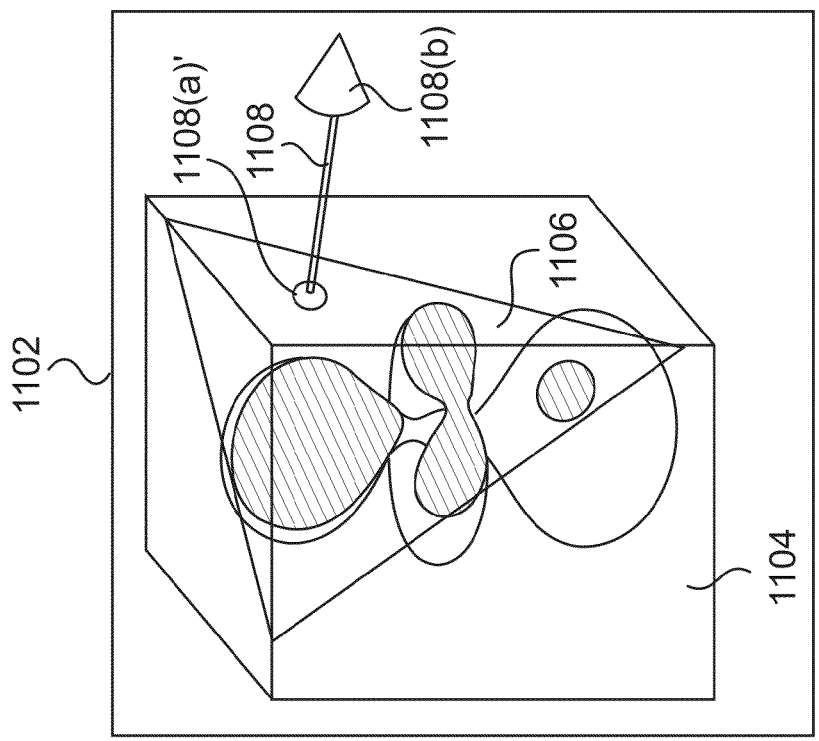

FIGS. 11A-11C are a sequence of diagrams that illustrate a multi-touch display device displaying a cutting plane defined through a 3D volume and an orientation widget provided by the multi-touch display device for translating the origin of the cutting plane along the cutting plane.

Referring to FIG. 11A, a multi-touch display device 1102 is displaying a 3D volume. In addition, a cutting plane 1106 is defined through the 3D volume such that a section of the 3D volume 1104 is cut away and not displayed. The multi-touch display device indicates the orientation of the cutting plane 1106 by providing an orientation widget 1108, which is represented as a vector that intersects the origin 1108(a) of the cutting plane 1106 and that is normal to the cutting plane 1106. An end 1108(b) of the orientation widget 1108 operates as a rotation handle that enables a user to rotate the cutting plane 1106 about the origin 1108(a). The orientation widget 1108 provided by the multi-touch display device 1102 enables a user to translate the origin 1108(a) of the cutting plane by engaging the orientation widget 1108 at the origin 1108(a) with a finger 1110 and dragging the origin 1108(a) to a desired location on the cutting plane 1106.

As illustrated in the progression of the sequence of diagrams from FIGS. 11A-11C, when the multi-touch display device 1102 detects that the user has engaged the orientation widget 1108 at the origin 1108(a) and has dragged the base of the orientation widget to a new location 1108(a)' on the cutting plane 1106, the multi-touch display device 1102 translates the origin 1108(a) of the cutting plane 1106 to the new location 1108(a)' on the cutting plane 1106.

In addition to or as an alternative to enabling a user to translate the origin of a cutting plane using the orientation widget 1108 illustrated in FIGS. 11A-11C, a multi-touch display device may provide a view frame control superimposed over a cutting plane that enables a user to translate the origin of the cutting plane by dragging the view frame control around the surface of the cutting plane.

Figure 12A:
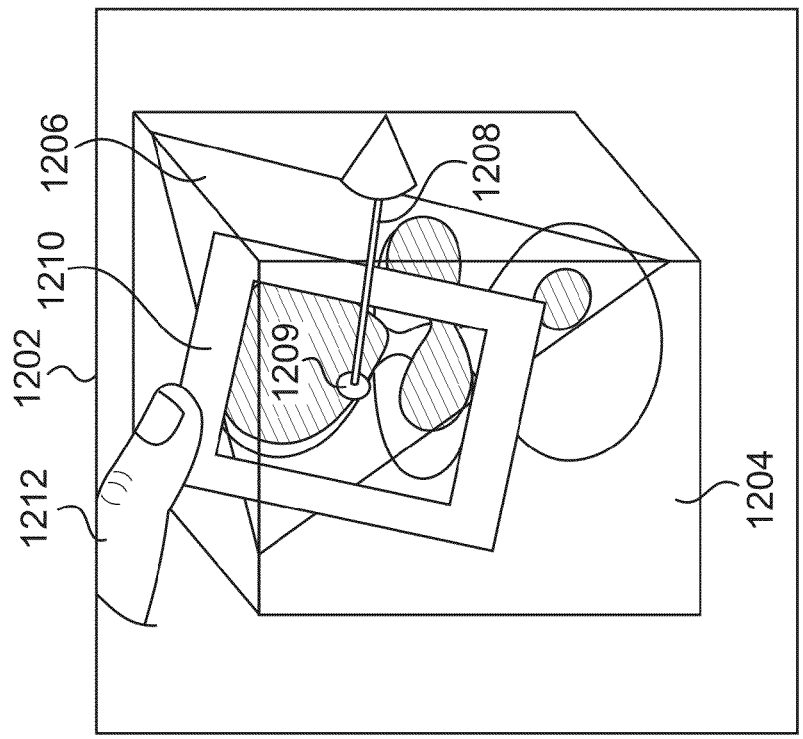
FIGS. 12A-12C are a sequence of diagrams that illustrate a multi-touch display device displaying a cutting plane defined through a 3D volume and a view frame control provided by the multi-touch display device for translating the origin of the cutting plane along the cutting plane.
Figure 12C:
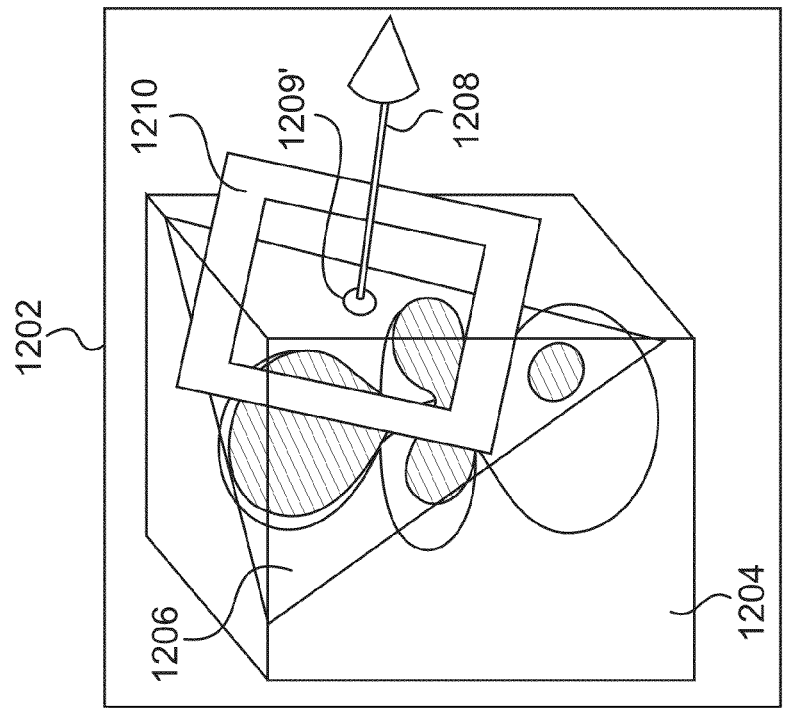
Figure 12B:
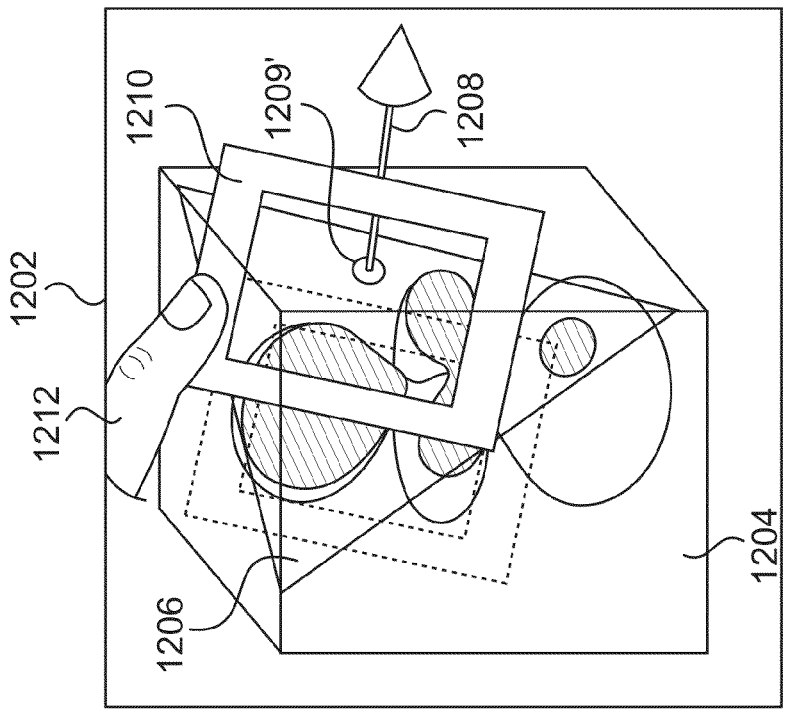

FIGS. 12A-12C are a sequence of diagrams that illustrate a multi-touch display device displaying a cutting plane defined through a 3D volume and a view frame control provided by the multi-touch display device for translating the origin of the cutting plane along the cutting plane.

Referring to FIG. 12A, a multi-touch display device 1202 is displaying a 3D volume 1204. In addition, a cutting plane 1206 is defined through the 3D volume 1204 such that a section of the 3D volume 1204 is cut away and not displayed. The multi-touch display device 1202 indicates the orientation of the cutting plane 1206 by providing a normal vector 1208 extending from the origin 1209 of the cutting plane 1206. In addition, the multi-touch display device 1202 has superimposed a view frame 1210 over the surface of the cutting plane 1206. The view frame 1210 is configured such that the origin 1209 of the cutting plane 1206 remains fixed at the center of the view frame 1210. Thus, in response to detecting that a user is moving the view frame 1210 along the surface of the cutting plane 1206, the multi-touch display device 1202 translates the origin 1209 of the cutting plane along the cutting plane 1206.

As discussed above in connection with FIGS. 1A-1E, in some implementations, the view frame 1210 may define a region of the 3D data set that is displayed simultaneously in a 2D viewport on the multi-touch display device 1202. In such implementations, the origin 1209 of the cutting plane may represent the center of the region of the 3D data that is displayed in the 2D viewport. Thus, when the view frame 1210 is moved and the origin 1209 of the cutting plane is translated, the multi-touch display device 1202 may update the data displayed in the 2D viewport accordingly. In other implementations, the view frame 1210 may serve simply as a control for translating the origin 1209 of the cutting plane 1210.

As illustrated in the progression of the sequence of diagrams from FIGS. 12A-12C, the view frame 1210 enables a user to translate the origin 1209 of the cutting plane 1204 along the cutting plane 1204. A user may engage the view frame 1210 by touching the view frame 1210 with one or more fingers 1212. While the user's fingers 1212 remain in contact with the view frame 1210, the multi-touch display device 1202 tracks movements of the user's fingers 1212 along the cutting plane 1206 and responsively translates the view frame 1210, along with the origin 1209 of the cutting plane 1206, along the cutting plane 1206. Thus, the view frame 1210 enables a user to translate the origin 1209 from one location to a new location 1209' by dragging the view frame 1210 around the multi-touch display device 1202 with the user's finger 1212.

In some implementations, a multi-touch display device may not superimpose a visible view frame on the surface of a cutting plane, but the multi-touch display device still may enable a user to translate the origin of the cutting plane around the cutting plane by engaging one or more points on the surface of the cutting plane with the user's fingers and dragging the contact points along the surface of the cutting plane. In some cases, enabling a user to translate the origin of the cutting plane by engaging one or more points on a view frame superimposed over the cutting plane or by engaging one or more points on the surface of the cutting plane rather than by engaging the origin of the cutting plane itself may reduce the portion of the display of the data set that is obstructed from view while the manipulation is performed.

2D Scaling, Rotation, and Translation of Data on the Surface of a Cutting Plane Defined Through a 3D Object As described above in connection with FIGS. 1A-1E, in some implementations, a multi-touch display device may be configured such that when a cutting plane is defined within a 3D data set, a 2D view of the data (or a portion of the data) on the surface of the cutting plane is rendered in a viewport concurrently with the display of the visual representation of the 3D data set and the cutting plane. In such implementations, the multi-touch display device may provide controls for manipulating the 2D view of the data in association with both the 3D display of the data set and the 2D view of the data on the surface of the cutting plane. In addition, the multi-touch display device may be configured to enable controls provided in connection with the 3D view of the data to be operated concurrently with controls provided in connection with the 2D view of the data.

Figure 13A:
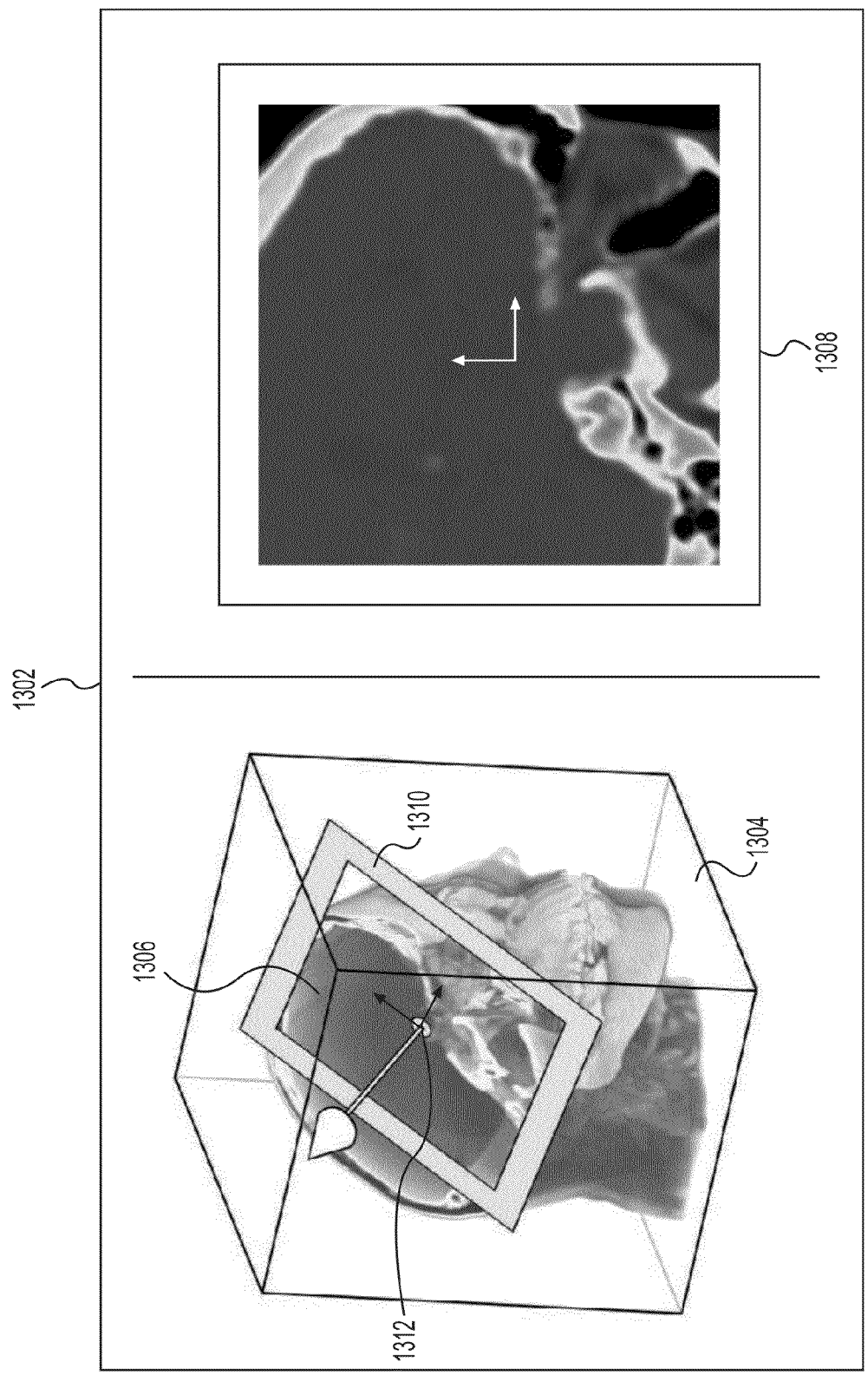
FIGS. 13A-13C are a sequence of diagrams that illustrate a multi-touch display device displaying both a 3D volume through which a cutting plane is defined and a 2D view of the features of the 3D volume that are on the surface of the cutting plane.
Figure 13B:
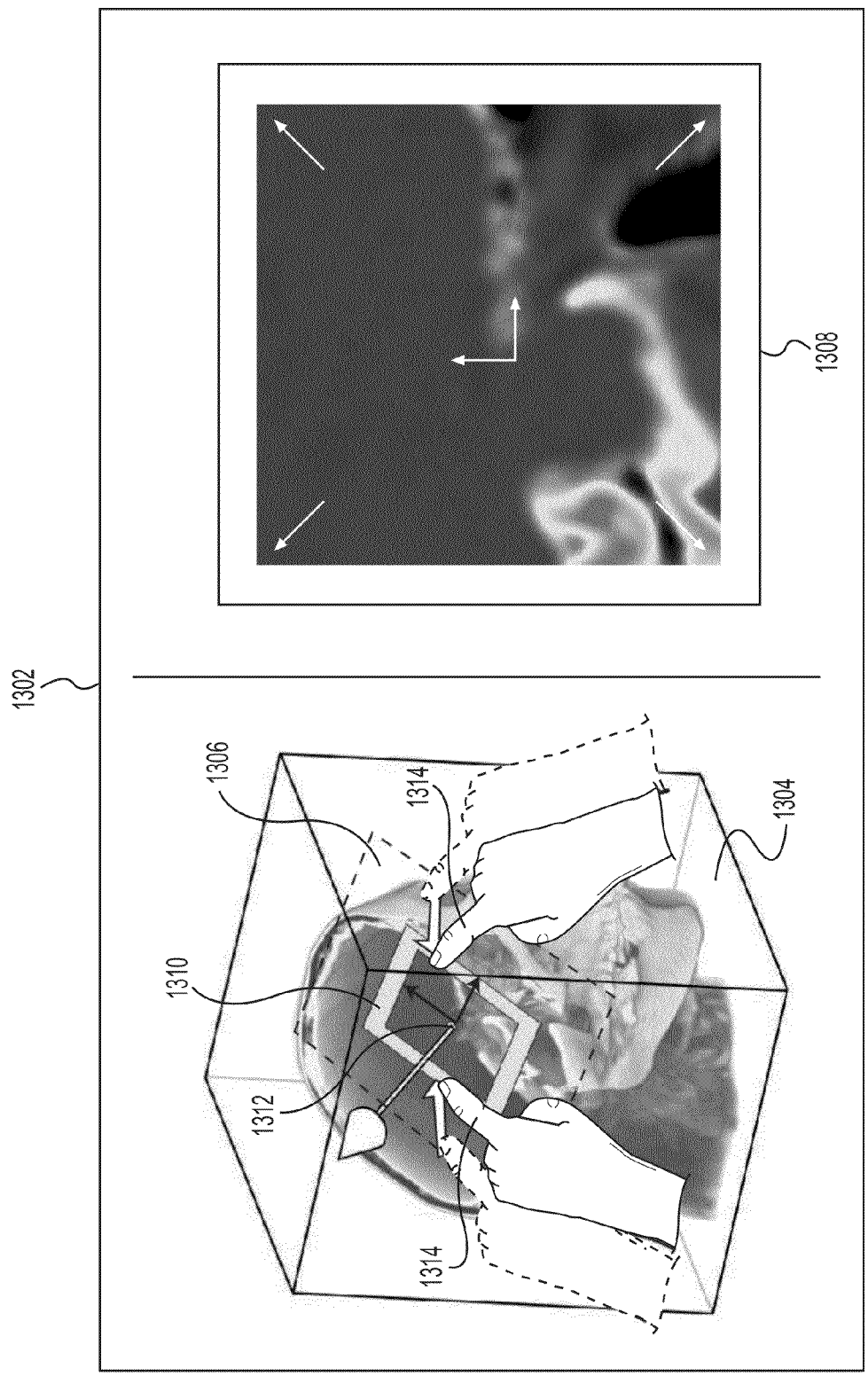
Figure 13C:
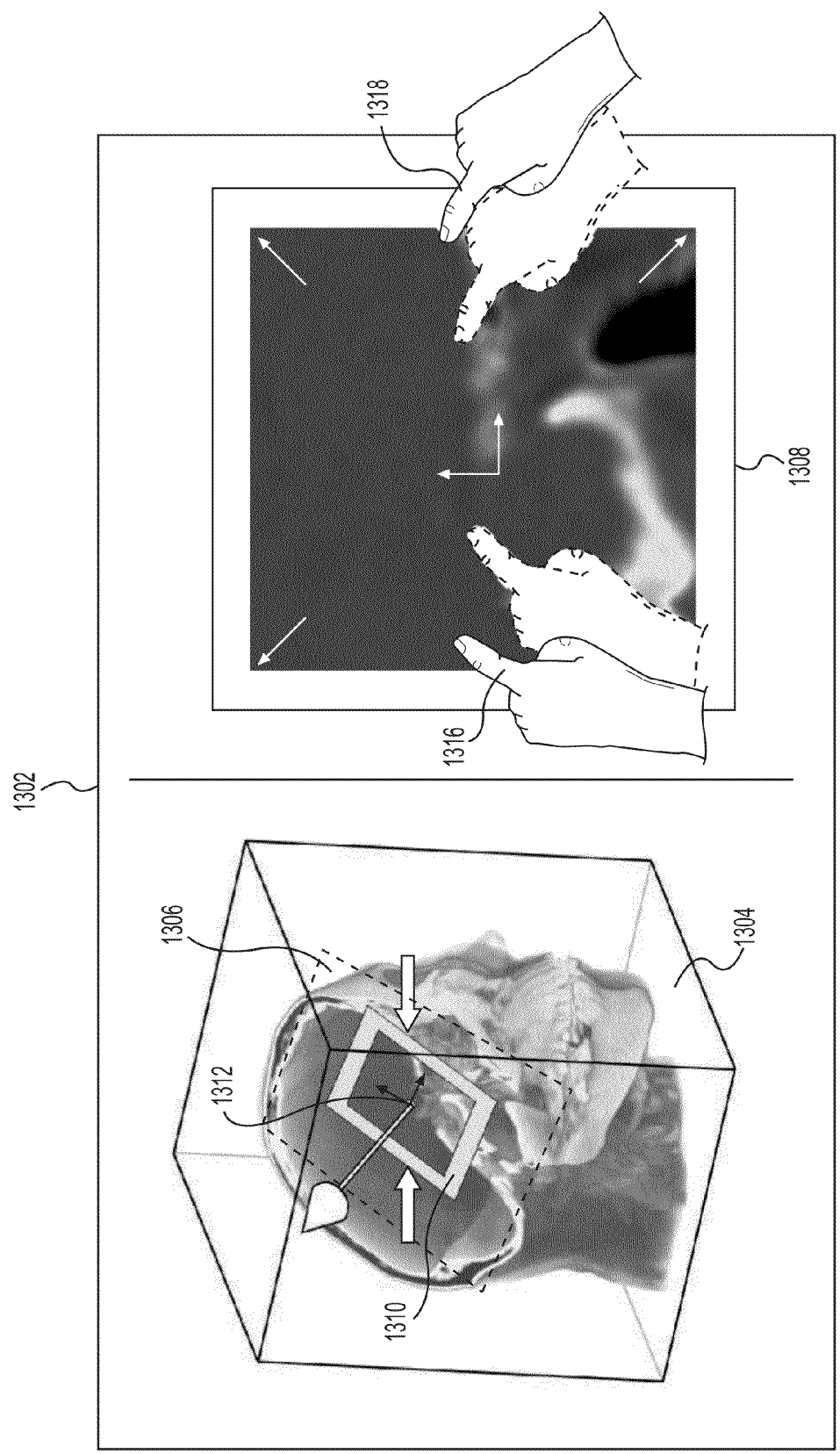

FIGS. 13A-13C are a sequence of diagrams that illustrate a multi-touch display device displaying both a 3D object through which a cutting plane is defined and a 2D view of the features of the 3D object that are on the surface of the cutting plane.

As illustrated in FIG. 13A, a multi-touch display device 1302 is displaying a 3D volume 1304 through which a cutting plane 1306 is defined. In addition, the multi-touch display device 1302 is displaying a viewport 1308 which presents a 2D display of the features of the 3D volume 1304 that are on the surface of the cutting plane 1306. As illustrated in FIG. 13A, a view frame 1310 is superimposed over the surface of the cutting plane 1306. The view frame 1310 is centered at the origin 1312 of the cutting plane 1306 and defines the region of the surface of the cutting plane 1306 that is displayed in the viewport 1308.

The multi-touch display device 1302 provides controls that enable the 2D data displayed in the viewport to be scaled, rotated, and/or translated in association with both the 3D object 1304 and cutting plane 1306 defined through the 3D volume 1304 as well as the 2D viewport 1308. For example, the multi-touch display device 1302 provides controls that enable the 2D data displayed in the viewport 1308 to be scaled by engaging a corner of the view frame 1310 with one or more fingers and dragging the engaged corner toward and away from the origin 1312 of the cutting plane 1306. Similarly, the multi-touch display device provides a control for rotating the 2D data displayed in the viewport 1308 by engaging an edge of the view frame 1310 with one or more fingers and rotating the view frame 1310 around the origin 1312 of the cutting plane and/or the multi-touch display device provides a control for translating the 2D data displayed in the viewport 1308 by engaging the view frame 1310 with one or more fingers and translating the view frame 1310 across the surface of the cutting plane 1306. It will be appreciated that the multi-touch display device 1302 is configured to simultaneously rotate, translate, and/or scale the view frame 1310 in the 3D context in response to input received from multiple fingers at the same time.

Additionally or alternatively, the multi-touch display device 1302 provides a control that enables the 2D data displayed in the viewport 1308 to be scaled by engaging two contact points within the viewport 1308 with two different fingers and contracting and expanding the distance between the two contact points. Similarly, the multi-touch display device 1302 provides a control for rotating the 2D data displayed in the viewport 1308 by engaging two or more contact points within the viewport 1308 with two different fingers and rotating the contact points around the origin of the viewport 1308 and/or the multi-touch display device 1302 provides a control for translating the 2D data displayed in the viewport 1308 by engaging one or more contact points within the viewport 1308 with one or more fingers and translating the contact points through the viewport 1308. It will be appreciated that the multi-touch display device 1302 reflects operations performed by controls in the 2D viewport 1308 in the 3D display, even when other controls provided by the multi-touch display device 1302 are active in the 3D context (e.g. when the view direction control and/or the depth manipulation control are active), and may be engaged in composition with other 3D control modes when the view frame 1310 is manipulated within the 3D view.

FIG. 13 is a diagram that illustrates controls that are provided by the multi-touch display device 1302 in association with the 3D volume 1304 and the cutting plane 1306 that enable a user to scale the 2D data displayed in the viewport 1308. Specifically, FIG. 13B illustrates that when a user engages one or more edges of the view frame 1310 with one or more fingers 1314, the multi-touch display device 1302 tracks movements of the one or more fingers 1314 and zooms in on the data presented in the viewport 1308 when the one or more fingers shrink the size of the view frame 1310 by dragging the one or more edges of the view frame 1310 in toward the origin 1312 of the cutting plane 1306. Although not illustrated, when a user engages one or more edges of the view frame 1310 with one or more fingers 1314 and expands the size of the view frame 1310 by dragging the one or more edges of the view frame 1310 away from the origin of the cutting plane 1306, the multi-touch display device 1302 zooms out on the 2D data displayed in the viewport N08.

FIG. 13C is a diagram that illustrates controls that are provided by the multi-touch display device 1302 in association with the viewport 1308 that enable a user to scale the 2D data displayed in the viewport 1308. Specifically, FIG. 13C illustrates that when a user engages two contact points in the viewport 1308 with two different fingers 1316 and 1318, the multi-touch display device 1302 tracks movements by the two fingers 1316 and 1318 and zooms in on the data presented in the viewport 1308 when the two fingers both are dragged outward (e.g., in radial directions from the origin) of the viewport 1308 and/or when the distance between the two fingers 1316 and 1318 is increased. Similarly, although not illustrated, when a user engages two contact points in the viewport 1308 with two fingers 1316 and 1318 and drags both fingers inward (e.g., in radial directions toward the origin) of the viewport 1308 and/or when the distance between the two fingers 1316 and 1318 is decreased, the multi-touch display device 1302 zooms out on the 2D data displayed in the viewport 1308. In addition to zooming in and out on the 2D data displayed in the viewport 1308, as a user manipulates the scaling controls provided in association with the viewport 1308, the multi-touch display device 1302 also modifies the view frame 1310 in real-time such that the view frame 1310 identifies the region of the surface of the cutting plane 1306 currently displayed in the viewport 1308.

Rotating a Cutting Plane Defined Through a 3D Object Around a Fixed Point Controls for rotating a cutting plane defined through a 3D volume in a sphere centered at a point on the cutting plane have been described above, for example, in connection with FIGS. 3A-3C. As an alternative, however, in some implementations, a multi-touch display device provides a control for rotating a cutting plane defined through a 3D volume around a pivot point that is fixed at a point in space that may removed from the cutting plane (e.g., the pivot point may be located at the center of the 3D volume) instead of at the origin of the cutting plane.

Figure 14A:
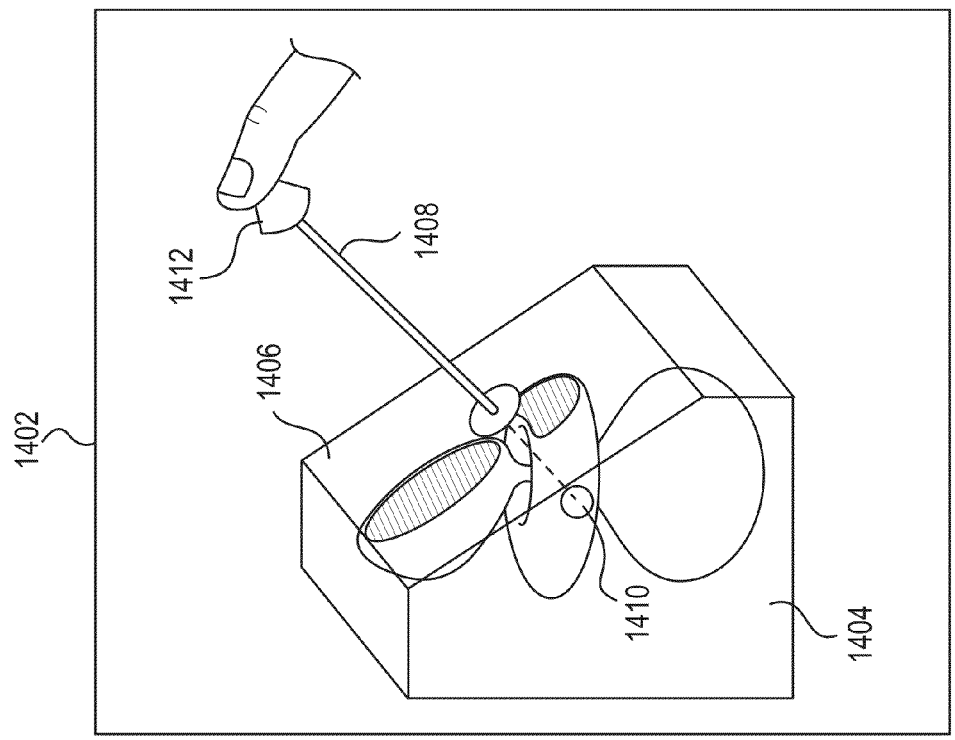
FIGS. 14A-14C are a sequence of diagrams that illustrate a multi-touch display device displaying a cutting plane defined through a 3D volume and an orientation widget provided by the multi-touch display device for rotating the cutting plane through the 3D volume around a fixed point in space.
Figure 14B:
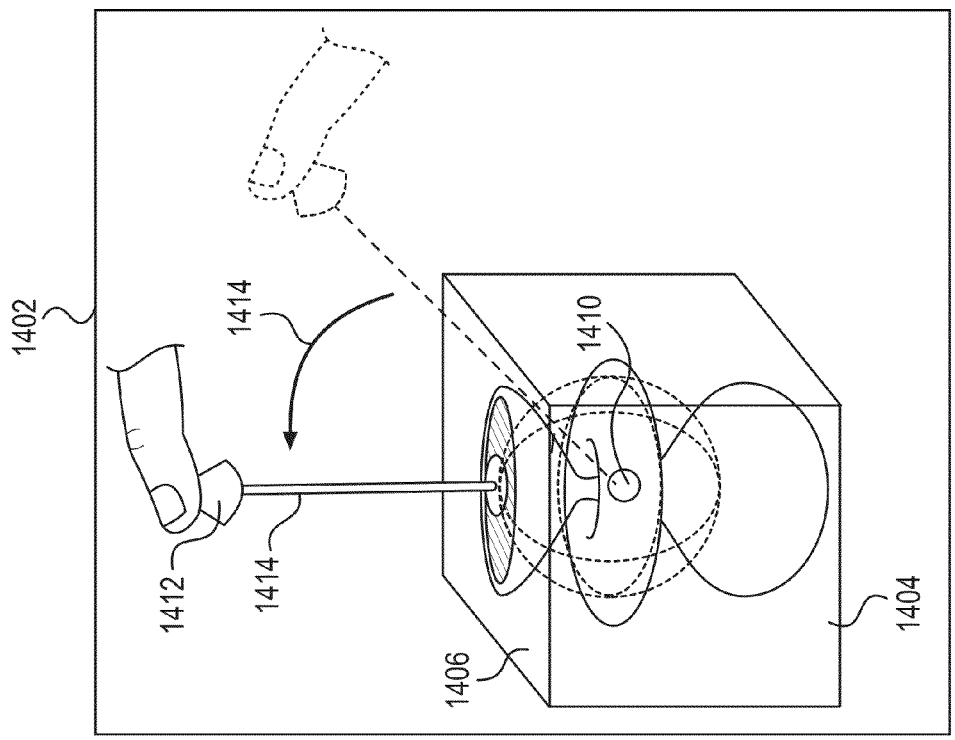
Figure 14C:
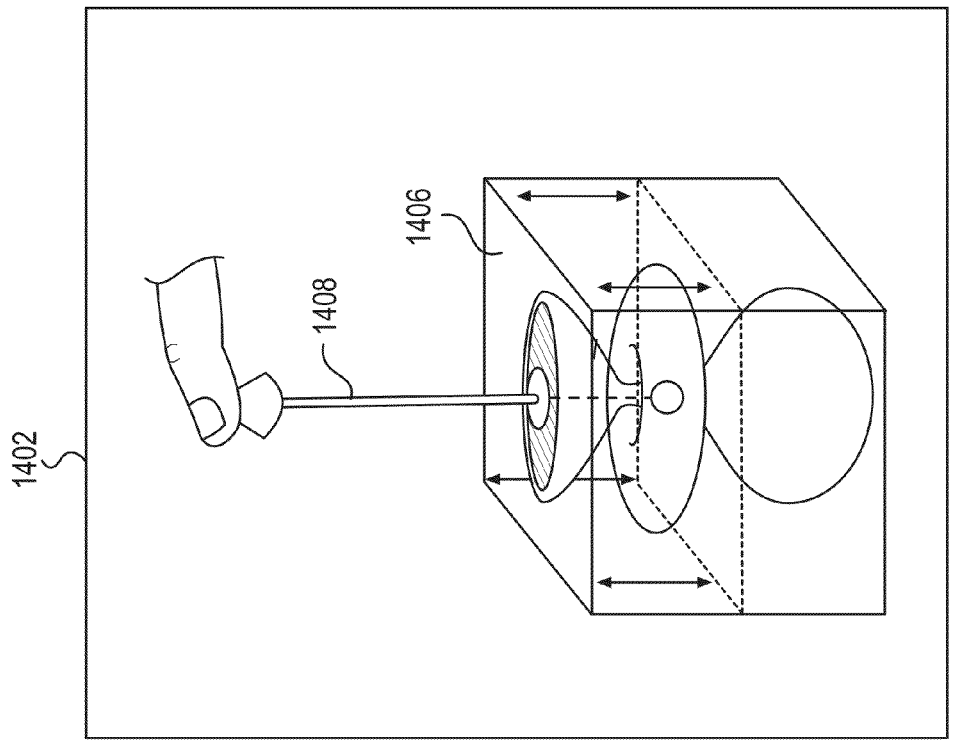

By way of example, FIGS. 14A-14C are a sequence of diagrams that illustrate a multi-touch display device displaying a cutting plane defined through a 3D volume and an orientation widget provided by the multi-touch display device for rotating the cutting plane through the 3D volume around a fixed point in space that is removed from the cutting plane.

Referring to FIG. 14A, a multi-touch display device 1402 is displaying a 3D volume 1404. In addition, a cutting plane 1406 is defined through the 3D volume 1404 such that a section of the 3D volume 1404 is cut away and not displayed. The orientation of the cutting plane 1406 is indicated by an orientation widget 1408 provided by the multi-touch display device 1402. The orientation widget 1408 is represented as a vector that is normal to the cutting plane 1406 and that falls along a spherical rotation axis defined by a fixed point 1410 in space (e.g., the center of the 3D volume). An end 1412 of the orientation widget 1408 operates as a rotation handle.

As illustrated in FIG. 14B, the rotation handle 1412 on the orientation widget 1408 provided by the multi-touch display device 1402 is configured to be rotatable, and when rotated (e.g., by virtue of user manipulation of the orientation widget 1408) causes a rotation of the cutting plane 1406 freely around the surface of a sphere centered at the fixed point 1410 in space. The multi-touch display device 1402 is configured to enable a user to engage the rotation handle 1412 by touching the rotation handle 1412 with a finger. While the user's finger remains in contact with the rotation handle 1412, the multi-touch display device 1402 tracks movements of the user's finger across the multi-touch display device 1402 and responsively rotates the cutting plane 1406 around the sphere centered at the fixed point 1410 in space according to the path 1414 traced by the user's finger across the surface of the multi-touch display device 1402. In the event that the user's finger is moved to a screen position that is inconsistent with the cutting plane's position on the sphere, the multi-touch display device 1402 may cease the rotation of the cutting plane 1406 in accordance with the movement of the user's finger. The effect of the operation of the rotation handle 1412 is to rotate the cutting plane 1406 about a fixed point 1410, as if the cutting plane 1406 is fixed to the fixed point 1410 by a radial axis extending between fixed point 1410 and the point at which the radial axis intersects cutting plane 1406. This is in contrast to the operation of the rotation control 308(*b*) described above in connection with FIGS. 3A-3C, which rotates the cutting plane spherically around the origin of the cutting plane.

In addition to enabling a user to rotate the cutting plane 1406 freely around the surface of a sphere centered at the fixed point 1410 in space, the orientation widget 1408 provided by the multi-touch display device 1402 also may enable a user to manipulate the depth of the cutting plane 1406. For example, as illustrated in FIG. 14C, the orientation widget 1408 may be configured to detect that a user has engaged the shaft of the orientation widget 1408 with a finger and to manipulate the depth of the cutting plane 1406 in response to detecting that the user is moving the finger back and forth along the shaft of the orientation widget 1408. In implementations such as this, where the pivot point is located at a fixed point in space 1410, manipulation of the depth of the cutting plane 1406 by the orientation widget 1408 serves to slide the cutting plane 1406 along the axis defined by the fixed point 1410 in space.

Multi-Point Controls for High Degree of Freedom Manipulations

A multi-point input computing system (e.g., a multi-touch display device) receives multiple control inputs at the same time. Taking advantage of such multi-point input functionality, the controls described above are capable of being combined and/or composed. In fact, as described in greater detail below, the controls described above are structured such that compound controls can be initiated from any of their sub-operations. As a result, a multi-point input computing system equipped with the individual controls described above enables a user to engage multiple controls concurrently to achieve high degree of freedom manipulations of the data displayed by the multi-point input computing system. Furthermore, the control elements for implementing the controls described above may be located and sized so as to enable operation by multiple fingers of the same hand and/or by two hands of the same user, thereby providing for relatively easy operation when deployed within a multi-touch display device.

When a multi-point input computing system equipped with the controls described above receives multiple control inputs for manipulating displayed data at the same time, the multi-point input computing system processes the received control inputs at substantially the same time and updates the displayed data in accordance with the received control inputs in substantially real-time. Consequently, to a viewer of the displayed data, it appears that the multi-point input computing system performs the high degree of freedom manipulations of the displayed data substantially in unison with receiving the multi-point input. In order to avoid unwanted side effects that otherwise might arise as a consequence of multiple control operations being performed concurrently, individual control elements may broadcast local changes to other active control elements when multiple control operations are performed concurrently.

Various examples of combinations and/or compositions of the controls discussed above that provide for high degree of freedom manipulation of data displayed by a multi-point display device are now discussed below.

Concurrent Rotation of a 3D Volume and a Cutting Plane Defined Through the 3D Volume The ability to operate a control for spherically rotating a cutting plane defined through a 3D object concurrently with a control for manipulating the orientation of the 3D object is one example of a multi-point control provided by a multi-point input computing system that enables a user to achieve high degree of freedom manipulations of displayed data.

Figure 15A:
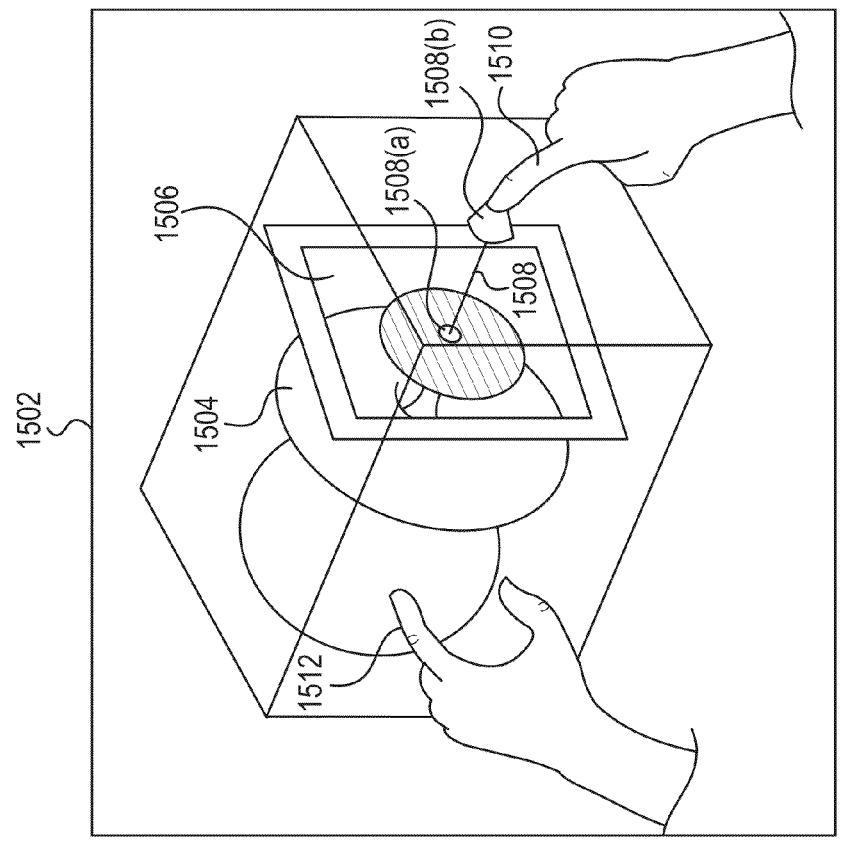
FIGS. 15A-15C are a sequence of diagrams that illustrate a multi-touch display device displaying a 3D volume through which a cutting plane is defined and controls provided by the multi-touch display device for rotating the cutting plane through the 3D volume while concurrently manipulating the orientation of the 3D volume.
Figure 15C:
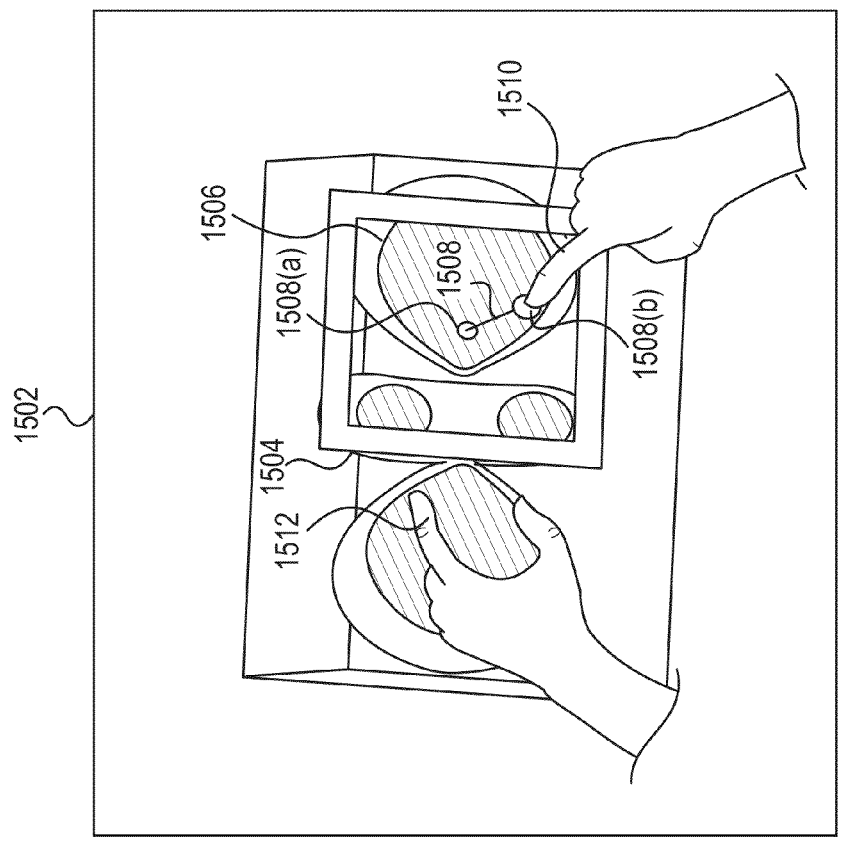
Figure 15B:
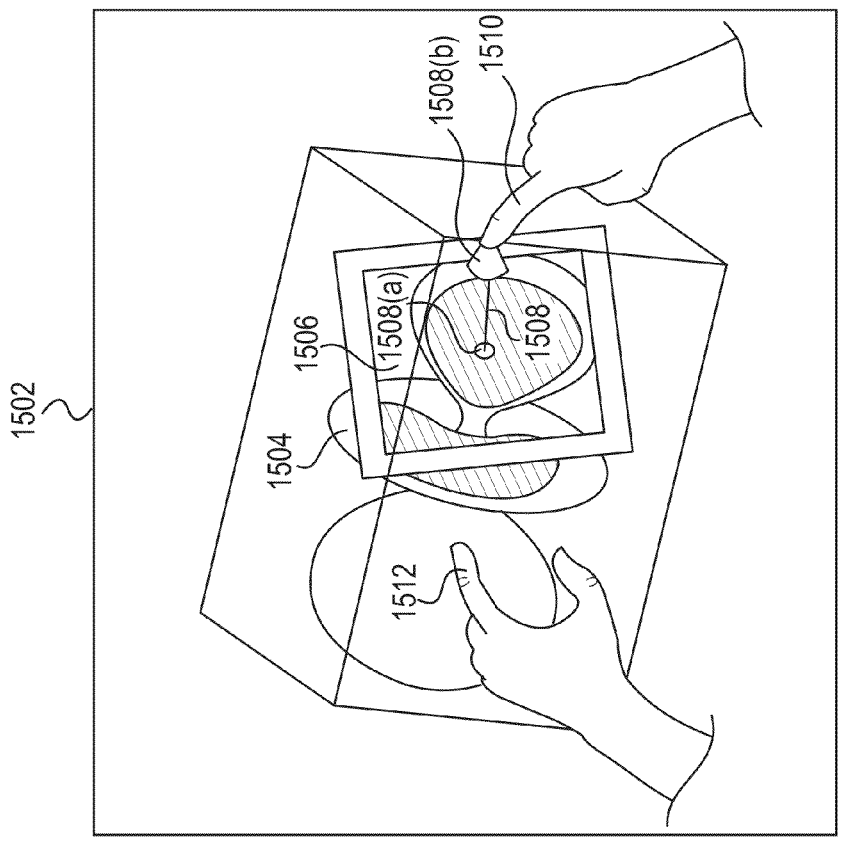

FIGS. 15A-15C are a sequence of diagrams that illustrate a multi-touch display device displaying a 3D volume through which a cutting plane is defined and controls provided by the multi-touch display device for rotating the cutting plane through the 3D volume while concurrently manipulating the orientation of the 3D volume.

Referring to FIG. 15A, a multi-touch display device 1502 is displaying a 3D volume 1504 through which a cutting plane 1506 is defined such that a portion of the 3D volume 1504 is not displayed. The multi-touch display device 1502 provides an orientation widget 1508—represented as a normal vector that intersects the origin 1508(a) of the cutting plane 1506—that indicates the direction of the cutting plane 1506 and that enables a user to rotate the cutting plane 1506 spherically about the origin 1508(a) of the cutting plane 1506. Specifically, the orientation widget 1508 provides a rotation handle 1508(b) that enables a user to rotate the cutting plane 1506 spherically around the origin 1508(a) of the cutting plane 1506 by touching the rotation handle 1508(b) with a finger 1510 and dragging the rotation handle 1508(b) along the surface of the multi-touch device 1502.

For example, as illustrated in the progression of the sequence of the diagrams from FIG. 15A to FIG. 15B, when a user engages the rotation handle 1508(b) with a finger 1510 and drags the rotation handle 1508(b) across the surface of the multi-touch display device 1502, the multi-touch display device 1502 tracks the movement of the finger 1510 across the multi-touch display device 1502 and responsively rotates the cutting plane 1506 in accordance with the path traversed by the finger 1510 across the multi-touch display device 1510.

The multi-touch display device 1502 also provides a control that enables a user to manipulate the orientation of the 3D volume 1504 while concurrently rotating the cutting plane 1506. Specifically, the multi-touch display device 1502 is configured such that when a user touches the multi-touch display device 1502 with a finger 1512 on the boundary of the 3D volume 1504 or anywhere in the free space surrounding the 3D volume 1504, the multi-touch display device 1502 will track movements of the finger 1512 and responsively rotate the 3D volume in accordance with the movement of the finger 1512 across the surface of the multi-touch display device 1502.

When a user engages the rotation handle 1508(b) of the orientation widget 1508 with a first finger 1510 at the same time as touching a boundary of the 3D volume 1504 or the free space surrounding the 3D volume 1504, the multi-touch display device 1502 tracks movements by the first finger 1510 and the second finger 1512 simultaneously and manipulates the cutting plane 1506 and the 3D volume 1504 accordingly. For example, as illustrated in the progression of the sequence of diagrams from FIG. 15B to FIG. 15C, while the first finger 1510 remains engaged with the rotation handle 1508(b) and the second finger 1512 remains engaged with the contact point on the boundary of the 3D volume 1504 or the free space surrounding the 3D volume 1504, the multi-touch display device 1502 rotates the cutting plane 1506 spherically about the origin 1508(a) of the cutting plane 1506 in accordance with the path traversed by the first finger 1510 while simultaneously rotating the 3D volume 1504 in accordance with the path traversed by the second finger 1512.

Spherical Rotation of a Cutting Plane Defined Through a 3D Object and Concurrent Depth Control The ability to operate a control for spherically rotating a cutting plane defined through a 3D object concurrently with a control for manipulating the depth of the cutting plane within the 3D object is one example of a multi-point control provided by a multi-point input computing system that enables a user to achieve high degree of freedom manipulations of displayed data. In particular, this multi-point control provides five degrees of freedom.

Figure 16A:
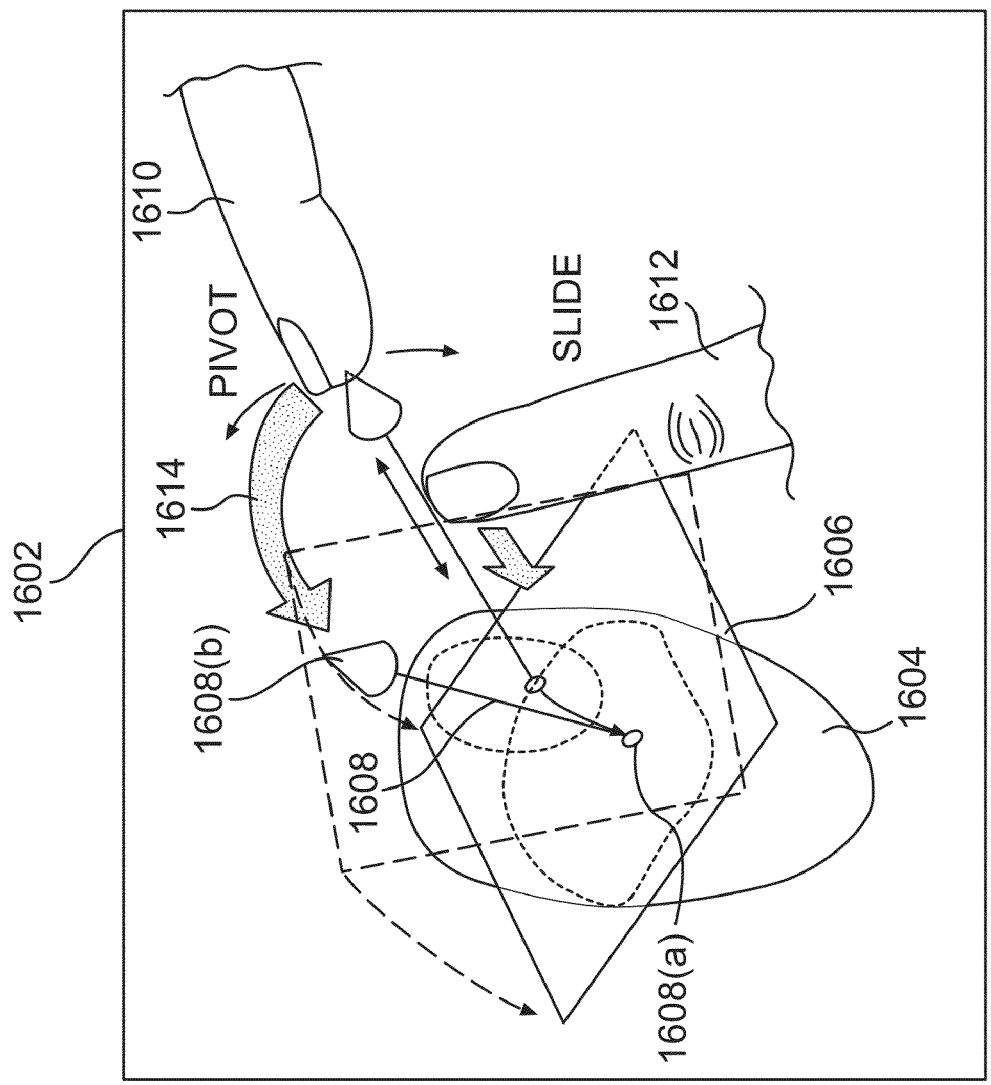
FIG. 16A is a diagram that illustrates a multi-touch display device displaying a cutting plane defined through a 3D object and multi-touch controls provided by the multi-touch display device for rotating the cutting plane spherically around a pivot point and concurrently controlling the depth of the cutting plane within the 3D object.
Figure 16B:
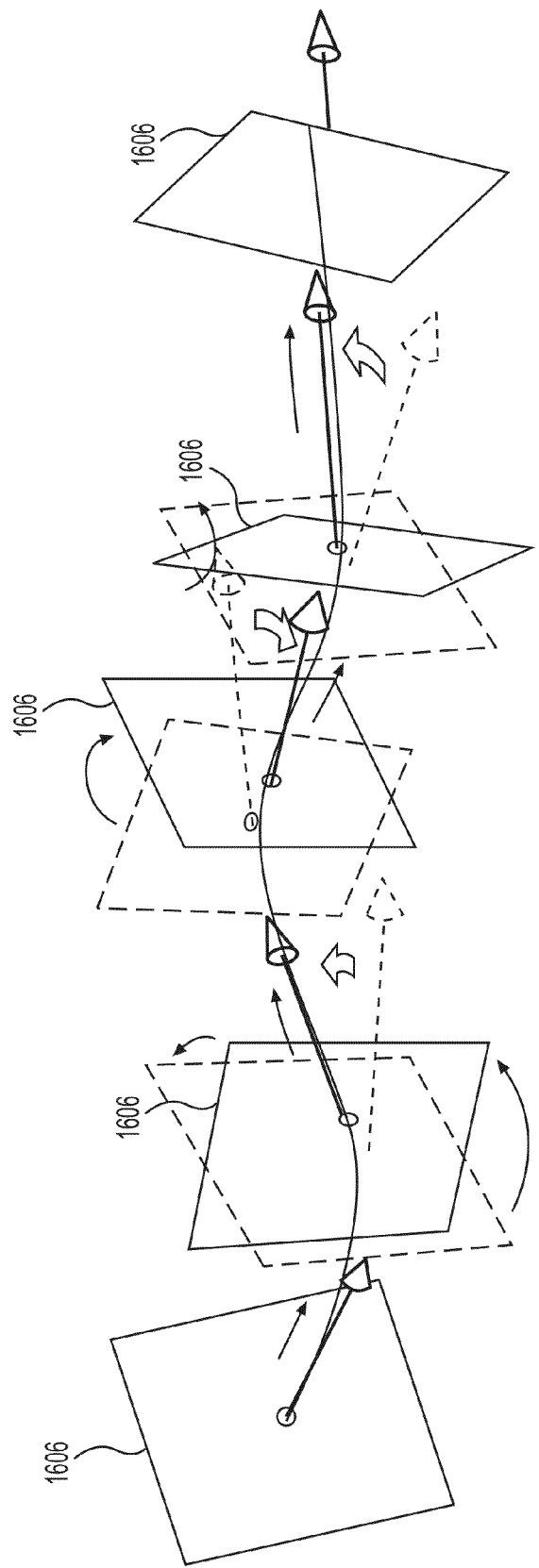
FIG. 16B is a diagram that illustrates a sequence of manipulations performed on a cutting plane using multi-touch controls that enable the cutting plane to be rotated concurrently with controlling the depth of the cutting plane.

FIGS. 16A-16B are diagrams that illustrates multi-point controls for rotating a cutting plane through a 3D object spherically around a pivot point and concurrently controlling the depth of the cutting plane within the 3D object. As illustrated in FIG. 16, a multi-touch display device 1602 is displaying a 3D object 1604 and a cutting plane 1606 defined through the 3D object 1604 such that a portion of the 3D object 1604 is not displayed. In addition, the multi-touch display device 1602 provides an orientation widget 1608—represented as a normal vector that intersects the origin 1608(a) of the cutting plane 1606—that indicates the direction of the cutting plane and that enables a user to rotate the cutting plane 1606 spherically about the origin 1608(a) of the cutting plane 1606 while concurrently manipulating the depth of the cutting plane 1606 within the 3D object 1604.

Specifically, the orientation widget 1608 provides a rotation handle 1608(b) that enables a user to rotate the cutting plane 1606 spherically around the origin 1608(a) of the cutting plane by touching the rotation handle 1608(a) with a first finger 1610 and dragging the rotation handle 1608(b) along the surface of the multi-touch display device 1602. In addition, the orientation widget 1608 enables a user to concurrently control the depth of the cutting plane 1606 within the 3D object 1604 by touching the shaft of the orientation widget 1608 with a second finger 1612 and sliding the contact point back and forth along the shaft of the orientation widget 1608.

When a user engages the rotation handle 1608(b) of the orientation widget 1608 with a first finger 1610 at the same time as engaging the depth control (i.e., the shaft) of the orientation widget 1608 with a second finger 1612, the multi-touch display device 1602 tracks movements by the first finger 1610 and the second finger 1612 simultaneously. While the first finger 1610 remains engaged with the rotation handle 1608(*b*) and the second finger 1612 remains engaged with the depth control (i.e., the shaft of the orientation widget 1608), the multi-touch display 1602 rotates the cutting plane 1606 spherically about the origin 1608(*a*) of the cutting plane in accordance with the path 1614 traversed by the first finger 1610 while simultaneously manipulating the depth of the cutting plane 1606 within the 3D object in accordance with the position of the second finger 1612 along the shaft of the orientation widget 1608.

The multi-touch controls for rotating the cutting plane 1606 concurrently with controlling the depth of the cutting plane 1606 enable a user to slide the cutting plane 1606 back and forth as if along a curved wire that is gradually bent as the user manipulates the rotation handle 1608(*b*). FIG. 16B illustrates a sequence of manipulations performed on the cutting plane 1606 using multi-touch controls that enable the cutting plane 1606 to be rotated concurrently with controlling the depth of the cutting plane that demonstrate how the multi-touch controls can be operated to slide the cutting plane 1606 back and forth as if along a curved wire that is gradually bent as the user manipulates the rotation handle 1608(*b*).

Spherical Rotation of a Cutting Plane Defined Through a 3D Object and Concurrent Translation of the Cutting Plane's Origin The ability to operate a control for spherically rotating a cutting plane defined through a 3D volume concurrently with a control for translating the origin (i.e., the pivot point) of the cutting plane is another example of a multi-point control provided by a multi-point input computing system that enables a user to achieve high degree of freedom manipulations of displayed data. In particular, this multi-point control provides five degrees of freedom.

Figure 17:
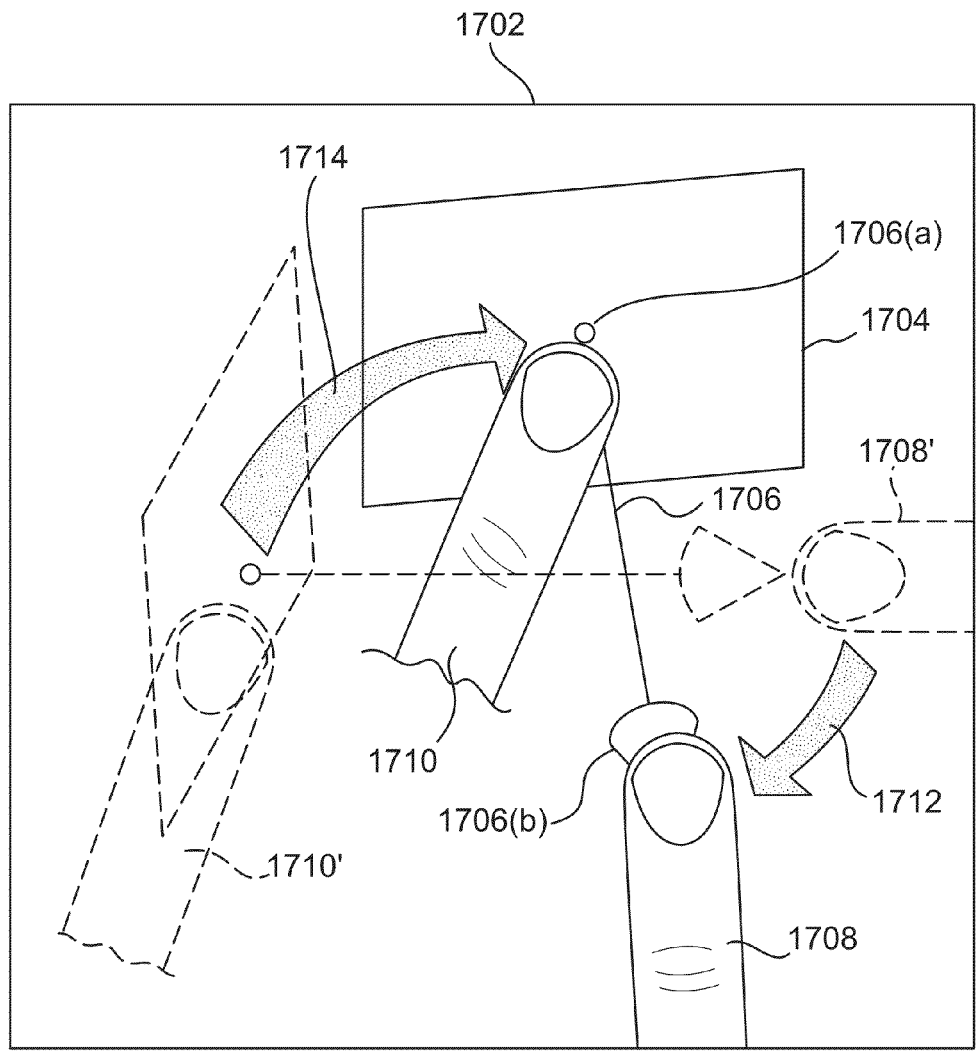
FIG. 17 is a diagram that illustrates a multi-touch display device displaying a cutting plane and multi-point controls provided by the multi-touch display device for rotating the cutting plane spherically around a pivot point while concurrently translating the origin of the cutting plane.

FIG. 17 is a diagram that illustrates a multi-touch display device 1702 displaying a cutting plane 1704 and multi-point controls provided by the multi-touch display device 1704 for rotating the cutting plane 1704 spherically around a pivot point while concurrently translating the pivot point of the cutting plane 1704. For ease of illustration, the cutting plane 1704 is illustrated in isolation. Nevertheless, it will be appreciated that the cutting plane 1704 may be defined through a 3D data set and that the multi-point controls for spherically rotating the cutting plane 1704 while concurrently translating the pivot point of the cutting plane 1704 may be used to rotate the cutting plane 1704 through a 3D data set spherically while concurrently translating the pivot point of the cutting plane 1704.

As illustrated in FIG. 17, the multi-touch display device 1702 provides an orientation widget 1706—represented as a normal vector that intersects the origin 1706(*a*) of the cutting plane 1704—that indicates the direction of the cutting plane 1704 and that enables a user to rotate the cutting plane 1704 spherically about the origin 1706(*a*) of the cutting plane 1704 while concurrently translating the origin 1706(*a*) of the cutting plane 1704.

Specifically, the orientation widget 1706 provides a rotation handle 1706(*b*) that enables a user to rotate the cutting plane 1704 spherically around the origin 1706(*a*) of the cutting plane 1704 by touching the rotation handle 1706(*a*) with a first finger 1708 and dragging the rotation handle 1706(*b*) along the surface of the multi-touch device 1702. In addition, the orientation widget 1706 enables a user to concurrently translate the origin 1706(*a*) of the cutting plane 1704 by touching the base of the orientation widget 1706 at the origin of the cutting plane 1706(*a*) with a second finger 1710 and moving the base of the orientation widget 1706 to a new location on the multi-touch display device 1702.

When a user engages the rotation handle 1706(*b*) of the orientation widget 1706 with a first finger 1708 at the same time as engaging the base of the orientation widget 1706 with a second finger 1710, the multi-touch display device 1702 tracks movements by the first finger 1708 and the second finger 1710 simultaneously. While the first finger 1708 remains engaged with the rotation handle 1706(*b*) and the second finger 1710 remains engaged with the base of the orientation widget 1706, the multi-touch display device 1702 rotates the cutting plane 1704 in accordance with the path 1712 traversed by the first finger 1708 while simultaneously translating the origin of the cutting plane 1704 in accordance with the path 1714 traversed by the second finger 1710 on the multi-touch display device 1702.

By controlling the rotation of the cutting plane 1704 and the translation of the origin 1706(*a*) concurrently, this multi-point control variously rotates the cutting plane 1704 around a pivot (when the base of the orientation widget 1706 is held fixed), sweeps the cutting plane 1704 around in a fixed radius (when the rotation handle 1706(*b*) is held fixed), orbits the cutting plane around a point equidistant between the origin 1706(*a*) and the rotation handle 1706(*b*) (when the base of the orientation widget 1706 and the rotation handle 1706(*b*) are moved in opposing directions), and/or translates the origin 1706(*a*) in plane (when the base of the orientation widget 1706 and the rotation handle 1706(*b*) are moved in parallel).

An extension to the multi-point control that enables a user to control the rotation of the cutting plane 1704 and the translation of the origin 1706(*a*) concurrently is to engage this control at the same time as engaging the view control for rotating the 3D volumetric data set. For example, a user may use two or more fingers on one hand to engage the multi-point control for concurrently controlling the rotation of the cutting plane 1704 and the translation of the origin 1706(*a*) while using one or more fingers on the user's other hand to engage the view control for rotating the 3D volumetric data set. When the multi-touch display device 1702 detects that a user has engaged the multi-point control for concurrently controlling the rotation of the cutting plane 1704 and the translation of the origin 1706(*a*), the multi-point display device 1702 tracks movements of the user's fingers which have engaged the controls and manipulates the rotation of the cutting plane 1704, the translation of the origin 1706(*a*), and the rotation of the 3D volumetric data set concurrently in accordance with the respective movements of the user's fingers engaging the different controls. For example, in response to detecting that a user is holding both the rotation handle 1706(*b*) and the base of the orientation widget 1706 in fixed positions while rotating the view control, the multi-touch display device may orbit or otherwise reposition the 3D volumetric data set while maintaining the cutting plane 1704 and the view frame (if displayed) such that they appear fixed with respect to the user.

The multi-touch display device 1702 may provide other multi-point controls that enable a user to control the rotation of the cutting plane 1704 and the translation of the origin 1706(*a*) concurrently. For example, the multi-touch display device 1702 may enable the user to translate the origin 1706 (*a*) by manipulating a view frame superimposed over the cutting plane 1704 (for example as described in connection with FIGS. 12A-12C) while enabling the user to concurrently rotate the cutting plane 1704 using the rotation handle 1706 (*b*) incorporated within the orientation widget 1706.

Translation of the Origin of a Cutting Plane Defined Through a 3D Object and Concurrent Depth Control A multi-point control that enables a user to translate the origin of a cutting plane while concurrently controlling the depth of the cutting plane (i.e., the offset of the cutting plane along the cutting plane's normal) is another example of a multi-point control provided by a multi-point input computing system that enables a user to achieve high degree of freedom manipulations of displayed data. In particular, this multi-point control provides three degrees of freedom.

Figure 18:
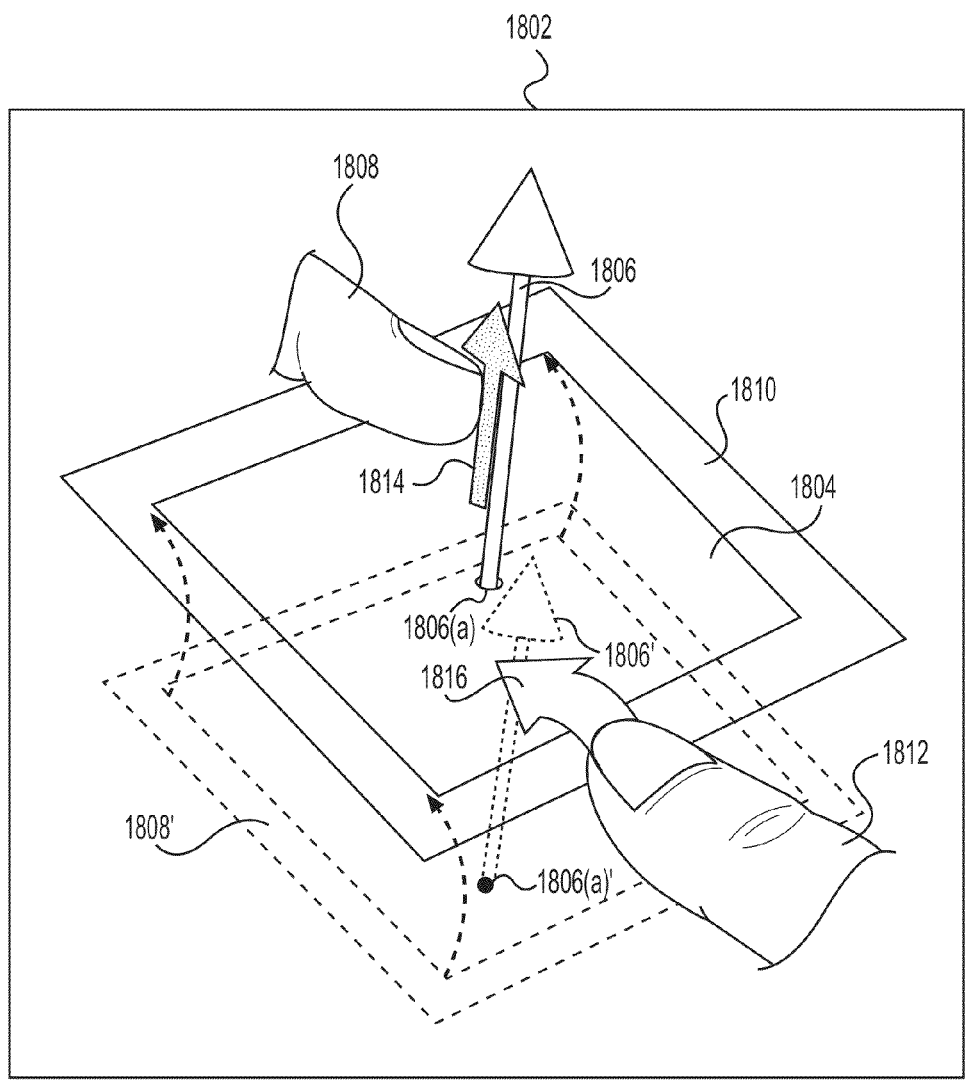
FIG. 18 is a diagram that illustrates a multi-touch display device displaying a cutting plane and multi-point controls provided by the multi-touch display device for translating the origin of the cutting plane while concurrently manipulating the depth of cutting plane.

FIG. 18 is a diagram that illustrates a multi-touch display device 1802 displaying a cutting plane 1804 and multi-point controls provided by the multi-touch display device 1802 for translating the origin of the cutting plane 1804 while concurrently manipulating the depth of cutting plane 1804. For ease of illustration, the cutting plane 1804 is illustrated in isolation. Nevertheless, it will be appreciated that the cutting plane 1804 may be defined through a 3D data set and that the multi-point controls for translating the origin of the cutting plane 1804 and concurrently controlling the depth of the cutting plane 1804 may be used to navigate the origin of the cutting plane 1804 in three dimensions through the 3D data set.

As illustrated in FIG. 18, the multi-touch display device 1802 provides an orientation widget 1806—represented as a normal vector that intersects the origin 1806(a) of the cutting plane 1804—that indicates the direction of the cutting plane 1804. The orientation widget 1806 provided by the multi-touch display device 1802 enables a user to control the depth of the cutting plane 1806 by touching the shaft of the orientation widget 1806 with a finger 1808 and sliding the contact point back and forth along the shaft of the orientation widget 1806. The multi-touch display device 1802 also has superimposed a view frame 1810 over the cutting plane 1804. The view frame 1810 is configured such that the center of the view frame 1810 is fixed at the origin 1806(a) of the cutting plane 1804 and enables a user to translate the origin 1806(a) of the cutting plane 1804 by engaging an edge of the view frame 1810 with a finger 1812 and moving the view frame 1810 across the cutting plane 1804.

When a user engages the shaft of the orientation widget 1806 with a first finger 1808 at the same time as engaging an edge of the view frame 1810 with a second finger 1812, the multi-touch display device 1802 tracks movements by the first finger 1808 and the second finger 1810 simultaneously. While the first finger 1808 remains engaged with the shaft of the orientation widget 1806 and the second finger 1812 remains engaged with an edge of the view frame 1810, the multi-touch display device 1802 manipulates the depth of the cutting plane 1804 in accordance with the path 1814 traced by the first finger 1808 along the shaft of the orientation widget 1806 while simultaneously translating the origin 1806(a) of the cutting plane in accordance with the path 1816 imparted on the view frame 1810 by the second finger 1812. By enabling a user to control the location of the origin 1806(a) while concurrently controlling the depth of the cutting plane 1804, this multi-point control allows the user to control the location of the origin 1806(a) in three dimensions.

As touched on repeatedly throughout this disclosure, many of the controls described above enable ready combination and/or composition with other controls in addition to providing relatively straightforward and intuitive transitions between controls. The relative ease with which these controls may be combined and/or composed as well as the relatively low degree of complexity involved in transitioning between various different combinations and/or compositions of these controls is perceived as a factor that may enable users who otherwise are unaccustomed to multi-touch controls to adapt to using these controls relatively effortlessly. The transition to higher degree of freedom controls also is encouraged by making available control handles visible and potentially marked as available to the user during an interaction mode, rather than conveying to the user that certain control handles are restricted when other control handles are engaged.

The use of higher degree of freedom controls also is encouraged by ensuring that the various controls are placed within easy reaching distance of one another—as an example, the length of the shaft of the orientation widget may be kept at a maximum of three or four inches to allow a user to access both the rotation handle on one end of the orientation widget and the origin at the other end of the orientation widget to be engaged concurrently with the thumb and forefinger of one hand. Likewise, the active regions of the rotation and origin control handles may be made small enough that a second finger could access the shaft of the orientation widget to perform a depth-sliding operation while concurrently engaging both the rotation and origin handles.

In some implementations, the physical dimensions of the display surface may be a factor that influences the scale and the position of the controls provided by a multi-touch display device. For example, the dimensions of the display on a tablet device may be very different from a wall-sized screen. Consequently, when implemented in the context of a tablet device, the scale and the position of the controls may be different than the scale and the position of the controls when implemented in the context of a wall-sized screen. In such implementations, feedback received from hardware devices, an operating system, software, or user entry may enable determination of screen size and, correspondingly, determination of and modifications to scale, control positions and relative distances between controls. By way of example, to maintain operable constraints, determination of a greater than threshold (or default) screen size (or related indicia) results in an effective decrease in the size of or relative distances between controls, by, for instance, diminishing the increase in size or relative distance that otherwise would be applied to displayed features as a result of scaling up from a small screen display to a larger screen display or by otherwise fixing or observing a maximum distance or relative increase. More specifically, the distance between the cutting plane and the rotation handle may increase when increasing display size from a default screen to a very large screen, but the distance may be throttled or capped relative to the ratio of size increase in the screen display. Similarly, determination of a smaller than threshold (or default) screen size (or related indicia) results in an effective increase in the size of or relative distances between controls, by, for instance, limiting the decrease in size or relative distance that otherwise would be applied to displayed features as a result of scaling down from a large screen display to a smaller screen display or by otherwise fixing or observing a minimum distance or relative decrease. More specifically, the distance between the cutting plane and the rotation handle may decrease when decreasing display size from a default screen to a smaller screen, but the distance may be throttled or capped relative to the ratio of size decrease in the screen display.

Furthermore, the physical dimensions of an expected user may be another factor that influences the scale and the position of the controls provided by a multi-touch display device. For example, when implemented in an application targeted to children, the controls provided by a multi-touch display device may be scaled and positioned to accommodate the smaller finger dimensions and reaching distances of children relative to adults.

Figure 19:
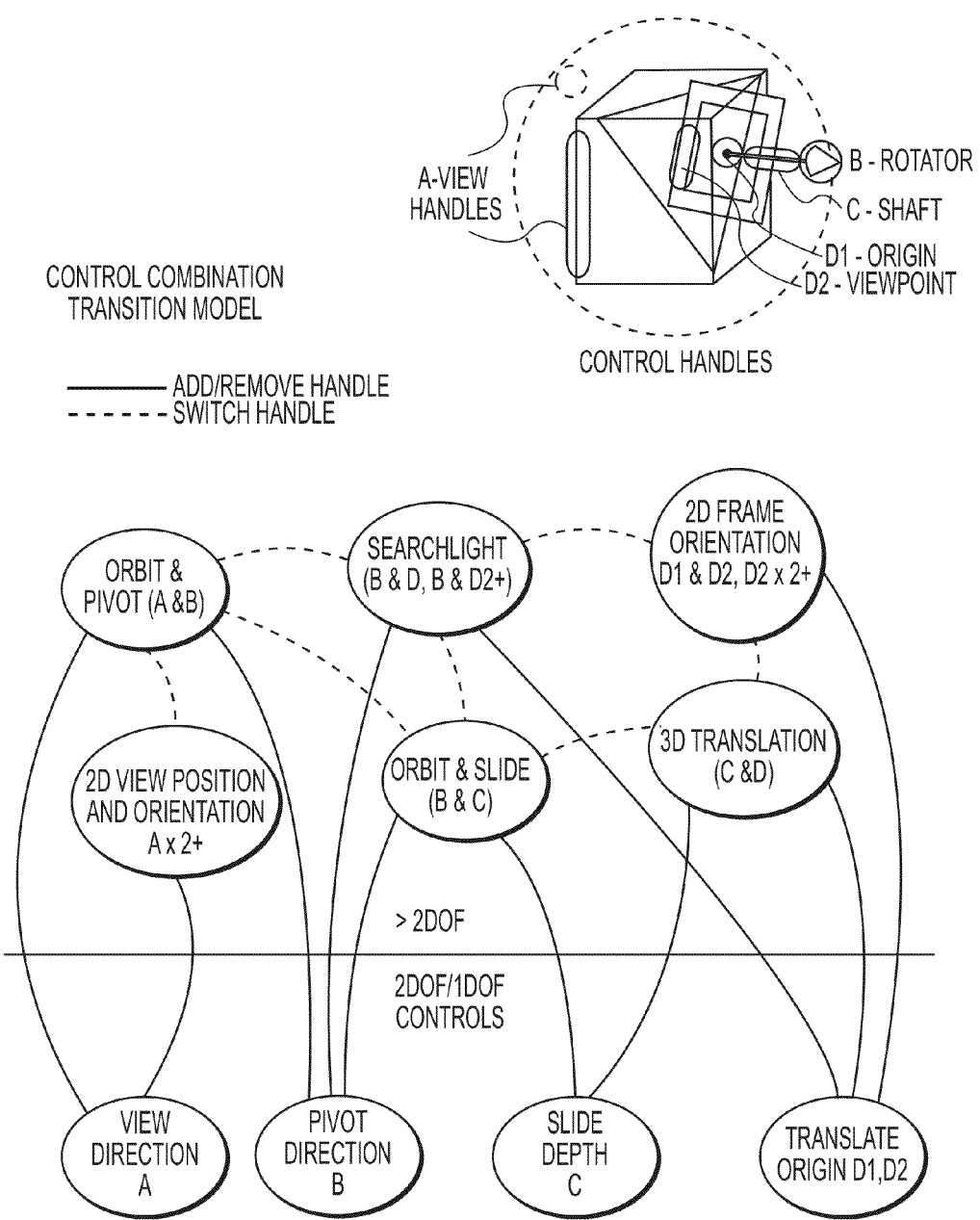
FIG. 19 is a state diagram that illustrates the combination and/or composition of various different controls provided by a multi-touch display device to form multi-touch controls that enable high degree of freedom manipulations.

FIG. 19 is a state diagram that summarizes how, in some implementations, various of the controls described above may be combined and/or composed to form multi-touch controls that enable high degree of freedom manipulations. Specifically, examples of mechanisms for combining and/or composing individual controls for manipulating data displayed on a multi-touch display device with two or fewer degrees of freedom to achieve multi-touch controls that enable manipulations with three or more degrees of freedom are illustrated. In addition, mechanisms for transitioning between different multi-touch controls that enable three or more degrees of freedom also are illustrated.

FIGS. 20A-20F illustrate various implementations of linear slider controls configured to modify the mapping of data values to corresponding values along a function (e.g., a straight line). For example, an image's pixel values may be mapped to corresponding grayscale values defined by a straight line, the slope of which defines the contrast of the range of grayscale values to which the image's pixel values are mapped and the y-intercept of which corresponds to the brightness of grayscale values to which the image's pixel values are mapped. For instance, a square, two-dimensional space having an equal number of rows and columns may be defined. All of the columns may be identical, and each column may include a predefined number of different grayscale values (e.g., 256 grayscale values) ordered from top to bottom from brightest to darkest values. A straight line passing through this two dimensional space intersects different grayscale values in different columns, thereby defining the mappings between an image's pixel values and corresponding grayscale values. In such scenarios, the slope and y-intercept of the line define the range (and thus also the contrast and the brightness) of the grayscale values to which the image's pixel values are mapped.

A linear slider control may be configured to enable manipulation of the slope and y-intercept of the line of grayscale values to which an image's pixel values are mapped by changing the positions of one or more control handles located along the slider control, thereby enabling the contrast and brightness of pixel values in an image to be changed based on detected changes in position(s) of the control handles and/or the range between the control handles.

Figure 20A:
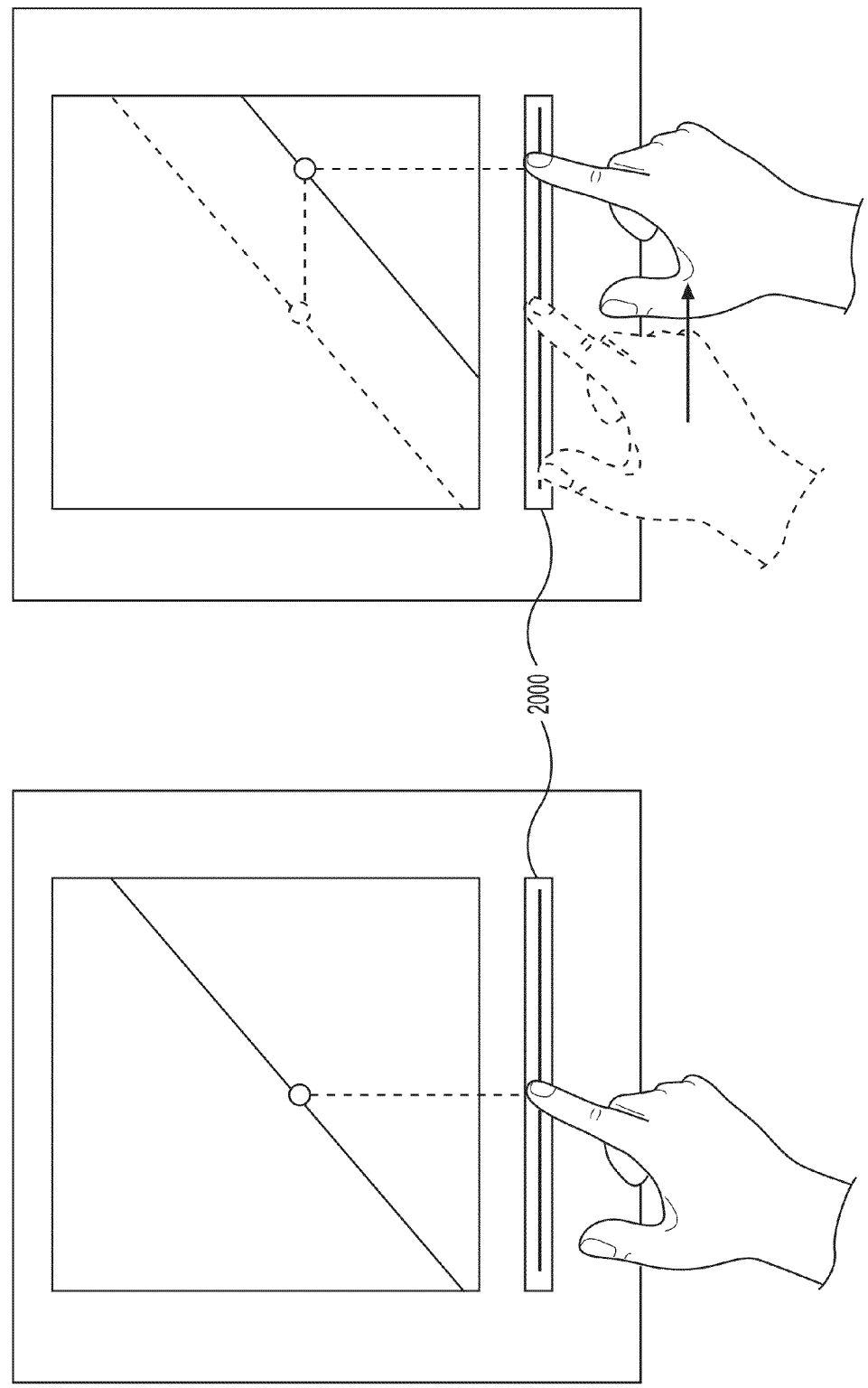
FIGS. 20A-20F illustrate various implementations of linear sliders configured to modify the scale and bias parameters of a contrast/brightness control based on detected changes in slider position and range.

As shown in FIG. 20A, a multi-touch display device provides a slider control 2000. The multi-touch display device is configured to detect lateral movements of one or more handles positioned along the slider between edges of a linear path. The path is commonly a straight line, like a physical slider control, but in practice, the path may be a portion of a circle or otherwise non-linear path. The slider control 2000 is configured to enable manipulations to an associated function, such as, for example, a straight line as illustrated in FIG. 20A.

When the multi-touch display device detects that an input mechanism (e.g., a finger) has engaged a control handle (e.g., a point) located along slider control 2000, the multi-touch display device tracks movements of the input mechanism while the input mechanism remains engaged with control handle along the slider control 2000. In addition, in response to detected movements of the input mechanism while the input mechanism remains engaged with the control handle along the slider control 2000, the multi-touch display device manipulates the associated line as a function of the detected movements of the input mechanism. For example, as illustrated in FIG. 20A, in response to detecting that the input mechanism has moved in a rightward direction along slider control 2000 while engaging a control handle, the multi-touch display device translates the line to the right, which, in turn, decreases the y-intercept of the line. If, as in the above example, the line defines mappings between an image's pixel values and corresponding grayscale values with the y-intercept of the line defining the brightness of the grayscale values to which the image's pixel values are mapped, translating the line in a rightward direction results in decreasing the brightness of the grayscale values to which the image's pixel values are mapped. In the event that the multi-touch display device detects that a user has engaged a control handle along slider control 2000 and translated the slider in a leftward direction along slider control 2000, the multi-touch display device similarly translates the line to the left, thereby increasing the y-intercept of the line, which, in the above example, results in increasing the brightness of the grayscale values to which the image's pixel values are mapped.

Figure 20B:
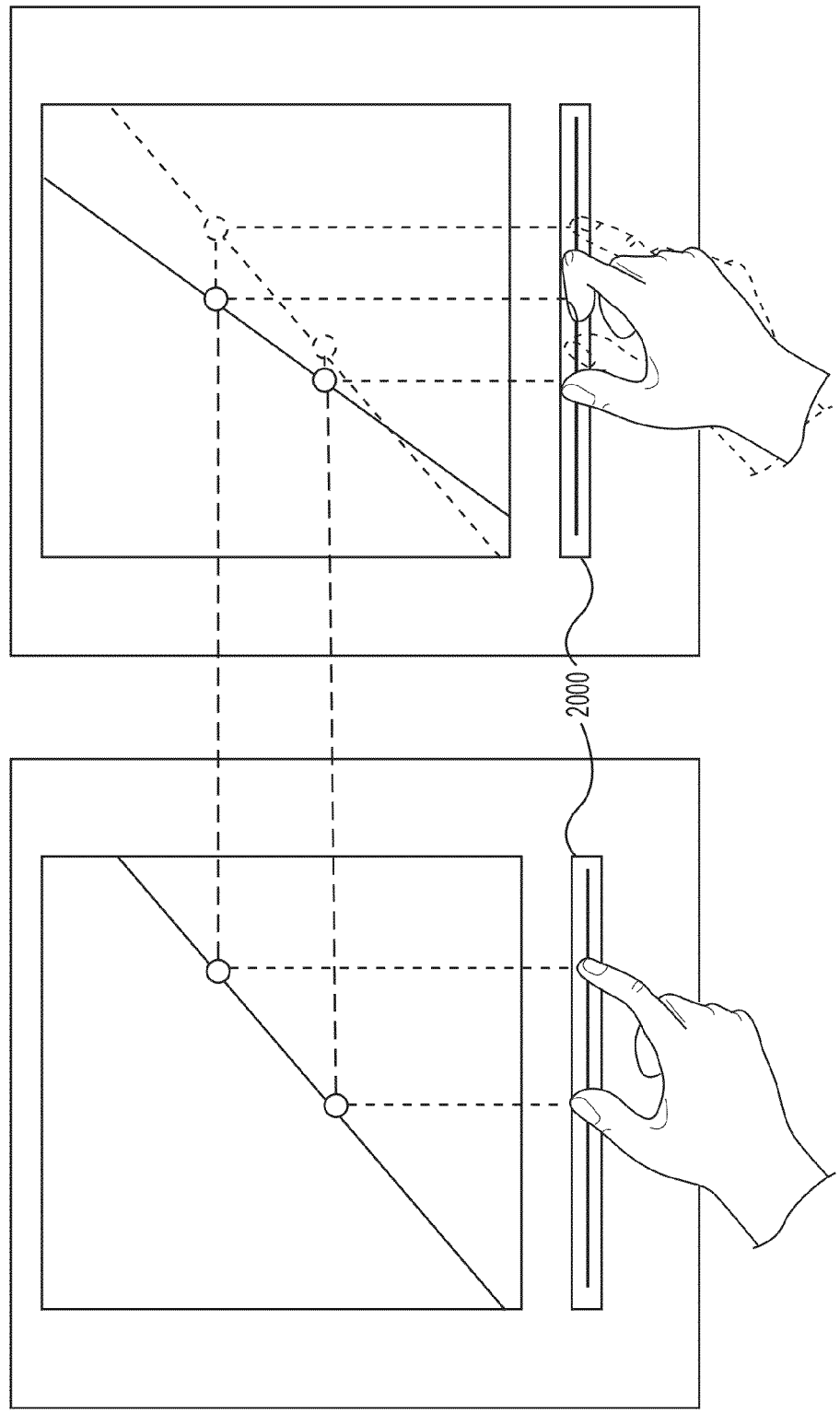

As shown in FIG. 20B, as an extension of this basic mode of operation, the slider utility may be configured to receive input from multiple input mechanisms (e.g., fingers) concurrently, enabling corresponding changes to the function with which the slider is associated. As illustrated in FIG. 20B, responsive to a determination that input mechanisms have engaged two control handles (e.g., two points) along slider control 2000 concurrently, the multi-touch display device tracks movements of the two input mechanisms and manipulates both the slope and the y-intercept of the line as a function of the tracked movements of the input mechanisms.

In this manner, if the multi-touch display device detects that the input mechanisms engaging the control handles have been moved closer together, the multi-touch display device increases the slope of the line. In contrast, if the multi-touch display device detects that the input mechanisms engaging the control handles have been moved further apart, the multi-touch display device decreases the slope of the line.

As illustrated in FIG. 20B, in response to detecting that the two input mechanisms engaging control handles along slider 2000 have been moved closer together while also being translated in a leftward direction along slider 2000, the multi-touch display device increases the slope of the line while at the same time decreasing the y-intercept of the line. If, as in the above example, the line defines the mappings between an image's pixel values and corresponding grayscale values with the y-intercept of the line defining the brightness of the grayscale values to which the image's pixel values are mapped and the slope defining the contrast between the grayscale values to which the image's pixel values are mapped, increasing the slope of the line increases the contrast of the grayscale values while translating the line to the left decreases the brightness of the grayscale values.

FIGS. 20C-20F illustrate further examples of the application of slider controls, such as those described with respect to FIGS. 20A-20B, to brightness and contrast level adjustments of rendered images.

In one example using a range slider control, a brightness/contrast control maps image pixel values to grayscale values defined by a single straight line, whose slope and offset (y-intercept) can be changed. Here, contrast corresponds to slope, while brightness corresponds to y-intercept, thereby leading to a linear mapping. Detecting relative and absolute movements of fingers engaging the slider control, the contrast of the image is correspondingly adjusted, in an intuitive manner, where squeezing closer increases the contrast, and separating further apart decreases contrast. Meanwhile, the offset of the function can be adjusted based on detected manipulations of the slider control, thereby resulting in changes to the brightness of the image, or perhaps more relevantly, changes can be made to the location of the contrasting part of the function in the data domain.

As illustrated in FIGS. 20C-20F, the range of grayscale values used to render an image are displayed above the shown slider controls, thereby illustrating examples of different effects achieved through manipulation of the slider controls.

Figure 20C:
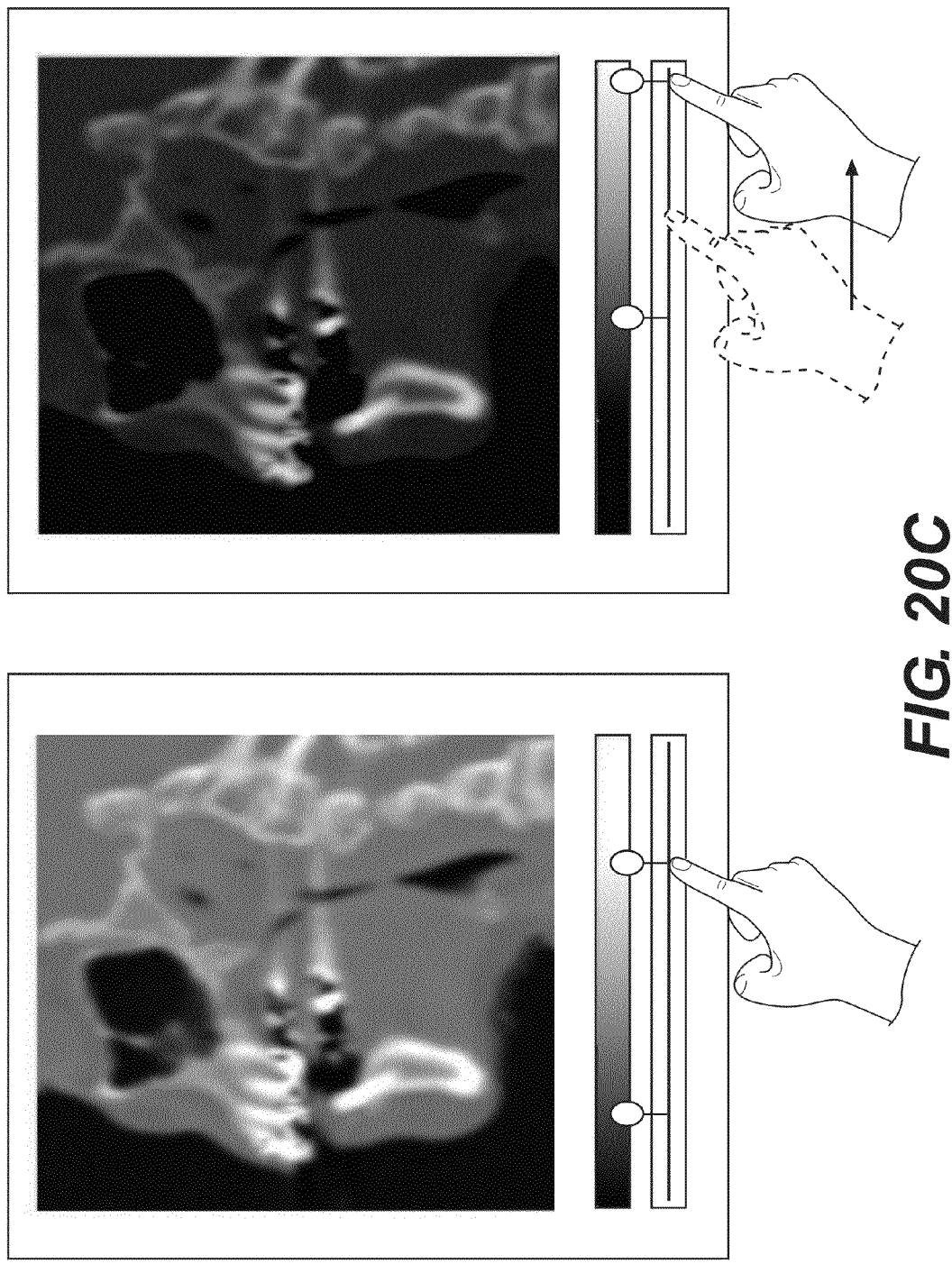

Referring to FIG. 20C, when the multi-touch display device detects that a single input mechanism has engaged a control handle along the slider control and translated the control handle along the slider control, the multi-touch display device modifies the y-intercept of the line corresponding to the slider control, resulting in changes to the brightness of the grayscale values within the range of grayscale values used to render the image. In particular, in response to detecting that an input mechanism has engaged a control handle and translated the control handle in a rightward direction along the slider control, the multi-touch display device translates the line corresponding to the slider control to the right, causing the range of grayscale values used to render the image to include darker grayscale values, resulting in a darker image, as illustrated in FIG. 20C.

Notice that not only does the rendered image appear darker, but that the range of grayscale values used to render the image that is displayed above the slider control also has been shifted to include darker values. In some cases, the number of different grayscale values used to render an image may remain the same in response to manipulations such as the manipulation illustrated in FIG. 20C, whereas, in other cases, the number of different grayscale values used to render an image may increase or decrease in response to manipulations such as the manipulation illustrated in FIG. 20C.

Of course, had the input mechanism engaging the control handle translated the control handle to the left instead of the right, the multi-touch display device would have translated the line corresponding to the slider control to the left, instead of to the right, causing the range of grayscale values to be used to render the image to include brighter values, which would have resulted in a brighter image.

Figure 20D:
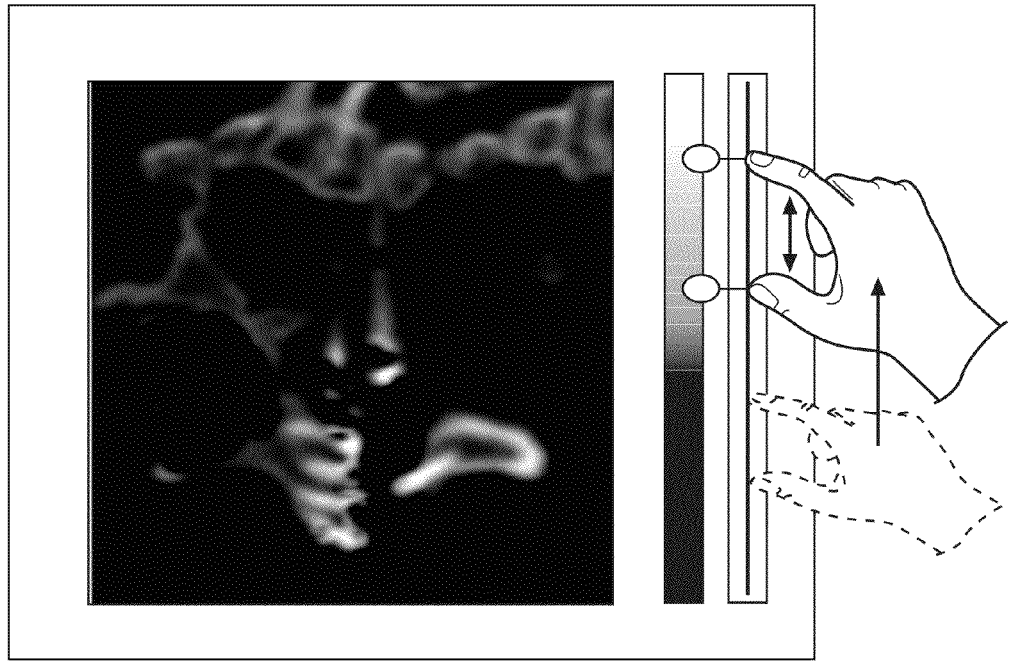
Figure 20D:
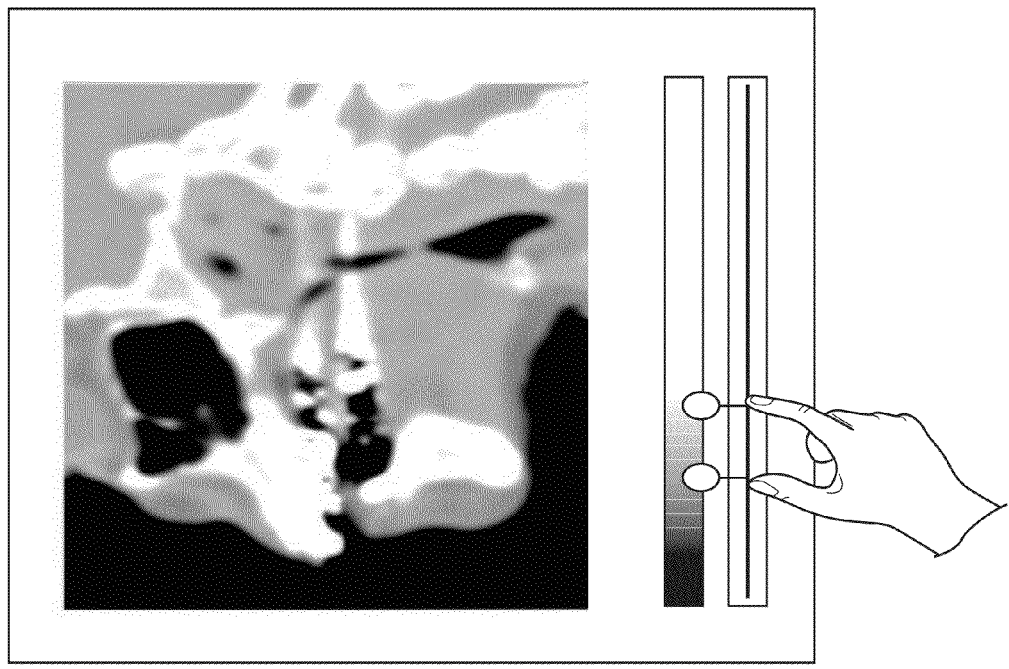

Referring to FIG. 20D, when the multi-touch display device detects that two input mechanisms have engaged control handles along the slider control concurrently and translated the control handles along the slider control, the multi-touch display device modifies both the slope and the y-intercept of the line corresponding to the slider control, resulting in changes to both the contrast and the brightness of the grayscale values within the range of grayscale values used to render the image. In particular, in response to detecting that two input mechanisms have engaged control handles and increased the separation between the control handles while also translating the control handles in a rightward direction along the slider control, the multi-touch display device decreases the slope of the line corresponding to the slider control while also translating the line corresponding to the slider control to the right. As a result, as illustrated in FIG. 20C, the range of grayscale values used to render the image is decreased, resulting in less contrast within the rendered image, while also being shifted to include darker grayscale values, resulting in a darker image.

Notice that not only does the rendered image have less contrast and is darker, but also the range of grayscale values used to render the image that is displayed above the slider control includes fewer grayscale values and has been shifted to include darker values.

Figure 20F:
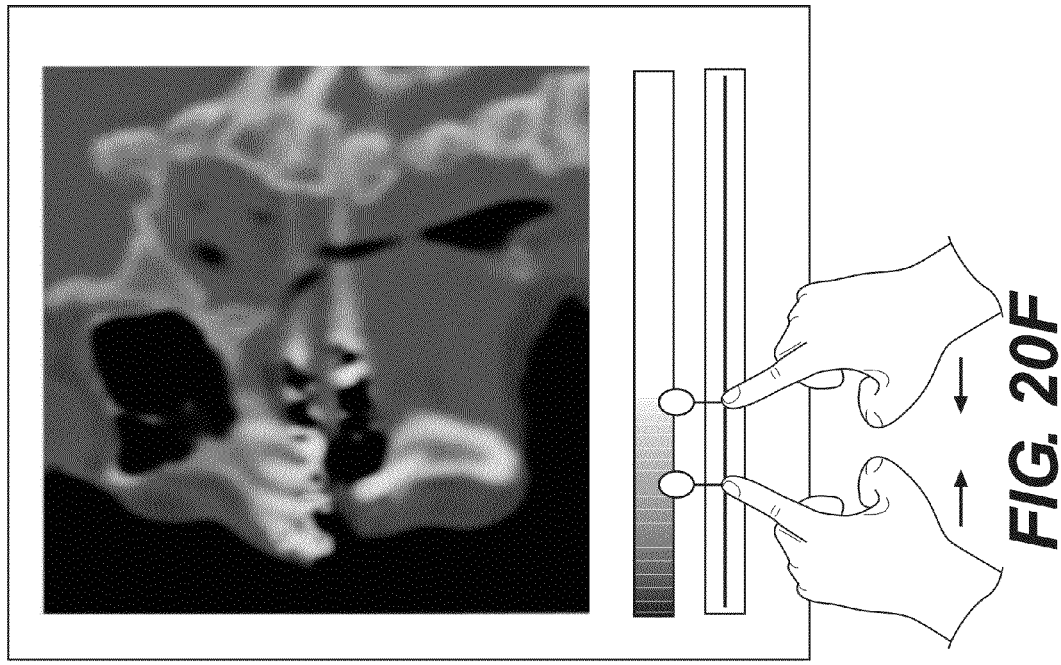
Figure 20E:
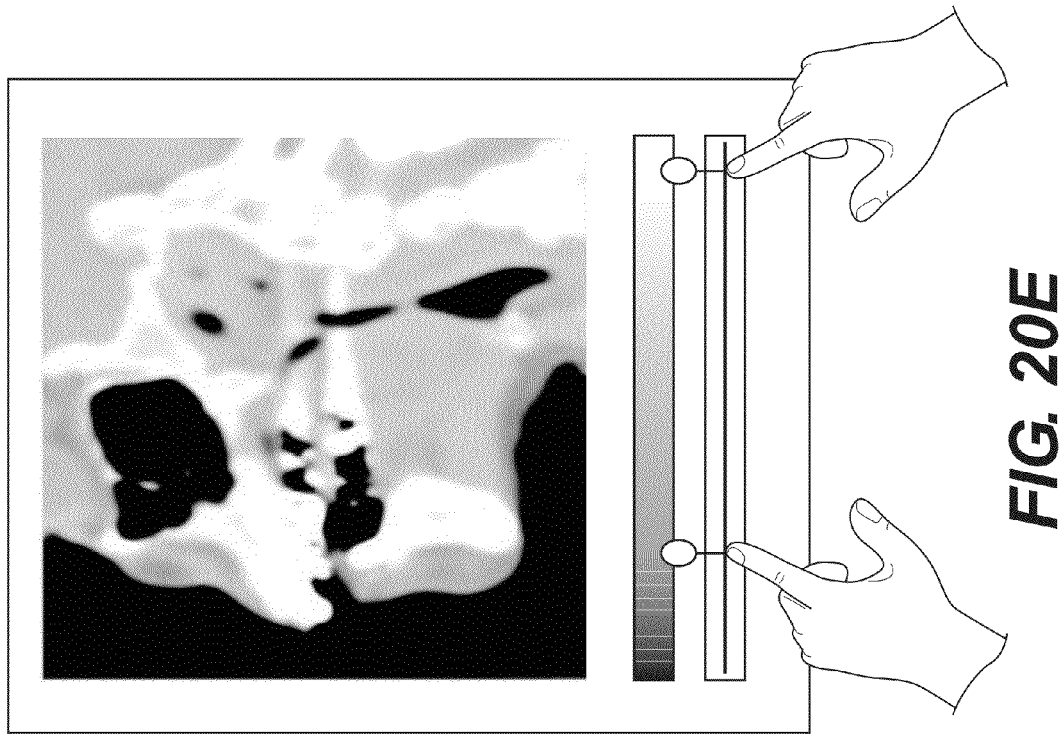

Referring to FIGS. 20E-20F, in response to detecting that two input mechanisms have engaged control handles and decreased the separation between the control handles, the multi-touch display device increases the slope of the line corresponding to the slider control. As a result, as illustrated in FIG. 20F, the multi-touch display device increase the range of grayscale values used to render the image to include more grayscale values, resulting in greater contrast within the rendered image.

Notice that not only does the rendered image have more contrast as a result, but also the range of grayscale values used to render the image that is displayed above the slider control includes more grayscale values.

The slider controls illustrated in FIGS. 20A-20F can be used in combination with any of the other controls for manipulating volumetric data described throughout.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

The various controls for manipulating displayed content described herein generally are described in the context of multi-touch display devices, which are configured to receive multiple inputs at the same time.

The various different controls described herein may be implemented both on multi-touch display devices that require physical contact with the surface of the multi-touch display device in order to receive input and multi-touch display devices that do not require physical contact with the surface of the multi-touch display device in order to receive input. For example, the controls described herein may be implemented on multi-touch display devices that receive input by detecting contact with the surface of the multi-touch display device by a finger, a stylus, some other mechanical, electro-mechanical, or magnetic input mechanism and/or any combination of multiple such input mechanisms at the same time. Additionally or alternatively, the various different controls described herein may be implemented on multi-touch display devices that receive input by detecting the presence of an input mechanism in the vicinity of the surface of the multi-touch display device but that that do not necessarily require physical contact to be made with the surface of the multi-touch display device to receive input. Such multi-touch display devices may be configured to receive input by detecting the presence of a finger, a stylus, some other mechanical, electro-mechanical, or magnetic input mechanism and/or any combination of multiple such input mechanisms in the vicinity of the surface of the multi-touch display device even when such input mechanisms are not in physical contact with the surface of the multi-touch display device.

The various different controls described herein also may be implemented in any other type of multi-point computing system configured to receive multiple inputs at the same, including, for example, systems configured to receive concurrent input from multiple pointing devices (e.g., multiple computer mice) and/or concurrent input from one or more pointing devices and another input device (e.g., a keyboard). Another example of a multi-point input computing system within which the controls described herein may be implemented is a multi-point input capable standalone tablet without an integrated display.

Various modifications may be made. For example, useful results still may be achieved if steps of the disclosed techniques are performed in a different order and/or if components of the disclosed systems are combined in a different manner and/or replaced or supplemented by other components. Furthermore, while the systems and operations previously described generally were described in the context of defining and manipulating a single cutting plane through a 3D volume, the controls described herein are equally applicable to manipulating displayed data when two or more cutting planes are simultaneously defined.

What is claimed is:

1. A computer-implemented method of enabling visual navigation through a three-dimensional data set on a multi-touch display device, the method comprising:
   accessing a three-dimensional data set from a computer memory storage device;
   defining an axis through the three-dimensional data set;
   defining a two-dimensional planar bounded surface that intersects the three-dimensional data set, that defines a two-dimensional data set within the three-dimensional data set, and that divides the three-dimensional data set into first and second subsets of the three-dimensional data set, the two-dimensional bounded surface having a normal defining positive and negative directions relative to the two-dimensional bounded surface, the first and second subsets of the three-dimensional data set being distinct and corresponding to points located on opposing sides of the two-dimensional bounded surface, the first subset of the three-dimensional data set including data from the three-dimensional data set that is in the positive direction relative to the two-dimensional bounded surface, the second subset of the three-dimensional data set including data from the three-dimensional data set that is in the negative direction relative to the two-dimensional bounded surface, and the two-dimensional data set including data from the three-dimensional data set that is intersected by the two-dimensional bounded surface;
   rendering, on a multi-touch display device, a three-dimensional view of the three-dimensional data set while also rendering the two-dimensional bounded surface intersecting the three-dimensional data set, wherein at least a portion of the first subset of the three-dimensional data set is excluded from the three-dimensional view of the three-dimensional data set, at least a portion of the two-dimensional data set is displayed within the three-dimensional view of the three-dimensional data set;
   providing a snap-to-axis control by rendering, within the three-dimensional view of the three-dimensional data set, a visual indication of the axis defined through the three-dimensional data set, the snap-to-axis control configured to, upon detecting engagement by an input mechanism of a point on the multi-touch display device corresponding to the snap-to-axis control, automatically reorient the normal of the two-dimensional bounded surface to become parallel to the axis defined through the three-dimensional object;
   providing a rotation control that enables a user of the multi-touch display device to rotate the two-dimensional bounded surface in three dimensions about a point on the two-dimensional bounded surface, the rotation control being configured to:
      detect engagement by an input mechanism of a point on the multi-touch display device corresponding to the rotation control,
      track movements of the input mechanism while the input mechanism remains engaged with the multi-touch display device,
      rotate the two-dimensional bounded surface in three dimensions about the point on the two-dimensional bounded surface as a function of the tracked movement of the input mechanism to cause the two-dimensional bounded surface to intersect a new two-dimensional data set within the three-dimensional data set and to divide the three-dimensional data set into new first and second subsets of the three-dimensional data set, the new first and second subsets of the three-dimensional data set being distinct and corresponding to points located on opposing sides of the two-dimensional bounded surface, the new first subset of the three-dimensional data set including data from the three-dimensional data set that is in the positive direction relative to the two-dimensional bounded surface, and the new second subset of the three-dimensional data set including data from the three-dimensional data set that is in the negative direction relative to the two-dimensional bounded surface, and
      update the rendering, on the multi-touch display device, of the three-dimensional view of the three-dimensional data set to reflect the rotation of the two-dimensional bounded surface about the point on the two-dimensional bounded surface as a function of the tracked movement of the input mechanism, causing at least a portion of the new first subset of the three-dimensional data set to be excluded from the updated three-dimensional view of the three-dimensional data set and at least a portion of the new two-dimensional data set to be displayed within the three-dimensional view of the three-dimensional data set;
   detecting engagement of a first point on the multi-touch display device corresponding to the rotation control by a first input mechanism;
   tracking movements of the first input mechanism while the first input mechanism remains engaged with the multi-touch display device;
   rotating the two-dimensional bounded surface in three dimensions about a point on the two-dimensional bounded surface as a function of the tracked movement of the first input mechanism;
   updating the rendering, on the multi-touch display device, of the three-dimensional view of the three-dimensional data set to reflect the rotation of the two-dimensional bounded surface about the point on the two-dimensional bounded surface as a function of the tracked movement of the first input mechanism;

while the first input mechanism remains engaged with the multi-touch display device, detecting concurrent engagement of a second point on the multi-touch display device corresponding to the snap-to-axis control;

in response to detecting concurrent engagement of a point on the multi-touch display device corresponding to the rotation control by the first input mechanism and the second point on the multi-touch display device corresponding to the snap-to-axis control, reorienting the two-dimensional bounded surface in three dimensions about the point on the two-dimensional bounded surface so that the normal to the two-dimensional bounded surface is parallel to the axis defined through the three-dimensional data set; and updating the rendering, on the multi-touch display device, of the three-dimensional view of the three-dimensional data set to reflect the reorientation of the two-dimensional bounded surface in three dimensions about the point on the two-dimensional bounded surface so that the normal to the two-dimensional bounded surface is parallel to the axis defined through the three-dimensional data set.

2. The method of claim 1 wherein reorienting the two-dimensional bounded surface about the point on the two-dimensional bounded surface so that the normal to the two-dimensional bounded surface is parallel to the axis defined through the three-dimensional data set includes reorienting the two-dimensional bounded surface about the point on the two-dimensional bounded surface so that the normal to the two-dimensional bounded surface is parallel to the axis defined through the three-dimensional data set irrespective of movement of the first input mechanism after detecting concurrent engagement of a point on the multi-touch display device corresponding to the rotation control by the first input mechanism and the second point on the multi-touch display device corresponding to the snap-to-axis control.

3. The method of claim 1 wherein reorienting the two-dimensional bounded surface about the point on the two-dimensional bounded surface so that the normal to the two-dimensional bounded surface is parallel to the axis defined through the three-dimensional data set includes reorienting the two-dimensional bounded surface about the point on the two-dimensional bounded surface so that the normal to the two-dimensional bounded surface is parallel to the axis defined through the three-dimensional data set without requiring corresponding movement of the first input mechanism.

4. The method of claim 1 further comprising providing a translation control that enables a user of the multi-touch display device to translate the two-dimensional bounded surface on a plane containing and parallel to the two-dimensional bounded surface, the translation control being configured to:

detect engagement by one or more input mechanisms of one or more points on the multi-touch display device corresponding to the display of the two-dimensional data set displayed within the three-dimensional view of the three-dimensional data set, track movement of the one or more input mechanisms while the one or more input mechanisms remain engaged with the one or more points on the multi-touch display device, translate the two-dimensional bounded surface on a plane containing and parallel to the two-dimensional bounded surface to a new position on the plane as a function of the tracked movement of the one or more input mechanisms to cause a new two-dimensional data set within the three-dimensional data set to be defined that corresponds to the translated two-dimensional bounded surface, and update the rendering, on the multi-touch display device of the three-dimensional view of the three-dimensional data set with the translated two-dimensional bounded surface intersecting the three-dimensional data set, wherein at least a portion of the first subset of the three-dimensional data set is excluded from the three-dimensional view of the three-dimensional data set and at least a portion of the new two-dimensional data set is displayed within the three-dimensional view of the three-dimensional data set to reflect the new position of the translated two-dimensional bounded surface on the plane.

5. The method of claim 1 further comprising providing a two-dimensional bounded surface depth control configured to:

detect engagement by an input mechanism of a point on the multi-touch display device corresponding to the two-dimensional bounded surface depth control;

track movement of the input mechanism while the input mechanism remains engaged with the point on the multi-touch display device;

modify the two-dimensional bounded surface as a function of the tracked movement of the input mechanism to translate the two-dimensional bounded surface in a direction along the normal of the two-dimensional bounded surface to cause the two-dimensional bounded surface to define a different two-dimensional data set within the three-dimensional data set and to divide the three-dimensional data set into different first and second subsets of the three-dimensional data set, the different first and second subsets of the three-dimensional data set being distinct and on opposing sides of the two-dimensional bounded surface, the different first subset of the three-dimensional data set including data from the three-dimensional data set that is in the positive direction relative to the translated two-dimensional bounded surface, the different second subset of the three-dimensional data set including data from the three-dimensional data set that is in the negative direction relative to the translated two-dimensional bounded surface; and update the rendering, on the multi-touch display device of the three-dimensional view based on the three-dimensional data set to reflect the translation of the two-dimensional bounded surface including:

remove at least a portion of the visual display of the different first subset of the three-dimensional data set from the rendered three-dimensional view of the three-dimensional data set, and display, within the three-dimensional view based on the three-dimensional data set, at least a portion of the different two-dimensional data set.

6. The method of claim 1 further comprising providing a rotation control that enables a user of the multi-touch display device to rotate the two-dimensional bounded surface in two dimensions on a plane that contains and is parallel to the two-dimensional bounded surface, the rotation control being configured to:

detect engagement by one or more input mechanisms of one or more points on the multi-touch display device corresponding to the display of the two-dimensional data set displayed within the three-dimensional view of the three-dimensional data set, track movement of the one or more input mechanisms while the one or more input mechanisms remain engaged with the one or more points on the multi-touch display device, rotate the two-dimensional bounded surface on a plane that contains and is parallel to the two-dimensional bounded surface, the two-dimensional bounded surface being rotated in two dimensions around a point within the two-dimensional bounded surface as a function of the tracked movement of the one or more input mechanisms to cause a new two-dimensional data set within the three-dimensional data set to be defined that corresponds to the rotated two-dimensional bounded surface, and update the rendering, on the multi-touch display device of the three-dimensional view of the three-dimensional data set with the rotated two-dimensional bounded surface intersecting the three-dimensional data set, wherein at least a portion of the first subset of the three-dimensional data set is excluded from the three-dimensional view of the three-dimensional data set and at least a portion of the new two-dimensional data set is displayed within the three-dimensional view of the three-dimensional data set to reflect the new position of the rotated two-dimensional bounded surface on the plane.

7. The method of claim 1 further comprising providing a scale control that enables a user of the multi-touch display device to scale dimensions of the two-dimensional bounded surface, the scale control being configured to:

detect engagement by one or more input mechanisms of one or more points on the multi-touch display device corresponding to the display of the two-dimensional data set displayed within the three-dimensional view of the three-dimensional data set, track movement of the one or more input mechanisms while the one or more input mechanisms remain engaged with the one or more points on the multi-touch display device, scale dimensions of the two-dimensional bounded surface on a plane containing and parallel to the two-dimensional bounded surface as a function of the tracked movement of the one or more input mechanisms to cause a new two-dimensional data set within the three-dimensional data set to be defined that corresponds to the scaled two-dimensional bounded surface, and update the rendering, on the multi-touch display device of the three-dimensional view of the three-dimensional data set with the scaled two-dimensional bounded surface intersecting the three-dimensional data set, wherein at least a portion of the first subset of the three-dimensional data set is excluded from the three-dimensional view of the three-dimensional data set and at least a portion of the new two-dimensional data set is displayed within the three-dimensional view of the three-dimensional data set to reflect the scaled dimensions of the scaled two-dimensional bounded surface on the plane.

8. The method of claim 1, wherein the three-dimensional view of the three-dimensional data set includes visual indications of boundaries of the three-dimensional view, and further comprising providing a rotation control that enables a user of the multi-touch display device to rotate the three-dimensional view of the three-dimensional data set, the rotation control being configured to:

detect engagement by one or more input mechanisms of one or more points on the multi-touch display device corresponding to the visual indications of the boundaries of the three-dimensional view of the three-dimensional data set, track movements of the one or more input mechanisms while the one or more input mechanisms remain engaged with the multi-touch display device, rotate the three-dimensional data set about an axis defined through the three-dimensional data set as a function of the tracked movement of the one or more input mechanisms to cause the two-dimensional bounded surface to intersect a new two-dimensional data set within the three-dimensional data set and to divide the three-dimensional data set into new first and second subsets of the three-dimensional data set, the new first and second subsets of the three-dimensional data set being distinct and corresponding to points located on opposing sides of the two-dimensional bounded surface, the new first subset of the three-dimensional data set including data from the rotated three-dimensional data set that is in the positive direction relative to the two-dimensional bounded surface, and the new second subset of the three-dimensional data set including data from the rotated three-dimensional data set that is in the negative direction relative to the two-dimensional bounded surface, and update the rendering, on the multi-touch display device, of the three-dimensional view of the three-dimensional data set to reflect the rotation of the three-dimensional data set about the axis defined through the three-dimensional data set as a function of the tracked movement of the one or more input mechanisms, causing at least a portion of the new first subset of the three-dimensional data set to be excluded from the updated three-dimensional view of the three-dimensional data set and at least a portion of the new two-dimensional data set to be displayed within the three-dimensional view of the three-dimensional data set.

9. The method of claim 1 further comprising rendering, on a second region of the multi-touch display device that is distinct from a first region of the multi-touch display device in which is rendered the three-dimensional view of the three-dimensional data set, a two-dimensional view of the two-dimensional data set, causing the multi-touch display device to concurrently display both the two-dimensional view of the two-dimensional data set and the updated three-dimensional view based on the three-dimensional data set that visually depicts the two-dimensional bounded surface.

10. The method of claim 1 wherein rendering the three-dimensional view wherein at least a portion of the first subset of the three-dimensional data set is excluded from the three-dimensional view comprises rendering the three-dimensional view wherein all of the first subset of the three-dimensional data set is excluded from the rendered three-dimensional view.

11. The method of claim 1 wherein rendering the three-dimensional view wherein at least a portion of the two-dimensional data set is displayed within the rendered three-dimensional view comprises rendering the three-dimensional view wherein all of the two-dimensional data set is displayed within the rendered three-dimensional view.

12. The method of claim 1 wherein the first subset of the three-dimensional data set only includes data from the three-dimensional data set that is in the positive direction relative to the two-dimensional bounded surface.

13. The method of claim 12 wherein the first subset of the three-dimensional data set includes all of the data from the three-dimensional data set that is in the positive direction relative to the two-dimensional bounded surface.

14. The method of claim 1 wherein the second subset of the three-dimensional data set only includes data from the three-dimensional data set that is in the two-dimensional data set or that is in the negative direction relative to the two-dimensional bounded surface.

15. The method of claim 14 wherein the second subset of the three-dimensional data set includes all of the data from the three-dimensional data set that is in the two-dimensional data set and all of the data from the three-dimensional data set that is in the negative direction relative to the two-dimensional bounded surface.

16. The method of claim 1, wherein tracking movements of the first input mechanism while the first input mechanism remains engaged with the multi-touch display device includes periodically detecting the positions of the first input mechanism.

17. The method of claim 16, wherein tracking movements of the first input mechanism while the first input mechanism remains engaged includes determining that the first input mechanism has moved in response to detecting a displacement of a position of the first input mechanism between two different sampling periods.

18. The method of claim 1, wherein the rotation control being configured to rotate the two-dimensional bounded surface comprises the rotation control being configured to rotate the two-dimensional bounded surface in three dimensions to cause the two-dimensional bounded surface to divide the three-dimensional data set into new first and second subsets of the three-dimensional data set that are disjoint.

19. The method of claim 1 further comprising:
changing the appearance of the snap-to-axis control from the invisible state to the visible state when at least one input mechanism is detected to be in engagement with the multi-touch display device.

20. The method of claim 1 wherein providing a snap-to-axis control comprises rendering visual indications of two or more different axes through the three-dimensional data set, each different axis being separately selectable to cause a reorientation of the normal of the two-dimensional bounded surface to become parallel to the selected axis.

21. A tangible computer-readable storage device storing instructions that, when executed by a computing system, cause the computing system to perform operations comprising:
access a three-dimensional data set from a computer memory storage device;
define an axis through the three-dimensional data set;
define a two-dimensional planar bounded surface that intersects the three-dimensional data set, that defines a two-dimensional data set within the three-dimensional data set, and that divides the three-dimensional data set into first and second subsets of the three-dimensional data set, the two-dimensional bounded surface having a normal defining positive and negative directions relative to the two-dimensional bounded surface, the first and second subsets of the three-dimensional data set being distinct and corresponding to points located on opposing sides of the two-dimensional bounded surface, the first subset of the three-dimensional data set including data from the three-dimensional data set that is in the positive direction relative to the two-dimensional bounded surface, the second subset of the three-dimensional data set including data from the three-dimensional data set that is in the negative direction relative to the two-dimensional bounded surface, and the two-dimensional data set including data from the three-dimensional data set that is intersected by the two-dimensional bounded surface;
render, on a multi-touch display device, a three-dimensional view of the three-dimensional data set while also rendering the two-dimensional bounded surface intersecting the three-dimensional data set, wherein at least a portion of the first subset of the three-dimensional data set is excluded from the three-dimensional view of the three-dimensional data set, at least a portion of the two-dimensional data set is displayed within the three-dimensional view of the three-dimensional data set;
provide a snap-to-axis control by rendering, within the three-dimensional view of the three-dimensional data set, a visual indication of the axis defined through the three-dimensional data set, the snap-to-axis control configured to, upon detecting engagement by an input mechanism of a point on the multi-touch display device corresponding to the snap-to-axis control, automatically reorient the normal of the two-dimensional bounded surface to become parallel to the axis defined through the three-dimensional object;
provide a rotation control that enables a user of the multi-touch display device to rotate the two-dimensional bounded surface in three dimensions about a point on the two-dimensional bounded surface, the rotation control being configured to:
detect engagement by an input mechanism of a point on the multi-touch display device corresponding to the rotation control,
track movements of the input mechanism while the input mechanism remains engaged with the multi-touch display device,
rotate the two-dimensional bounded surface in three dimensions about the point on the two-dimensional bounded surface as a function of the tracked movement of the input mechanism to cause the two-dimensional bounded surface to intersect a new two-dimensional data set within the three-dimensional data set and to divide the three-dimensional data set into new first and second subsets of the three-dimensional data set, the new first and second subsets of the three-dimensional data set being distinct and corresponding to points located on opposing sides of the two-dimensional bounded surface, the new first subset of the three-dimensional data set including data from the three-dimensional data set that is in the positive direction relative to the two-dimensional bounded surface, and the new second subset of the three-dimensional data set including data from the three-dimensional data set that is in the negative direction relative to the two-dimensional bounded surface, and
update the rendering, on the multi-touch display device, of the three-dimensional view of the three-dimensional data set to reflect the rotation of the two-dimensional bounded surface in three dimensions about the point on the two-dimensional bounded surface as a function of the tracked movement of the input mechanism, causing at least a portion of the new first subset of the three-dimensional data set to be excluded from the updated three-dimensional view of the three-dimensional data set and at least a portion of the new two-dimensional data set to be displayed within the three-dimensional view of the three-dimensional data set;

detect engagement of a first point on the multi-touch display device corresponding to the rotation control by a first input mechanism;

track movements of the first input mechanism while the first input mechanism remains engaged with the multi-touch display device;

rotate the two-dimensional bounded surface in three dimensions about a point on the two-dimensional bounded surface as a function of the tracked movement of the first input mechanism;

update the rendering, on the multi-touch display device, of the three-dimensional view of the three-dimensional data set to reflect the rotation of the two-dimensional bounded surface in three dimensions about the point on the two-dimensional bounded surface as a function of the tracked movement of the first input mechanism;

while the first input mechanism remains engaged with the multi-touch display device, detect concurrent engagement of a second point on the multi-touch display device corresponding to the snap-to-axis control;

in response to detecting concurrent engagement of a point on the multi-touch display device corresponding to the rotation control by the first input mechanism and the second point on the multi-touch display device corresponding to the snap-to-axis control, reorient the two-dimensional bounded surface in three dimensions about the point on the two-dimensional bounded surface so that the normal to the two-dimensional bounded surface is parallel to the axis defined through the three-dimensional data set; and update the rendering, on the multi-touch display device, of the three-dimensional view of the three-dimensional data set to reflect the reorientation of the two-dimensional bounded surface in three dimensions about the point on the two-dimensional bounded surface so that the normal to the two-dimensional bounded surface is parallel to the axis defined through the three-dimensional data set.

22. The tangible computer-readable storage device of claim 21 wherein the instructions that, when executed by a computing system, cause the computing system to reorient the two-dimensional bounded surface about the point on the two-dimensional bounded surface so that the normal to the two-dimensional bounded surface is parallel to the axis defined through the three-dimensional data set comprise instructions that, when executed by a computing system, cause the computing system to reorient the two-dimensional bounded surface about the point on the two-dimensional bounded surface so that the normal to the two-dimensional bounded surface is parallel to the axis defined through the three-dimensional data set irrespective of movement of the first input mechanism after detecting concurrent engagement of a point on the multi-touch display device corresponding to the rotation control by the first input mechanism and the second point on the multi-touch display device corresponding to the snap-to-axis control.

23. The tangible computer-readable storage device of claim 21 wherein the instructions that, when executed by a computing system, cause the computing system to reorient the two-dimensional bounded surface about the point on the two-dimensional bounded surface so that the normal to the two-dimensional bounded surface is parallel to the axis defined through the three-dimensional data set comprise instructions that, when executed by a computing system, cause the computing system to reorient the two-dimensional bounded surface about the point on the two-dimensional bounded surface so that the normal to the two-dimensional bounded surface is parallel to the axis defined through the three-dimensional data set without requiring corresponding movement of the first input mechanism.

24. The tangible computer-readable storage device of claim 21 further storing instructions that, when executed by a computing system, cause the computing system to provide a translation control that enables a user of the multi-touch display device to translate the two-dimensional bounded surface on a plane containing and parallel to the two-dimensional bounded surface, the translation control being configured to:

detect engagement by one or more input mechanisms of one or more points on the multi-touch display device corresponding to the display of the two-dimensional data set displayed within the three-dimensional view of the three-dimensional data set, track movement of the one or more input mechanisms while the one or more input mechanisms remain engaged with the one or more points on the multi-touch display device, translate the two-dimensional bounded surface on a plane containing and parallel to the two-dimensional bounded surface to a new position on the plane as a function of the tracked movement of the one or more input mechanisms to cause a new two-dimensional data set within the three-dimensional data set to be defined that corresponds to the translated two-dimensional bounded surface, and update the rendering, on the multi-touch display device of the three-dimensional view of the three-dimensional data set with the translated two-dimensional bounded surface intersecting the three-dimensional data set, wherein at least a portion of the first subset of the three-dimensional data set is excluded from the three-dimensional view of the three-dimensional data set and at least a portion of the new two-dimensional data set is displayed within the three-dimensional view of the three-dimensional data set to reflect the new position of the translated two-dimensional bounded surface on the plane.

25. The tangible computer-readable storage device of claim 21 further storing instructions that, when executed by a computing system, cause the computing system to provide a two-dimensional bounded surface depth control configured to:

detect engagement by an input mechanism of a point on the multi-touch display device corresponding to the two-dimensional bounded surface depth control;

track movement of the input mechanism while the input mechanism remains engaged with the point on the multi-touch display device;

modify the two-dimensional bounded surface as a function of the tracked movement of the input mechanism to translate the two-dimensional bounded surface in a direction along the normal of the two-dimensional bounded surface to cause the two-dimensional bounded surface to define a different two-dimensional data set within the three-dimensional data set and to divide the three-dimensional data set into different first and second subsets of the three-dimensional data set, the different first and second subsets of the three-dimensional data set being distinct and on opposing sides of the two-dimensional bounded surface, the different first subset of the three-dimensional data set including data from the three-dimensional data set that is in the positive direction relative to the translated two-dimensional bounded surface, the different second subset of the three-dimensional data set including data from the three-dimensional data set that is in the negative direction relative to the translated two-dimensional bounded surface; and update the rendering, on the multi-touch display device of the three-dimensional view based on the three-dimensional data set to reflect the translation of the two-dimensional bounded surface including:

remove at least a portion of the visual display of the different first subset of the three-dimensional data set from the rendered three-dimensional view of the three-dimensional data set, and display, within the three-dimensional view based on the three-dimensional data set, at least a portion of the different two-dimensional data set.

26. The tangible computer-readable storage device of claim 21 further storing instructions that, when executed by a computing system, cause the computing system to provide a rotation control that enables a user of the multi-touch display device to rotate the two-dimensional bounded surface in two dimensions on a plane that contains and is parallel to the two-dimensional bounded surface, the rotation control being configured to:

detect engagement by one or more input mechanisms of one or more points on the multi-touch display device corresponding to the display of the two-dimensional data set displayed within the three-dimensional view of the three-dimensional data set, track movement of the one or more input mechanisms while the one or more input mechanisms remain engaged with the one or more points on the multi-touch display device, rotate the two-dimensional bounded surface on a plane that contains and is parallel to the two-dimensional bounded surface, the two-dimensional bounded surface being rotated in two dimensions around a point within the two-dimensional bounded surface as a function of the tracked movement of the one or more input mechanisms to cause a new two-dimensional data set within the three-dimensional data set to be defined that corresponds to the rotated two-dimensional bounded surface, and update the rendering, on the multi-touch display device of the three-dimensional view of the three-dimensional data set with the rotated two-dimensional bounded surface intersecting the three-dimensional data set, wherein at least a portion of the first subset of the three-dimensional data set is excluded from the three-dimensional view of the three-dimensional data set and at least a portion of the new two-dimensional data set is displayed within the three-dimensional view of the three-dimensional data set to reflect the new position of the rotated two-dimensional bounded surface on the plane.

27. The tangible computer-readable storage device of claim 21 further storing instructions that, when executed by a computing system, cause the computing system to provide a scale control that enables a user of the multi-touch display device to scale dimensions of the two-dimensional bounded surface, the scale control being configured to:

detect engagement by one or more input mechanisms of one or more points on the multi-touch display device corresponding to the display of the two-dimensional data set displayed within the three-dimensional view of the three-dimensional data set, track movement of the one or more input mechanisms while the one or more input mechanisms remain engaged with the one or more points on the multi-touch display device, scale dimensions of the two-dimensional bounded surface on a plane containing and parallel to the two-dimensional bounded surface as a function of the tracked movement of the one or more input mechanisms to cause a new two-dimensional data set within the three-dimensional data set to be defined that corresponds to the scaled two-dimensional bounded surface, and update the rendering, on the multi-touch display device of the three-dimensional view of the three-dimensional data set with the scaled two-dimensional bounded surface intersecting the three-dimensional data set, wherein at least a portion of the first subset of the three-dimensional data set is excluded from the three-dimensional view of the three-dimensional data set and at least a portion of the new two-dimensional data set is displayed within the three-dimensional view of the three-dimensional data set to reflect the scaled dimensions of the scaled two-dimensional bounded surface on the plane.

28. The tangible computer-readable storage device of claim 21 wherein the instructions that, when executed by a computing system, cause the computing system to render the three-dimensional view comprise instructions that, when executed by a computing system, cause the computing system to render a three-dimensional view of the three-dimensional data set that includes visual indications of boundaries of the three-dimensional view, and further storing instructions that, when executed by a computing system, cause the computing system to provide a rotation control that enables a user of the multi-touch display device to rotate the three-dimensional view of the three-dimensional data set, the rotation control being configured to:

detect engagement by one or more input mechanisms of one or more points on the multi-touch display device corresponding to the visual indications of the boundaries of the three-dimensional view of the three-dimensional data set, track movements of the one or more input mechanisms while the one or more input mechanisms remain engaged with the multi-touch display device, rotate the three-dimensional data set about an axis defined through the three-dimensional data set as a function of the tracked movement of the one or more input mechanisms to cause the two-dimensional bounded surface to intersect a new two-dimensional data set within the three-dimensional data set and to divide the three-dimensional data set into new first and second subsets of the three-dimensional data set, the new first and second subsets of the three-dimensional data set being distinct and corresponding to points located on opposing sides of the two-dimensional bounded surface, the new first subset of the three-dimensional data set including data from the rotated three-dimensional data set that is in the positive direction relative to the two-dimensional bounded surface, and the new second subset of the three-dimensional data set including data from the rotated three-dimensional data set that is in the negative direction relative to the two-dimensional bounded surface, and update the rendering, on the multi-touch display device, of the three-dimensional view of the three-dimensional data set to reflect the rotation of the three-dimensional data set about the axis defined through the three-dimensional data set as a function of the tracked movement of the one or more input mechanisms, causing at least a portion of the new first subset of the three-dimensional data set to be excluded from the updated three-dimensional view of the three-dimensional data set and at least a portion of the new two-dimensional data set to be displayed within the three-dimensional view of the three-dimensional data set.

29. The tangible computer-readable storage device of claim 21 further storing instructions that, when executed by a computing system, cause the computing system to render, on a second region of the multi-touch display device that is distinct from a first region of the multi-touch display device in which is rendered the three-dimensional view of the three-dimensional data set, a two-dimensional view of the two-dimensional data set, causing the multi-touch display device to concurrently display both the two-dimensional view of the two-dimensional data set and the updated three-dimensional view based on the three-dimensional data set that visually depicts the two-dimensional bounded surface.

30. The tangible computer-readable storage device of claim 21 wherein the instructions that, when executed by a computing system, cause the computing system to render the three-dimensional view wherein at least a portion of the first subset of the three-dimensional data set is excluded from the three-dimensional view further comprise instructions that, when executed by a computer system, cause the computer system to render the three-dimensional view wherein all of the first subset of the three-dimensional data set is excluded from the rendered three-dimensional view.

31. The tangible computer-readable storage device of claim 21 wherein the instructions that, when executed by a computing system, cause the computing system to render the three-dimensional view wherein at least a portion of the two-dimensional data set is displayed within the rendered three-dimensional view comprise instructions that, when executed by a computer system, cause the computer system to render the three-dimensional view wherein all of the two-dimensional data set is displayed within the rendered three-dimensional view.

32. The tangible computer-readable storage device of claim 21, wherein the instructions, that, when executed by a computing system, cause the computing system to track movements of the first input mechanism while the first input mechanism remains engaged with the multi-touch display device include instructions that cause the computing system to periodically detect the positions of the first input mechanism.

33. The tangible computer-readable storage device of claim 32, wherein the instructions, that, when executed by a computing system, cause the computing system to track movements of the first input mechanism while the first input mechanism remains engaged include instructions that cause the computing system to determine that the first input mechanism has moved in response to detecting a displacement of a position of the first input mechanism between two different sampling periods.

34. The tangible computer-readable storage device of claim 21, wherein the instructions that, when executed by a computing system, cause the computing system to provide the rotation control configured to rotate the two-dimensional bounded surface comprise instructions that cause the computing system to provide the rotation control configured to rotate the two-dimensional bounded surface in three dimensions to cause the two-dimensional bounded surface to divide the three-dimensional data set into new first and second subsets of the three-dimensional data set that are disjoint.

35. The device of claim 21 further comprising instructions to perform:
change an appearance of the snap-to-axis control from an invisible state to a visible state when at least one input mechanism is detected to be in engagement with the multi-touch display device.

36. The device of claim 21 wherein providing a snap-to-axis control comprises rendering visual indications of two or more different axes through the three-dimensional data set, each different axis being separately selectable to cause a reorientation of the normal of the two-dimensional bounded surface to become parallel to the selected axis.

37. A multi-touch display device comprising:
a display;
a multi-touch input sensor;
a processor; and
a computer memory device storing instructions that, when executed by the processor, cause the processor to perform operations comprising:
access a three-dimensional data set;
define an axis through the three-dimensional data set;
define a two-dimensional planar bounded surface that intersects the three-dimensional data set, that defines a two-dimensional data set within the three-dimensional data set, and that divides the three-dimensional data set into first and second subsets of the three-dimensional data set, the two-dimensional bounded surface having a normal defining positive and negative directions relative to the two-dimensional bounded surface, the first and second subsets of the three-dimensional data set being distinct and corresponding to points located on opposing sides of the two-dimensional bounded surface, the first subset of the three-dimensional data set including data from the three-dimensional data set that is in the positive direction relative to the two-dimensional bounded surface, the second subset of the three-dimensional data set including data from the three-dimensional data set that is in the negative direction relative to the two-dimensional bounded surface, and the two-dimensional data set including data from the three-dimensional data set that is intersected by the two-dimensional bounded surface;
render, on the display, a three-dimensional view of the three-dimensional data set while also rendering the two-dimensional bounded surface intersecting the three-dimensional data set, wherein at least a portion of the first subset of the three-dimensional data set is excluded from the three-dimensional view of the three-dimensional data set, at least a portion of the two-dimensional data set is displayed within the three-dimensional view of the three-dimensional data set;
provide a snap-to-axis control by rendering, within the three-dimensional view of the three-dimensional data set, a visual indication of the axis defined through the three-dimensional data set, the snap-to-axis control configured to, upon detecting engagement by an input mechanism of a point on the multi-touch display device corresponding to the snap-to-axis control, automatically reorient the normal of the two-dimensional bounded surface to become parallel to the axis defined through the three-dimensional object;
provide a rotation control that enables a user of the multi-touch display device to rotate the two-dimensional bounded surface in three dimensions about a point on the two-dimensional bounded surface, the rotation control being configured to:

detect engagement by an input mechanism of a point on the multi-touch input sensor corresponding to the rotation control, track movements of the input mechanism while the input mechanism remains engaged with the multi-touch input sensor, rotate the two-dimensional bounded surface in three dimensions about the point on the two-dimensional bounded surface as a function of the tracked movement of the input mechanism to cause the two-dimensional bounded surface to intersect a new two-dimensional data set within the three-dimensional data set and to divide the three-dimensional data set into new first and second subsets of the three-dimensional data set, the new first and second subsets of the three-dimensional data set being distinct and corresponding to points located on opposing sides of the two-dimensional bounded surface, the new first subset of the three-dimensional data set including data from the three-dimensional data set that is in the positive direction relative to the two-dimensional bounded surface, and the new second subset of the three-dimensional data set including data from the three-dimensional data set that is in the negative direction relative to the two-dimensional bounded surface, and update the rendering, on the display, of the three-dimensional view of the three-dimensional data set to reflect the rotation of the two-dimensional bounded surface in three dimensions about the point on the two-dimensional bounded surface as a function of the tracked movement of the input mechanism, causing at least a portion of the new first subset of the three-dimensional data set to be excluded from the updated three-dimensional view of the three-dimensional data set and at least a portion of the new two-dimensional data set to be displayed within the three-dimensional view of the three-dimensional data set;

detect engagement of a first point on the multi-touch input sensor corresponding to the rotation control by a first input mechanism;

track movements of the first input mechanism while the first input mechanism remains engaged with the multi-touch input sensor;

rotate the two-dimensional bounded surface in three dimensions about a point on the two-dimensional bounded surface as a function of the tracked movement of the first input mechanism;

update the rendering, on the display, of the three-dimensional view of the three-dimensional data set to reflect the rotation of the two-dimensional bounded surface in three dimensions about the point on the two-dimensional bounded surface as a function of the tracked movement of the first input mechanism;

while the first input mechanism remains engaged with the multi-touch display device, detect concurrent engagement of a second point on the multi-touch input sensor corresponding to the snap-to-axis control;

in response to detecting concurrent engagement of a point on the multi-touch input sensor corresponding to the rotation control by the first input mechanism and the second point on the multi-touch input sensor corresponding to the snap-to-axis control, reorient the two-dimensional bounded surface in three dimensions about the point on the two-dimensional bounded surface so that the normal to the two-dimensional bounded surface is parallel to the axis defined through the three-dimensional data set; and update the rendering, on the display, of the three-dimensional view of the three-dimensional data set to reflect the reorientation of the two-dimensional bounded surface in three dimensions about the point on the two-dimensional bounded surface so that the normal to the two-dimensional bounded surface is parallel to the axis defined through the three-dimensional data set.

38. The device of claim 37 further comprising instructions to perform:

change an appearance of the snap-to-axis control from an invisible state to a visible state when at least one input mechanism is detected to be in engagement with the multi-touch display device.

39. The device of claim 37 wherein providing a snap-to-axis control comprises rendering visual indications of two or more different axes through the three-dimensional data set, each different axis being separately selectable to cause a reorientation of the normal of the two-dimensional bounded surface to become parallel to the selected axis.

* * * * *